(12) United States Patent
Ohta et al.

(10) Patent No.: US 8,461,971 B2
(45) Date of Patent: Jun. 11, 2013

(54) INFORMATION PRESENTATION SYSTEM

(75) Inventors: Katsumi Ohta, Isehara (JP); Hideaki Hozumi, Sagamihara (JP); Takeshi Mitamura, Fujisawa (JP); Hiroyuki Sakai, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 452 days.

(21) Appl. No.: 12/681,466

(22) PCT Filed: Oct. 2, 2008

(86) PCT No.: PCT/JP2008/067906
§ 371 (c)(1),
(2), (4) Date: Apr. 2, 2010

(87) PCT Pub. No.: WO2009/044797
PCT Pub. Date: Apr. 9, 2009

(65) Prior Publication Data
US 2010/0222957 A1 Sep. 2, 2010

(30) Foreign Application Priority Data

Oct. 4, 2007 (JP) ................................. 2007-261309
Oct. 22, 2007 (JP) ................................. 2007-273901
Sep. 5, 2008 (JP) ................................. 2008-228401

(51) Int. Cl.
*B60Q 1/00* (2006.01)
*G09G 5/00* (2006.01)
*G06F 9/46* (2006.01)
*G06F 19/00* (2011.01)
*G02B 5/08* (2006.01)
*G02F 1/15* (2006.01)

(52) U.S. Cl.
USPC ............ 340/425.5; 340/435; 345/7; 345/157; 382/190; 359/844; 359/265; 700/245

(58) Field of Classification Search
None
See application file for complete search history.

(56) References Cited

U.S. PATENT DOCUMENTS

| 5,699,057 | A | * | 12/1997 | Ikeda et al. | 340/937 |
| 5,801,667 | A | * | 9/1998 | Shimizu et al. | 345/7 |
| 6,091,323 | A | * | 7/2000 | Kawai | 340/435 |
| 6,181,996 | B1 | * | 1/2001 | Chou et al. | 701/36 |
| 6,249,720 | B1 | | 6/2001 | Kubota et al. | |
| 6,906,619 | B2 | * | 6/2005 | Williams et al. | 340/425.5 |
| 6,958,751 | B2 | * | 10/2005 | Hayama et al. | 345/419 |

(Continued)

FOREIGN PATENT DOCUMENTS

| JP | 62-39714 A | 2/1987 |
| JP | 6-187592 A | 7/1994 |

(Continued)

*Primary Examiner* — Ryan Zeender
*Assistant Examiner* — Dana Amsdell
(74) *Attorney, Agent, or Firm* — Foley & Lardner LLP

(57) ABSTRACT

Provided is an information presentation system installed on a vehicle, and including a robot (100) having a driver unit (120) to drive the robot (100) and an output unit (130) to output information generated according to vehicle conditions, and a robot control device (200) having an information acquirer unit (210) to acquire the information generated according to the vehicle conditions, an action controller unit (220) to cause the driver unit (120) to drive the robot (100) in response to the acquired information, thereby causing the robot (100) to take an action of informing a passenger that information will be presented, and an information presenter unit (230) to cause the robot (100) to take an action of presenting the information after taking the action of informing the passenger that the information will be presented.

21 Claims, 48 Drawing Sheets

U.S. PATENT DOCUMENTS

| | | | |
|---|---|---|---|
| 7,012,727 B2 * | 3/2006 | Hutzel et al. | 359/265 |
| 7,370,983 B2 * | 5/2008 | DeWind et al. | 359/844 |
| 7,605,773 B2 * | 10/2009 | Janssen | 345/7 |
| 7,626,569 B2 * | 12/2009 | Lanier | 345/156 |
| 2003/0055532 A1 * | 3/2003 | Sakagami et al. | 700/245 |
| 2006/0126941 A1 * | 6/2006 | Higaki | 382/190 |
| 2007/0057781 A1 * | 3/2007 | Breed | 340/457.1 |
| 2009/0189373 A1 * | 7/2009 | Schramm et al. | 280/731 |

FOREIGN PATENT DOCUMENTS

| | | |
|---|---|---|
| JP | 9-44800 A | 2/1997 |
| JP | 9-113845 A | 5/1997 |
| JP | 11-37766 A | 2/1999 |
| JP | 2001-99661 A | 4/2001 |
| JP | 2002-104103 A | 4/2002 |
| JP | 2003-83760 A | 3/2003 |

* cited by examiner

FIG. 5
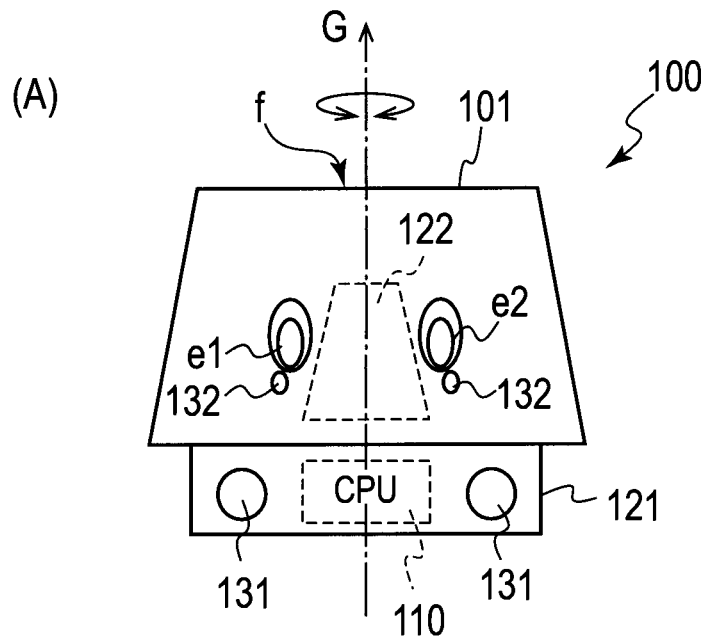
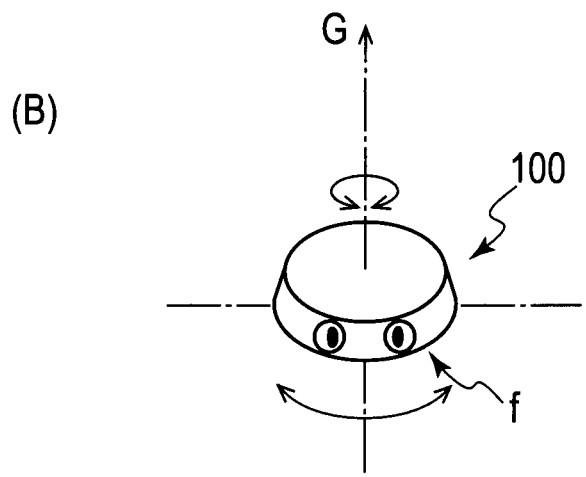
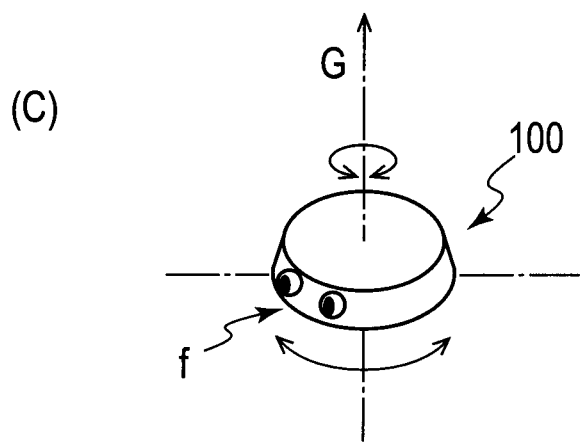

FIG. 8
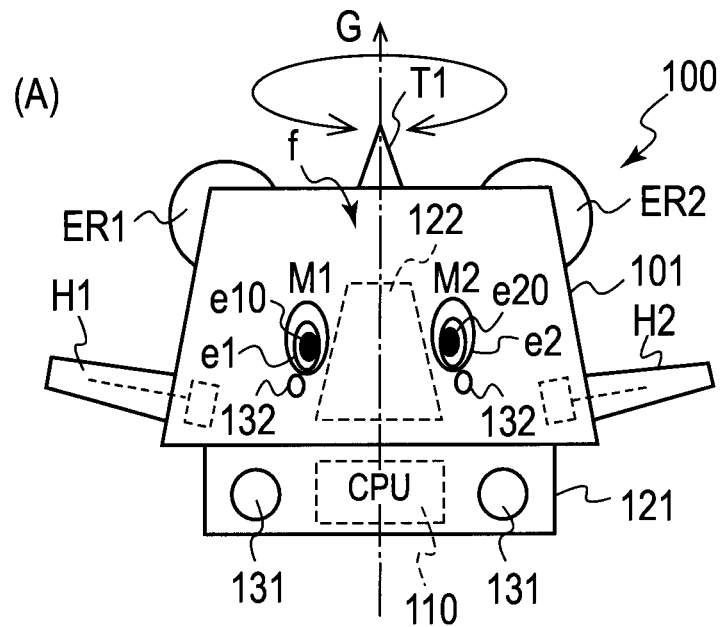
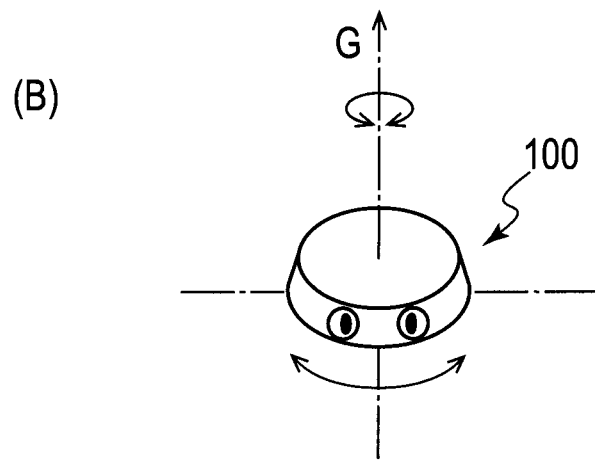
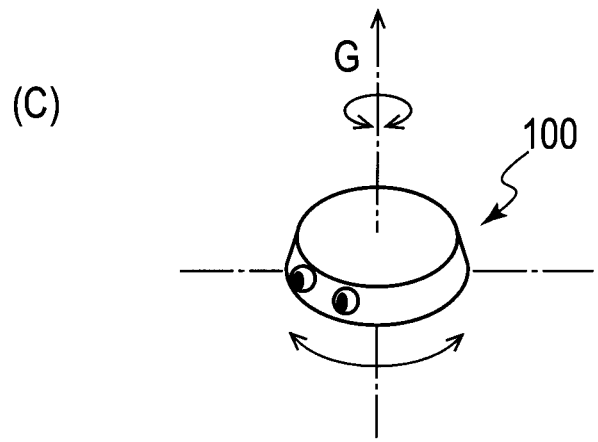

FIG. 10
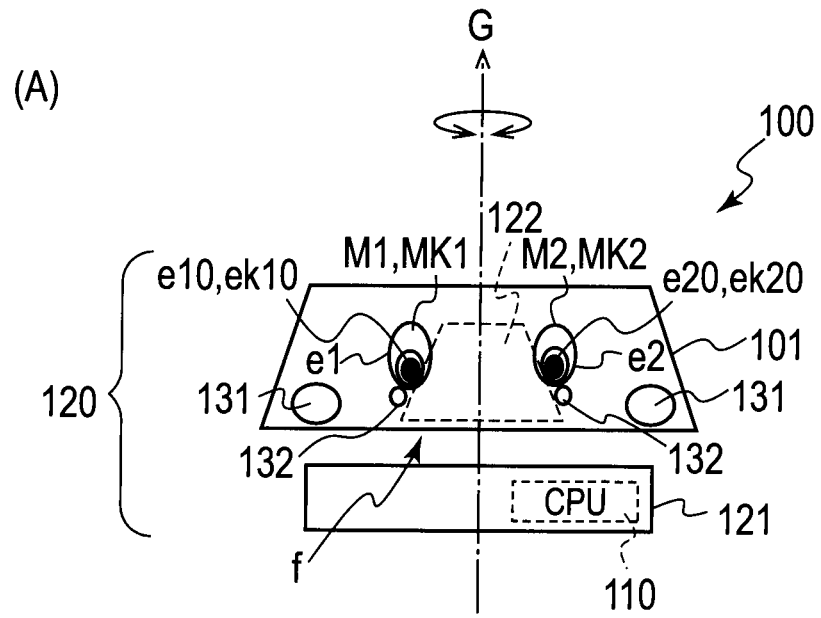
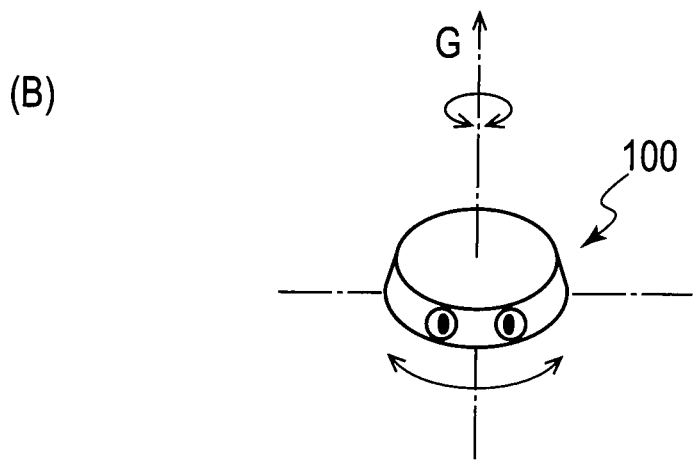
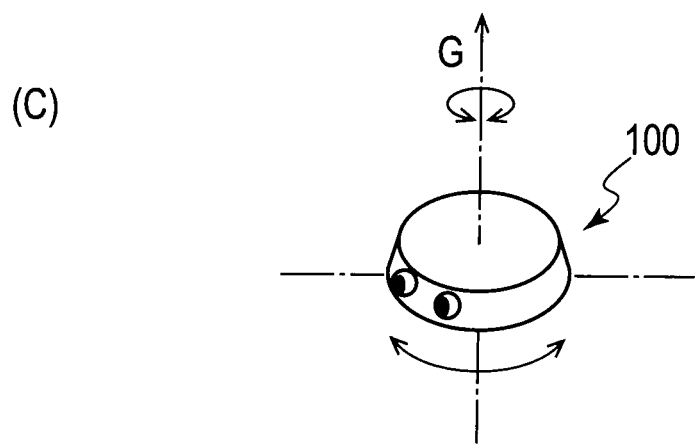

FIG. 18

| PRESENTATION INFORMATION | ACTION COMMAND | | |
|---|---|---|---|
| | ROTATION COMMAND | SPEECH COMMAND | LIGHT EMISSION COMMAND |
| NORMAL POSITION | 0° | NONE | |
| RIGHT TURN GUIDE | +45° | AT THE NEXT CORNER, PLEASE TURN TO THE RIGHT | LIGHT EMISSION |
| LEFT TURN GUIDE | −45° | AT THE NEXT CORNER, PLEASE TURN TO THE LEFT | LIGHT EMISSION |
| CAUTION TO RIGHT | +45° | SOMETHING IS APPROACHING | BLINKING LIGHT EMISSION |
| CAUTION TO LEFT | −45° | SOMETHING IS APPROACHING | BLINKING LIGHT EMISSION |
| PROHIBITION OF OPENING RIGHT DOORS | +45° | DON'T OPEN DOORS ON THIS SIDE. OTHERWISE, SOMETHING WILL HIT THE DOORS. | BLINKING LIGHT EMISSION |
| PROHIBITION OF OPENING LEFT DOORS | −45° | DON'T OPEN DOORS ON THIS SIDE. OTHERWISE, SOMETHING WILL HIT THE DOORS. | BLINKING LIGHT EMISSION |

FIG. 26

| PRESENTATION INFORMATION | ACTION COMMAND | | | |
|---|---|---|---|---|
| | ACTION WAIT COMMAND | ROTATION COMMAND | SPEECH COMMAND | LIGHT EMISSION COMMAND |
| NOT ECOLOGICAL DRIVING | START ACTION AFTER CONFIRMING DRIVER'S SPEECH | NONE | ACCELERATOR IS PRESSED DOWN A LITTLE BIT TOO MUCH. | NONE |
| PROHIBITION OF CUTTING INTO THE NEXT LANE | START ACTION AFTER CONFIRMING DRIVER'S SPEECH | +30, -30 | BE CAREFUL IN CUTTING INTO THE NEXT LANE. | NONE |

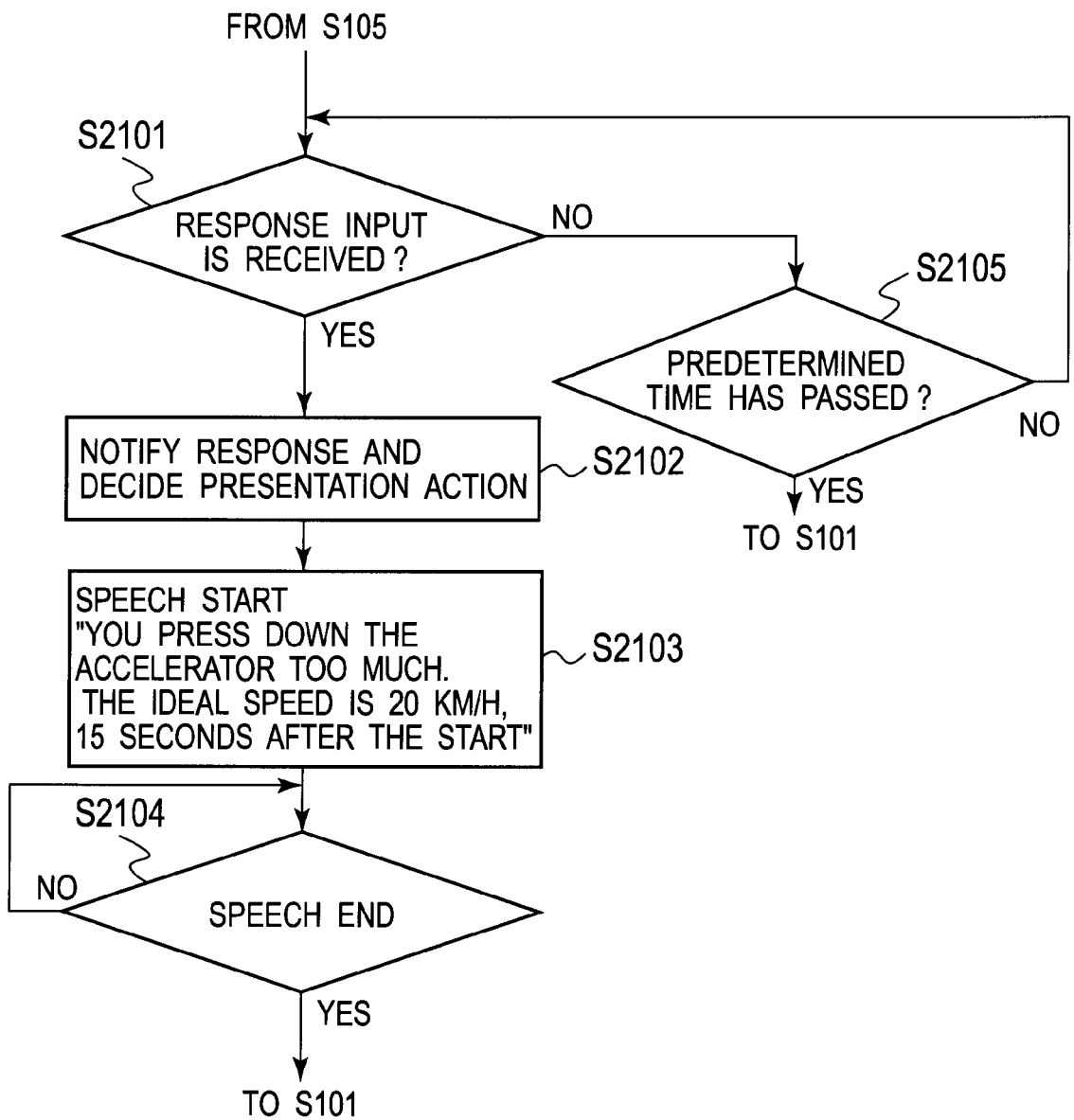

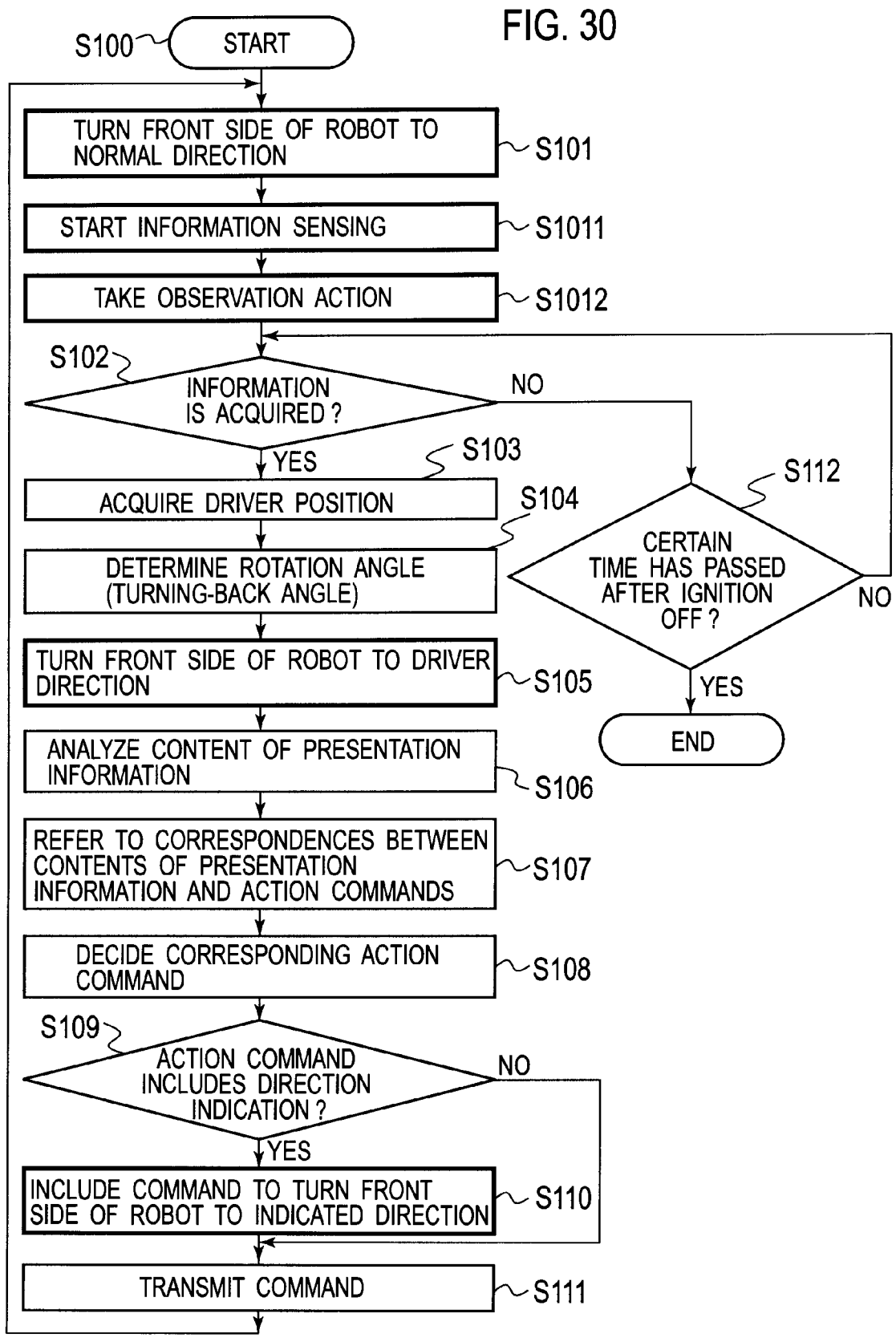

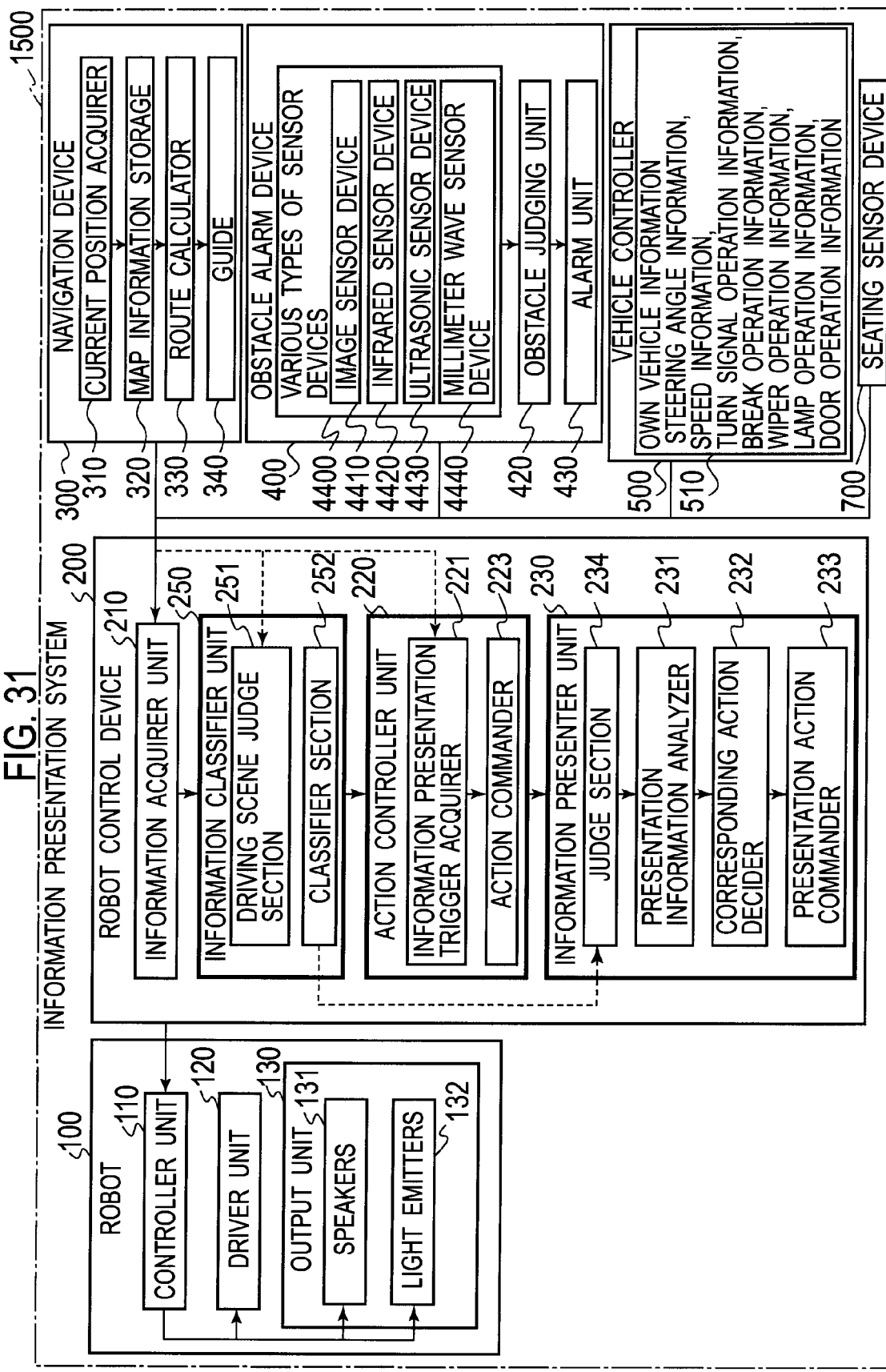

FIG. 32

| SENSING | VEHICLE INFORMATION | | DRIVING SCENE |
|---|---|---|---|
| | t1 INFORMATION | t2 INFORMATION | |
| NAVIGATION DEVICE | 10m BEFORE INTERSECTION | INTERSECTION PASSING IS COMPLETED | INTERSECTION |
| VEHICLE CONTROLLER | SPEED IS 10km/h OR LOWER | SPEED IS 10km/h OR HIGHER | |
| VEHICLE CONTROLLER | SPEED IS 30km/h OR HIGHER | TURN SIGNAL IS OFF | CUTTING INTO NEXT LANE (RIGHT) |
| VEHICLE CONTROLLER | RIGHT TURN SIGNAL | | |
| VEHICLE CONTROLLER | SPEED IS 30km/h OR HIGHER | TURN SIGNAL IS OFF | CUTTING INTO NEXT LANE (LEFT) |
| VEHICLE CONTROLLER | LEFT TURN SIGNAL | | |
| VEHICLE CONTROLLER | SPEED IS 0km/h OR HIGHER | SPEED IS 20km/h OR HIGHER | DRIVING START |

FIG. 33

| DRIVING SCENE | ALARM INFORMATION | |
|---|---|---|
| | CONTENT | CERTAINTY |
| INTERSECTION | SOMETHING IS APPROACHING FROM RIGHT | HIGH |
| | | LOW |
| | SOMETHING IS APPROACHING FROM LEFT | HIGH |
| | | LOW |
| | NOTHING IS APPROACHING FROM RIGHT OR LEFT | HIGH |
| | NOT SENSIBLE | — |
| CUTTING INTO NEXT LANE (RIGHT) | SOMETHING IS APPROACHING | HIGH |
| | | LOW |
| | NOTHING IS APPROACHING | HIGH |
| | NOT SENSIBLE | — |
| CUTTING INTO NEXT LANE (LEFT) | SOMETHING IS APPROACHING | HIGH |
| | | LOW |
| | NOTHING IS APPROACHING | HIGH |
| | NOT SENSIBLE | — |
| DRIVING START | THERE IS OBSTACLE | HIGH |
| | | LOW |

FIG. 34

| DRIVING SCENE | CONTENT OF ALARM INFORMATION | VEHICLE INFORMATION | INFLUENCE |
|---|---|---|---|
| INTERSECTION | SOMETHING IS APPROACHING FROM RIGHT | SPEED IS NOT 0km/h | LARGE |
| | | SPEED IS 0km/h | SMALL |
| | SOMETHING IS APPROACHING FROM LEFT | SPEED IS NOT 0km/h | LARGE |
| | | SPEED IS 0km/h | SMALL |

| DRIVING SCENE | CONTENT OF ALARM INFORMATION | VEHICLE INFORMATION | INFLUENCE |
|---|---|---|---|
| CUTTING INTO NEXT LANE | SOMETHING IS APPROACHING FROM RIGHT | RIGHT TURN SIGNAL IS ON | LARGE |
| | | LEFT TURN SIGNAL IS ON | SMALL |
| | SOMETHING IS APPROACHING FROM LEFT | LEFT TURN SIGNAL IS ON | LARGE |
| | | RIGHT TURN SIGNAL IS ON | SMALL |

FIG. 35

| DRIVING SCENE | CONTENT OF ALARM INFORMATION | | | INFLUENCE | CLASSIFICATION INFORMATION LEVEL |
|---|---|---|---|---|---|
| | CONTENT | | CERTAINTY | | |
| INTERSECTION | SOMETHING IS APPROACHING FROM RIGHT | | HIGH | LARGE | FIRST ALARM INFORMATION |
| | | | | SMALL | SECOND ALARM INFORMATION |
| | | | LOW | — | SECOND ALARM INFORMATION |
| | SOMETHING IS APPROACHING FROM LEFT | | HIGH | LARGE | FIRST ALARM INFORMATION |
| | | | | SMALL | SECOND ALARM INFORMATION |
| | | | LOW | — | SECOND ALARM INFORMATION |
| | NOTHING IS APPROACHING FROM RIGHT OR LEFT | | HIGH | — | SECOND ALARM INFORMATION |
| | NOT SENSIBLE | | — | — | SECOND ALARM INFORMATION |

FIG. 36

| DRIVING SCENE | SENSING ACTION |
|---|---|
| INTERSECTION | ROTATION ACTION +45° ~ -45° |
| CUTTING INTO NEXT LANE (RIGHT) | ROTATION ACTION +100° |
| CUTTING INTO NEXT LANE (LEFT) | ROTATION ACTION -100° |
| START DRIVING | ROTATION ACTION +180° ~ -180° |

FIG. 40

| SENSING INTERFERENCE INFORMATION | SENSING INTERFERENCE REASON | SPEECH TEXT | |
|---|---|---|---|
| | | SENSING INTERFERENCE REASON TEXT | CERTAINTY LEVEL REPORT TEXT |
| BRIGHTNESS IS AT PREDETERMINED VALUE OR LOWER | INSUFFICIENT BRIGHTNESS | BECAUSE IT IS DARK | SENSING HAS FAILED |
| BRIGHTNESS IS AT PREDETERMINED VALUE OR HIGHER | BACK LIGHT | BECAUSE IT IS DAZZLING | SENSING HAS FAILED |
| ULTRASONIC REFLECTION INTENSITY IS AT PREDETERMINED VALUE OR LOWER | POOR SENSING ENVIRONMENT | BECAUSE OF BAD WEATHER | SENSING HAS FAILED |
| RAINDROP SENSOR | | | |
| WIPER ON OPERATION | | | |
| REAR DEFOGGER ON OPERATION | | | |
| FOG LAMP ON OPERATION | | | |
| MATCHING RATE IS AT PREDETERMINED VALUE OR LOWER | UNCLEAR IMAGE | BECAUSE IT IS BLURRED | SENSING HAS FAILED |

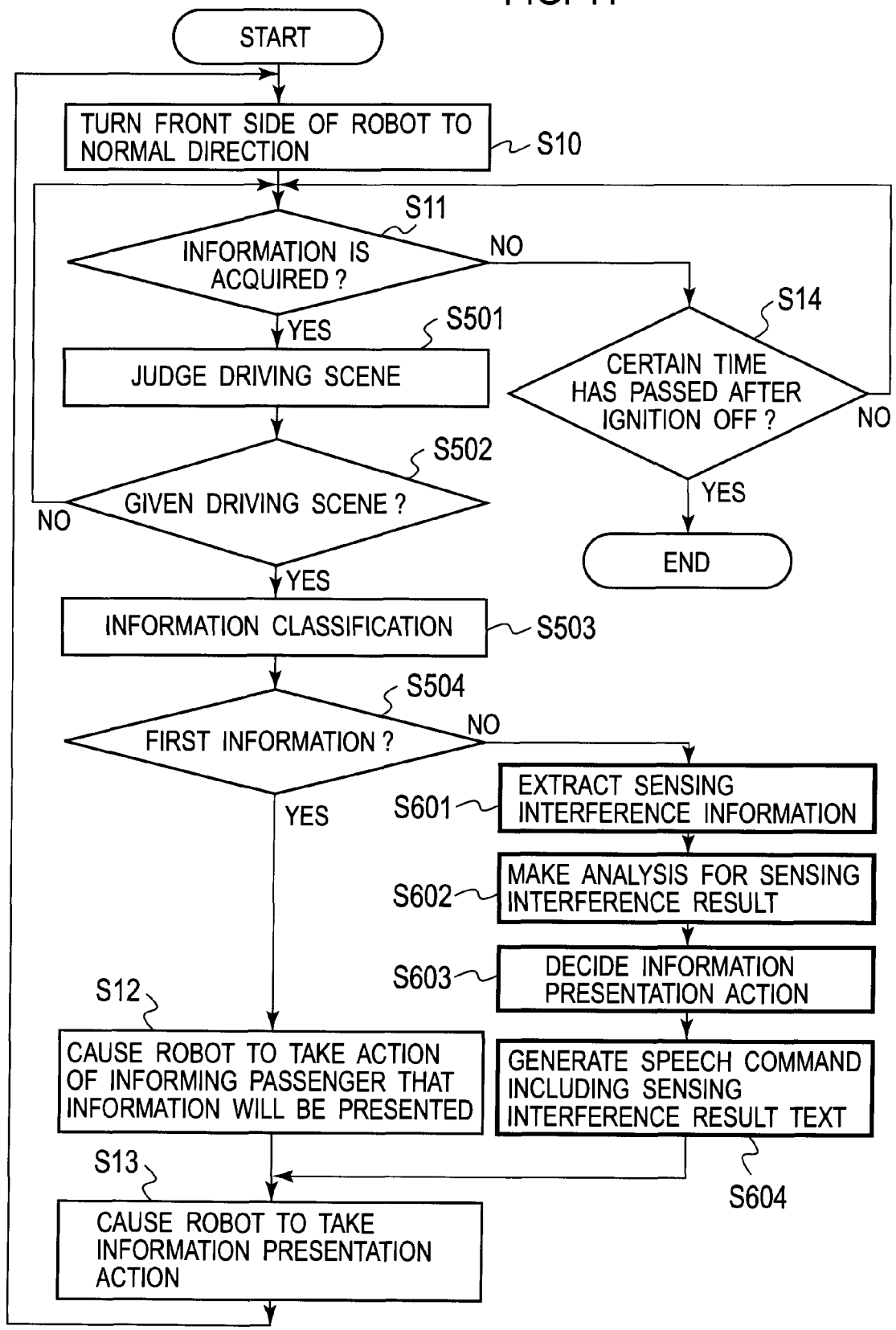

FIG. 45
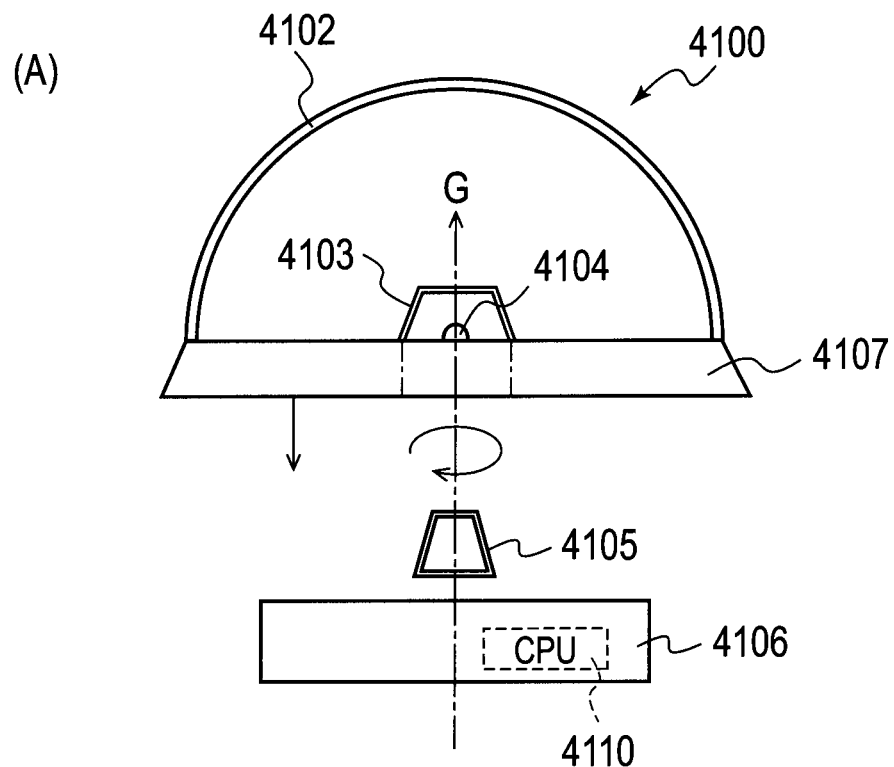
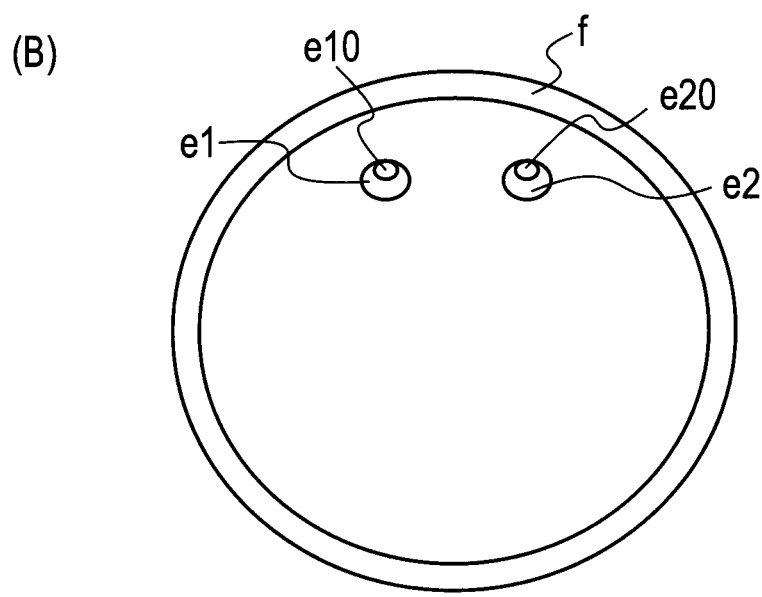

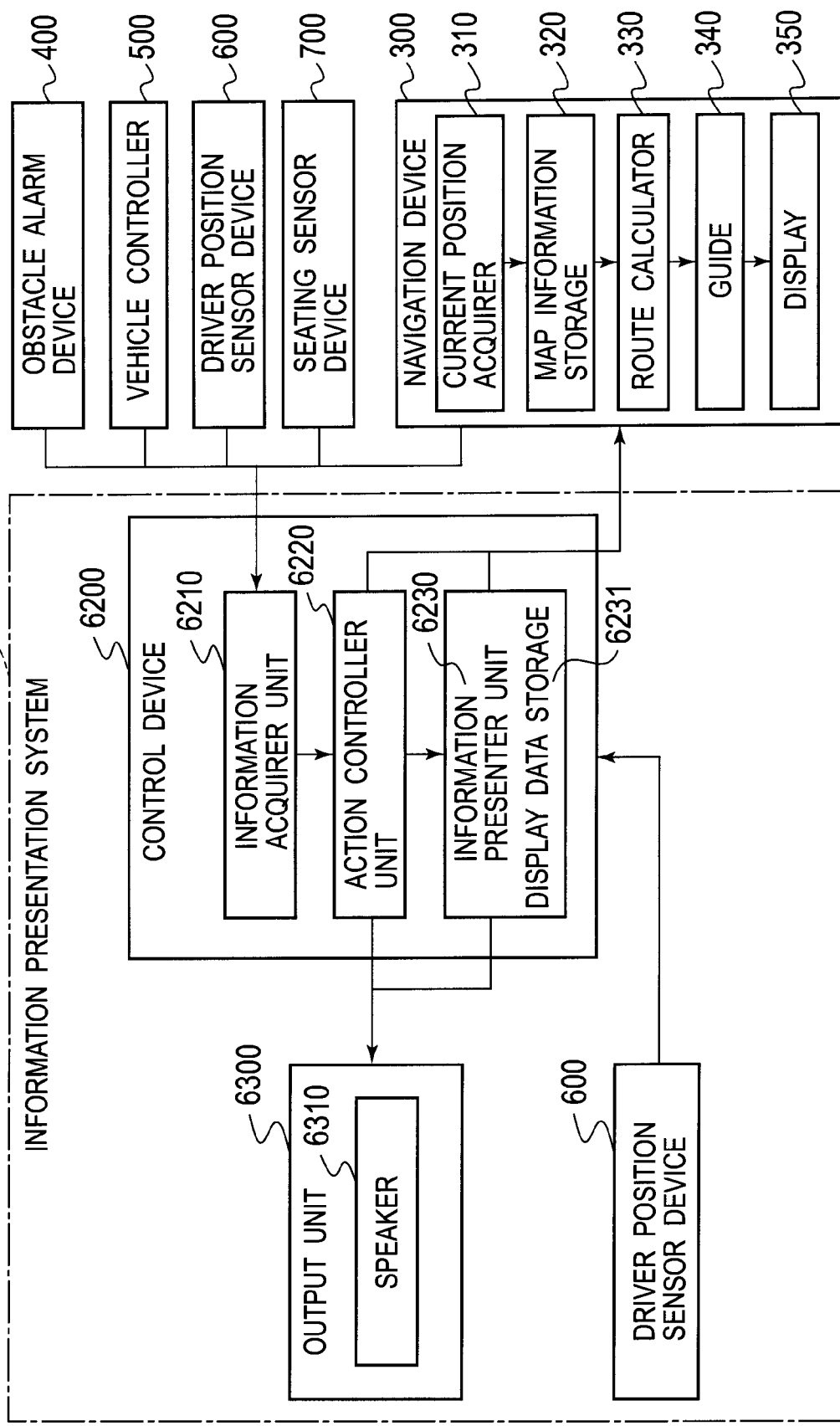

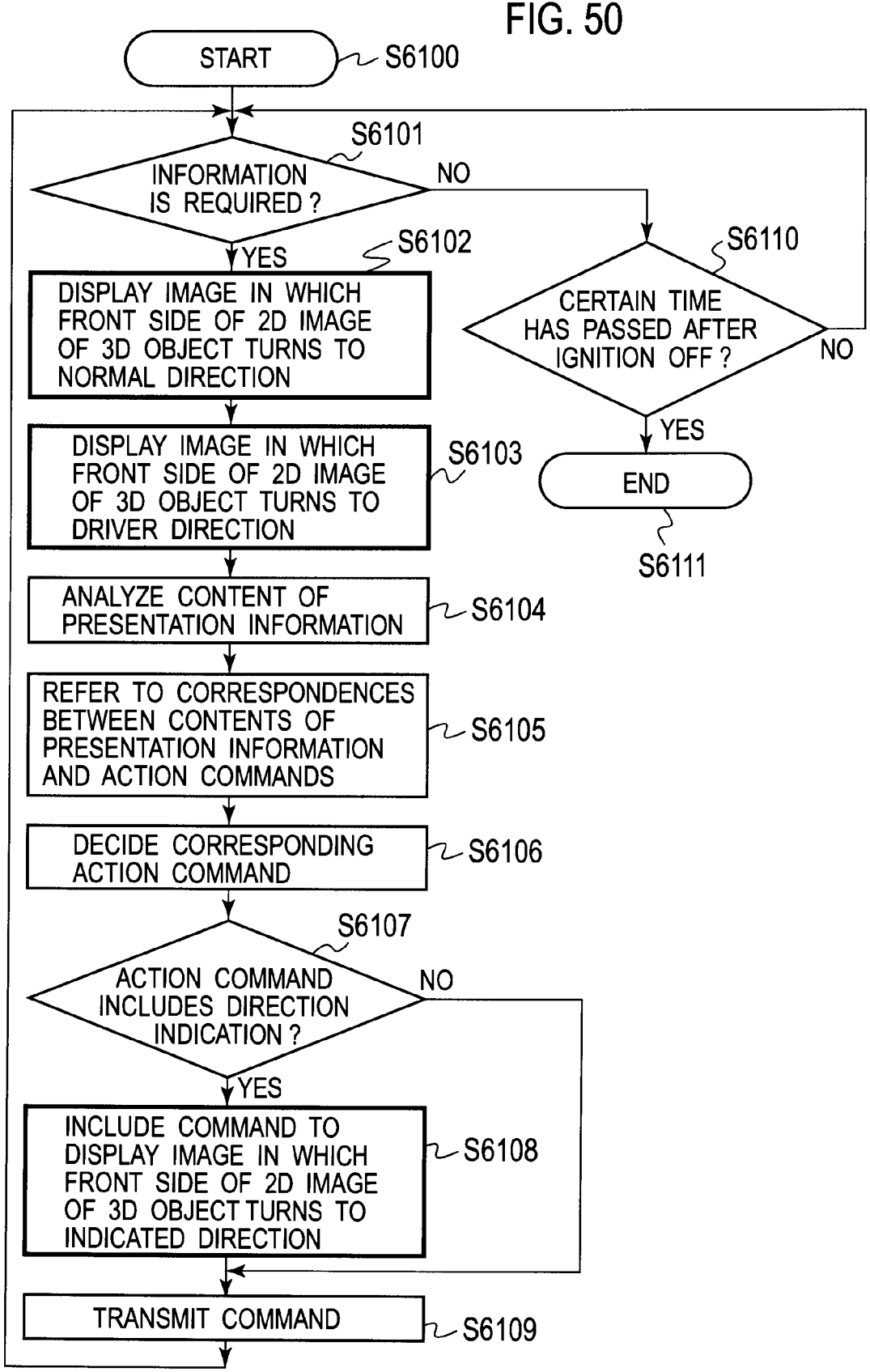

INFORMATION PRESENTATION SYSTEM

TECHNICAL FIELD

The present invention relates to an information presentation system configured to present information to a passenger.

BACKGROUND ART

Japanese Patent Application Publication No. 2002-104103 discloses an information presentation system including a three-dimensional object for alarm installed in a vehicle and configured to present information to a passenger by use of an action such as a gesture of the three-dimensional object.

SUMMARY OF INVENTION

In the case of the foregoing system, a passenger does not always pay attention to the three-dimensional object, and therefore may fail to recognize information presented in the beginning out of the whole information presented to the passenger.

The present invention has been made in consideration of the forgoing problem, and aims to allow a passenger to recognize information presented even in the beginning out of the whole information presented to the passenger.

An aspect of the present invention is an information presentation system including a display member mounted on a vehicle and representing an action object configured to take an action, and a control device configured to control the display member. The control device includes an information acquirer configured to acquire information generated according to a vehicle condition, an action controller configured to cause the display member to show the action object to a passenger on the vehicle in response to the information acquired by the information acquirer, the action object taking an advance notice action for informing the passenger that the information will be presented, and an information presenter configured to cause the display member to present the information after showing the action object taking the advance notice action.

BRIEF DESCRIPTION OF DRAWINGS

FIG. 5 is a diagram for explaining a configuration and operation of a robot according to the first embodiment.

FIG. 8 is a diagram for explaining still another configuration and action of the robot according to the first embodiment.

FIG. 10 is a diagram for explaining a configuration and action of a robot according to the second embodiment.

FIG. 18 is a diagram showing an example of correspondences between contents of presentation information and action commands.

FIG. 26 is a diagram showing an example of correspondence information between presentation information and action commands.

FIG. 27 is a flow chart diagram showing processing for presenting warning information (presentation information) related to environment-friendly driving.

FIG. 30 is a flow chart diagram showing processing of the information presentation system in the fourth embodiment.

FIG. 31 is a block configuration diagram of an information presentation system in a fifth embodiment.

FIG. 32 is a diagram showing an example of correspondences between vehicle information and driving scenes.

FIG. 33 is a diagram showing an example of contents of alarm information and certainty (accuracy).

FIG. 34 is a diagram showing an example of correspondences between a combination of contents of alarm information and vehicle information, and an influence level.

FIG. 35 is a diagram showing an example of correspondences among alarm information, influence level and classification for each driving scene.

FIG. 36 is a diagram showing an example correspondences between driving scenes and sensing actions.

FIG. 40 is a diagram showing an example of correspondences among sensing interference information, sensing failure reasons and speech texts.

FIG. 41 is a flow chart diagram for explaining an overview of processing of the information presentation system in the sixth embodiment.

FIG. 45(A) is a diagram showing an overview of a three-dimensional shaped display device in the eighth embodiment, FIG. 45(B) is a plan view of the three-dimensional shaped display device.

FIG. 49 is a block configuration diagram of an information presentation system in a tenth embodiment.

FIG. 50 is a flow chart diagram showing processing of the information presentation system in the tenth embodiment.

DESCRIPTION OF EMBODIMENTS

Hereinafter, embodiments of the present invention will be described based on the drawings.

First Embodiment

A configuration overview of an information presentation system according to this embodiment is described.
[System Overview]

Figure 1:
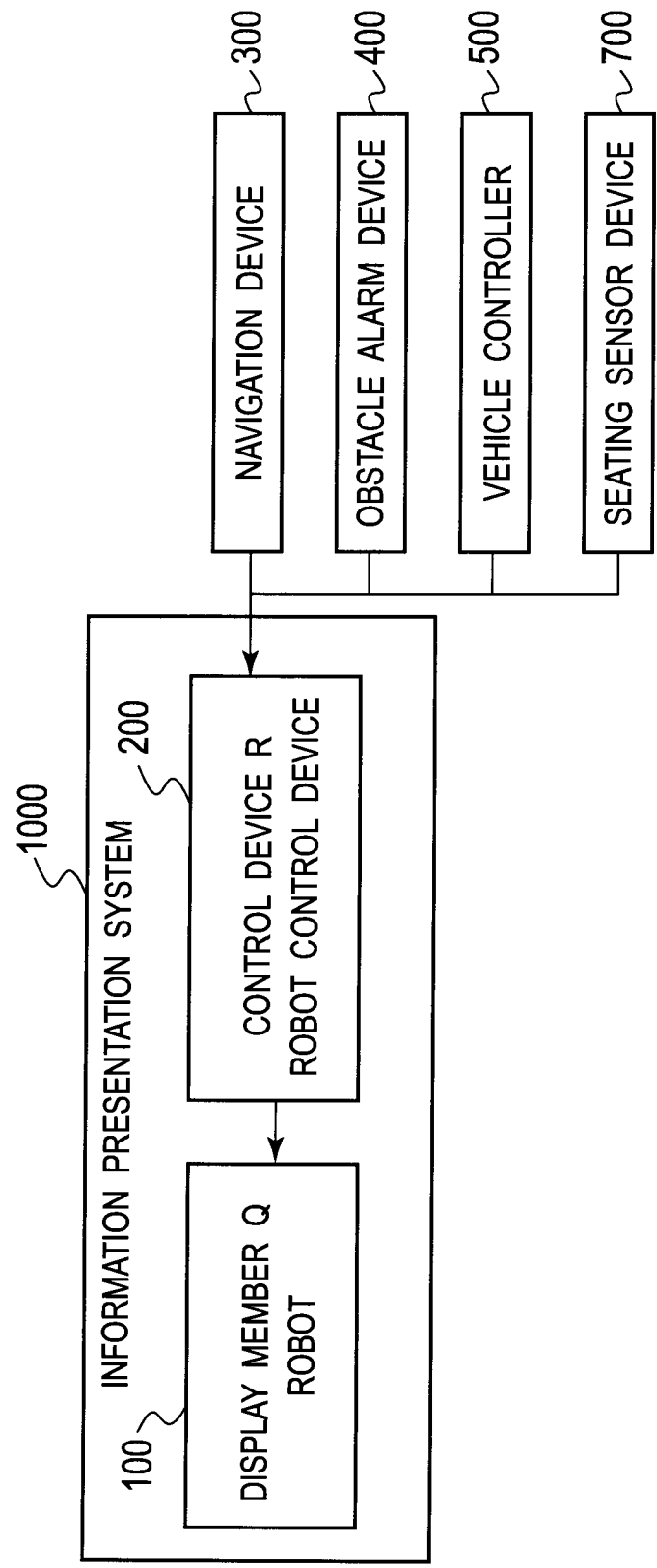
FIG. 1 is a block configuration diagram showing an overview of an information presentation system in a first embodiment.

As shown in FIG. 1, an information presentation system 1000 in this embodiment includes a display member Q and a control device R.

The display member Q is a robot 100 that is made to look like an animal or a human, for example. The control device R causes the robot 100 to take a predetermined action to present particular information to a passenger, or to inform the passenger in advance that the particular information will be presented.

The control device R includes a robot control device 200 configured to control the robot 100.

The information presentation system 1000 is connected to a navigation device 300, an obstacle alarm device 400, a vehicle controller 500, and a seating sensor device 700 through a wired or wireless communication unit in such a manner as to be capable of exchanging information therebetween.

Figure 2:
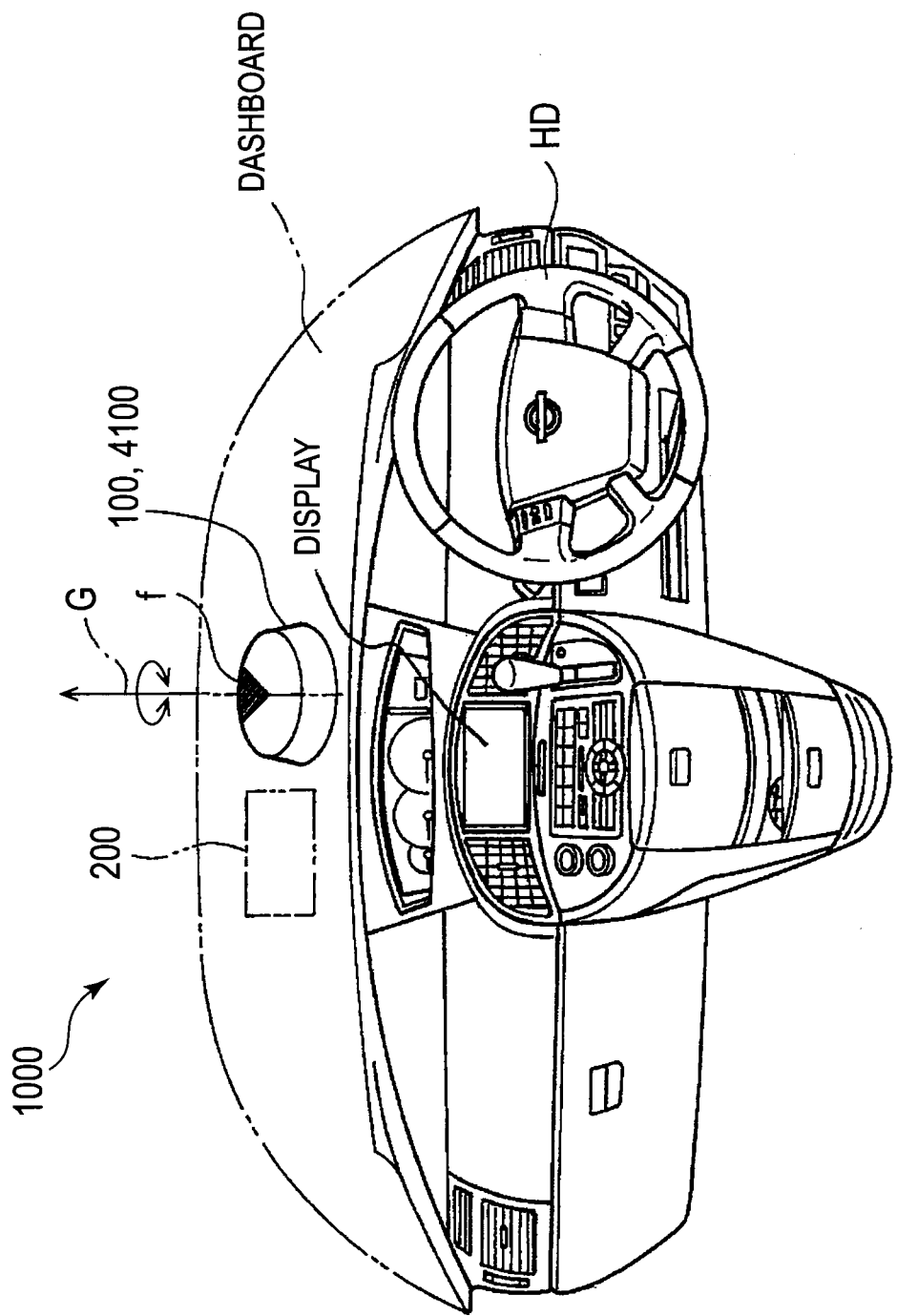
FIG. 2 is a diagram showing an installation example of the information presentation system in the first embodiment.
Figure 3:
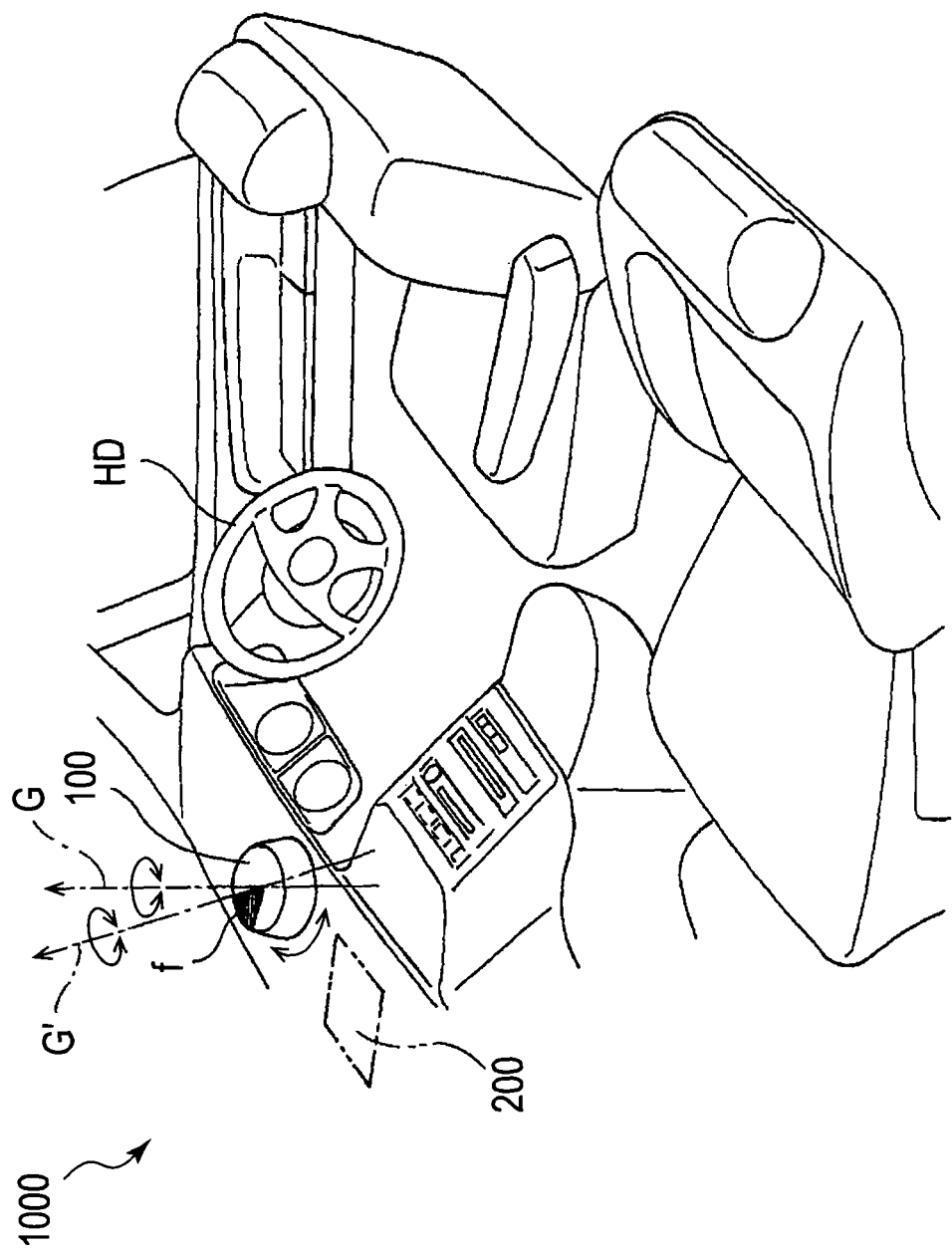
FIG. 3 is a diagram showing an installation example of the information presentation system in the first embodiment.

FIG. 2 and FIG. 3 are diagrams showing an installation example of the information presentation system 1000 according to this embodiment.

As shown in FIG. 2 and FIG. 3, the robot 100 is installed on an upper surface of a dashboard of a vehicle.

The installation position of the robot 100 may be any position being connectable to the robot control device 200 and the like through the wired or wireless communication unit, and being within a field of view of a passenger, and may be an A pillar (front pillar), for example.

Figure 4:
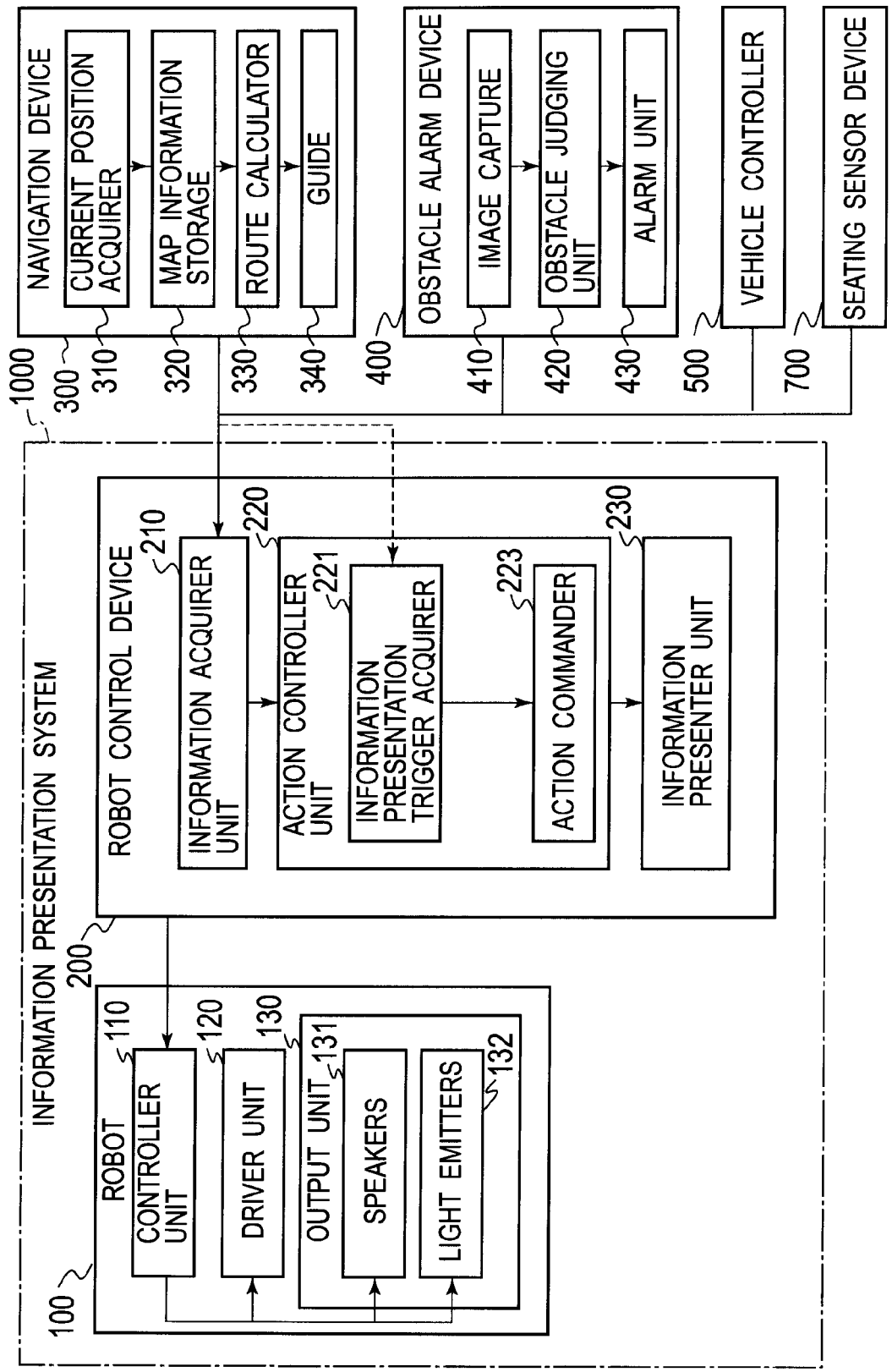
FIG. 4 is a block configuration diagram of the information presentation system in the first embodiment.

Next, a configuration of the robot 100 is described. As shown in FIG. 4, the robot 100 includes a controller unit 110, a driver unit 120 and an output unit 130.

The controller unit 110 controls the driver unit 120 and the output unit 130 in accordance with control of the robot control device 200.

The driver unit 120 implements multiple types of actions such as a rotation action, a speak action and a light emission action, for example, and multiple patterns of actions each including any combination of the above actions. Here, each type of action or each pattern of actions is associated with alarm information on an alarm target object sensed on a vehicle side.

The output unit 130 includes speakers 131 and light emitters 132, and is configured to present (output) the alarm information on an alarm target object sensed on the vehicle side.

The speakers 131 read aloud the alarm information by use of a TTS (Text To Speech) function, on the basis of an action command from the robot control device 200.

The light emitters 132 take a light emission action based on an action command from the robot control device 200. A lamp or an LED may be provided as each of the light emitters 132. The light emitters 132 can be provided on a front side f of the robot 100.

Figure 6:
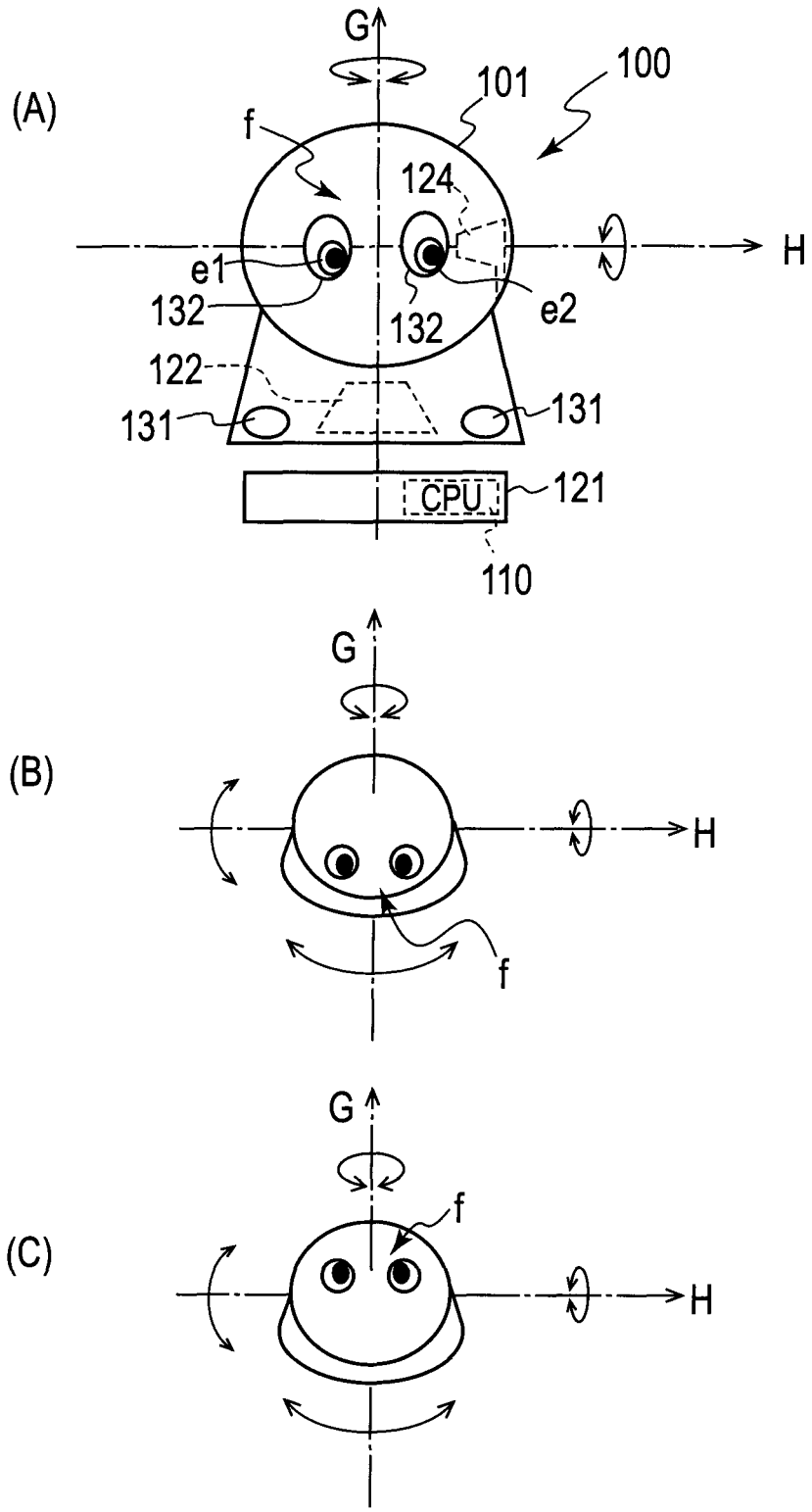
FIG. 6 is a diagram for explaining another configuration and action of the robot according to the first embodiment.

Here, the configuration of the robot 100 is described in detail by using FIG. 5 and FIG. 6.

Note that the front side f is defined as such that, when the robot 100 is designed to look like a human or an animal, for example, the front side f is a face portion of the robot 100 as shown in FIG. 5(A). The robot 100 can be made like a human or an animal by being provided with eye members e1, e2, which look like human eyes, in particular portions of the robot 100. The side on which these eye members e1, e2 are provided is the front side f.

The light emitters 132 can be provided near the respective eye members e1, e2.

The light emitters 132 can be provided inside the respective eye members e1, e2. By emitting light from the eyes e1, e2 of the robot 100 facing in a certain direction, the robot 100 can draw attention from the passenger, and thereby can present a pointing direction. A specific method of light emission control of the light emitters 132 is not particularly limited and any widely known method may be used.

Next, as shown in FIG. 5, the driver unit 120 includes a base portion 121 with which the robot 100 is fixed to or engaged with the dashboard, a first axis G that extends in a predetermined direction and is a rotational axis of the robot 100, and a motor mechanism 122 configured to rotate a robot main body 101 about the first axis G as the rotational axis at any rotation speed. The first axis G and the motor mechanism 122 can be formed through application of a generally known instrumental technique, and the explanation thereof is omitted here.

As shown in FIGS. 5(B) and (C), when the motor mechanism 122 drives the robot 100, the robot 100 takes a rotation action about the first axis G. In this way, by rotating the robot 100 about the first axis G by a predetermined angle, the driver unit 120 can cause the robot 100 to take an action of turning the front side f thereof to any direction.

In addition, as shown in FIGS. 6(A) to (C), the driver unit 120 of the robot 100 may include a second axis H that extends in a direction different from the first axis G, and a motor mechanism 124 configured to rotate the robot main body 101 about the second axis H as a rotational axis. The motor mechanism 124 is of a generally known instrumental technique, and the explanation thereof is omitted here.

Detailed description is provided for the rotation action of the robot 100 provided with the second axis H extending in the direction different from the first axis G. The robot 100 can be caused to change the facing direction of the front side f thereof according to a rotation angle about the second axis H. The facing direction of the front side f of the robot 100 can be defined by the rotation angle about the second axis H with respect to the horizontal direction (as 0°). When causing the robot 100 to indicate a downward direction of the vehicle such as around wheels, the driver unit 120 rotates the robot 100 about the second axis H by a predetermined angle (for example, −30°) downward from the horizontal direction. Instead, when causing the robot 100 to indicate a direction of a road surface at a position forward from the vehicle by a predetermined distance X in a traveling direction, the driver unit 120 rotates the robot 100 about the second axis H by a predetermined angle (for example, −15°) downward from the horizontal direction. In another case, when causing the robot 100 to indicate a direction of a road surface at a position forward from the vehicle by a predetermined distance Y (Y>X) in the traveling direction, the driver unit 120 rotates the robot 100 about the second axis H by a predetermined angle (for example, +5°) upward from the horizontal direction. In this way, by rotating the robot 100 about the second axis H by a predetermined angle, the driver unit 120 can turn the front side f of the robot 100 to any direction.

Next, the robot control device 200 is described.

As shown in FIG. 4, the robot control device 200 includes an information acquirer unit 210, an action controller unit 220 and an information presenter unit 230.

The information acquirer unit 210 acquires information generated according to vehicle conditions from the navigation device 300, the obstacle alarm device 400, the vehicle controller 500 and the seating sensor device 700.

Note that the information generated according to the vehicle conditions at least includes route guide information presented by the navigation device 300, obstacle information presented by the obstacle alarm device 400, speed information, energy level information and time information presented by the vehicle controller 500, and a passenger seating state presented or outputted by the seating sensor device 700.

The navigation device 300 includes a current position acquirer 310, a map information storage 320, a route calculator 330 and a guide 340.

The current position acquirer 310 detects the current position of its own vehicle by using a GPS function and the like.

The map information storage 320 stores electronic map information.

The route calculator 330 performs route calculation and route guide on the basis of the current position of its own vehicle and the electronic map information.

The guide 340 transmits guide information to the outside.

When its own vehicle comes close to a guide point where a route guide should be provided, the navigation device 300 outputs the route guide information as the presentation information to the robot control device 200.

The obstacle alarm device 400 includes an image capture 410, an obstacle judging unit 420 and an alarm unit 430.

The image capture 410 is an infrared camera, a CCD camera, or the like, and captures images of the surroundings of the vehicle.

The obstacle judging unit 420 judges the presence of an obstacle, a positional relationship between an obstacle and the vehicle, an approach of an obstacle, a danger degree of an obstacle, and the like by using widely known methods.

The alarm unit 430 transmits the presentation information on the obstacle to the outside.

The obstacle judging unit 420 acquires a seating state of each of vehicle seats from the seating sensor device 700, which will be described later, and senses an obstacle corresponding to the seating state. For example, only when a passenger is seated on a rear seat behind a driver seat, an obstacle around a right backdoor can be reported for alarming.

The vehicle controller 500 acquires information on the vehicle (vehicle information). The information on the vehicle includes steering angle information, speed information, break operation information and vehicular gap information.

The vehicle controller 500 transmits the information on the vehicle to the robot control device 200 or the other on-vehicle devices 300, 400, 700 in predetermined cycles.

The seating sensor device 700 senses whether or not someone is seated on each of the vehicle seats (a driver seat, an assistant driver's seat and rear seats) in a widely known method. This embodiment uses pressure sensors, but the method is not limited to this.

The seating sensor device 700 transmits seating information to the robot control device 200 or the other on-vehicle devices in predetermined cycles.

Next, using Table 1, there is shown an example of correspondences between the information on the vehicle (vehicle information) acquired by the information acquirer unit 210 from the navigation device 300, the obstacle alarm device 400, the vehicle controller 500 and the seating sensor device 700, and the presentation information to be outputted by the robot 100.

TABLE 1

| Acquired vehicle information | Presentation information |
| --- | --- |
| The current position is a navigation guide (right) point | Right turn guide |
| The current position is a navigation guide (left) point | Left turn guide |
| An intersection for right or left turn comes near<br>Something is approaching from the right | Caution to the right |
| An intersection for right or left turn comes near<br>Something is approaching from the left | Caution to the left |
| IGN off<br>A passenger on a rear seat is sensed<br>An obstacle is sensed (right) | Prohibition of opening right doors |
| IGN off<br>A passenger on a rear seat is sensed<br>An obstacle is sensed (left) | Prohibition of opening left doors |
| IGN off<br>A passenger on a rear seat is sensed<br>An obstacles are sensed (right and left) | Prohibition of opening right and left doors |

The action controller unit 220 controls the robot 100 so that the robot 100 will take an advance notice action (also referred to as "a contact action" below) of informing a driver that information will be presented, in response to the acquisition of the presentation information by the information acquirer unit 210 and/or the generation of the presentation information (triggered by a signal indicating the acquisition of the presentation information and/or a signal indicating the generation of the presentation information).

The advance notice action (contact action) includes an action for making a relationship between the robot 100 and a passenger, such as an action in which the robot 100 makes contact with a passenger or an action in which the robot 100 speaks to a passenger.

As shown in FIG. 4, the action controller unit 220 includes an information presentation trigger acquirer 221 and an action commander 223.

The information presentation trigger acquirer 221 acquires information indicating that the information acquirer unit 210 acquires the presentation information or information indicating the generation of the presentation information.

Each of these types of information is an event (trigger) in response to which the action controller unit 220 causes the robot 100 to take the advance notice action.

The action commander 223 outputs a control signal to the driver unit 120 of the robot 100, the control signal being for causing the robot 100 to rotate so that the front side f of the robot 100 can face toward a passenger aboard the vehicle, as an advance notice action informing that the robot 100 will present information to the driver.

The information presenter unit 230 causes the robot 100 to take an information presentation action, after the action controller unit 220 causes the robot 100 to take the advance notice action informing that the information will be presented.

The presentation action includes, for example, a presentation action in which the robot 100 turns the front side f to a direction when the information to be presented includes the direction, a presentation action in which the robot 100 moves in a direction when the information to be presented includes the direction, a presentation action of outputting voice information through the speakers 131, and the like.

[Advance Notice Action Control and Specific Information Presentation Action Control]

Figure 7:
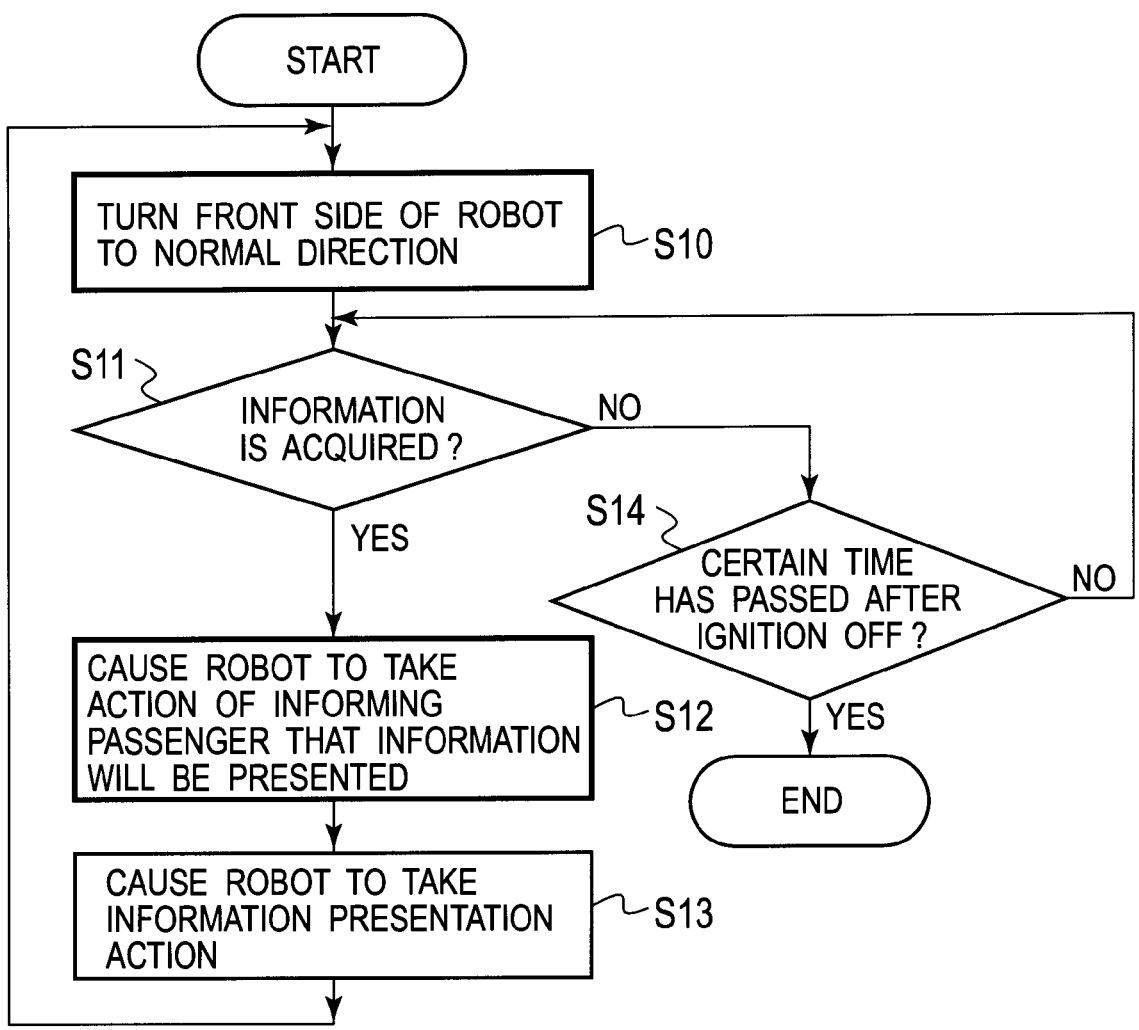
FIG. 7 is a flow chart diagram for explaining processing of the information presentation system in the first embodiment.

FIG. 7 is a flow chart diagram showing a processing procedure of the information presentation system 1000 in the first embodiment.

In step S10, upon startup of the information presentation system 1000 (ignition ON), the controller unit 110 of the robot 100 controls the driver unit 120 so that the robot 100 will turn to a normal direction.

The normal direction is such a direction that the robot 100 faces forward in a vehicle traveling direction, that is, a direction in which a passenger usually looks at. Here, the action of turning the robot 100 to the normal direction at the startup may be controlled by the controller unit 110 of the robot 100 or the robot control device 200 on a vehicle side.

In step S11, the information acquirer unit 210 acquires the presentation information or the information indicating the generation of the presentation information from the navigation device 300, the obstacle alarm device 400, the vehicle controller 500, and the seating sensor device 700. Then, the information acquirer unit 210 issues output indicating the acquisition to the action controller unit 220.

When the information acquirer unit 210 does not acquire the information in step S11, the processing advances to step S14. Then, the robot control device 200 terminates the processing immediately after ignition OFF or upon lapse of a predetermined time after the ignition OFF in step S14.

On the other hand, when the information acquirer unit 210 acquires the presentation information in step S11, the processing advances to step S12. In step S12, after acquiring the information, the action controller unit 220 causes the robot 100 to take the advance notice action for informing the passenger that information will be presented. For example, the action controller unit 220 causes the robot 100 to take a rotation action.

In step S13, the information presenter unit 230 outputs an action command to the robot 100 to command the robot 100 to take the information presentation action according to the acquired presentation information.

Upon completion of the presentation action, the processing turns back to step S10, and the front side f of the robot 100 is turned to the normal direction. Turning the robot 100 to the normal direction can increase a movement amount of the robot 100 in taking the next advance notice action.

According to the above description, the action controller unit 220 causes the robot 100 to take the advance notice action for informing the passenger that information will be presented, and then the information presenter unit 230 causes the robot 100 to take the presentation action for presenting the information. Thereby, the information can be presented after the user recognizes that the information presentation will be started.

Accordingly, the passenger can be made aware that the information will be presented, and thereby the information can be presented while drawing attention of the passenger. The passenger can be thus well prepared to recognize the presented information from the beginning, and therefore can recognize the information presented even in the beginning out of the whole presented information.

Instead of the configuration shown in the above embodiment, eyeball members e10 and e20, for example, may be also provided in center portions of the respective eye members e1, e2 provided to the robot 100, as shown in FIGS. 8(A) to (C). The eyeball members e10 and e20 each include an eyeball driver mechanism (not illustrated) configured to move the eyeball member e10 or e20 to the right and left, up and down, and rotationally according to the action command from the robot control device 200. A specific configuration of the eyeball driver mechanism is not particularly limited, and any widely known mechanism can be used.

When the eyeball members e10 and e20 are provided in the center portions of the eye members e1, e2 provided to the robot 100 as described above, the robot 100 can take an action similar to a blink of the eyes of a human or an animal. This makes the passenger feel a sense of affinity more.

In addition, the eye members e1, e2 may be provided with eyelid members M1, M2 that open and close the eyes e1, e2 by moving up and down. The eyelid members M1, M2 each include an eyelid driver mechanism configured to move the eyelid members M1, M2 up and down according to the action command from the robot control device 200. A specific configuration of the eyelid driver mechanism is not particularly limited, and any widely known mechanism can be used.

When the eyeball members e10, e20 and the eyelid members M1, M2 are provided in the eye members e1, e2 provided to the robot 100 as described above, the robot 100 can be made more human-like or animal-like. This makes the passenger feel a sense of affinity further more.

Moreover, in order to make the direction of the robot 100 more distinct, the robot 100 may be provided with, for example, a animal-horns-like projection, a tail-like projection, ear-like projections ER1, ER2, animal-hand/leg-like projections, and a driver mechanism (not illustrated) configured to drive each of the projections.

When the robot 100 is provided with the above projections as described above, the passenger is allowed to distinguish the front side and the back side of the robot 100 more clearly. Additionally, by moving the above projections, the robot 100 make the passenger recognize the action of the robot 100 even when the robot 100 is positioned with its back facing toward the passenger.

Furthermore, a head portion of the robot 100 in this embodiment may be provided with a horn member T1.

The horn member T1 includes a horn driver mechanism (not illustrated) configured to move a tip end of the horn member T1 to the right and left, back and forth, and rotationally according to the action command from the robot control device 200. A specific configuration of the horn driver mechanism is not particularly limited, and any widely known mechanism can be used.

When the horn member T1 is provided on the upper surface of the robot 100 as described above, the robot 100 can make the passenger recognize the pointing direction more easily, by pointing the horn member T1 to the pointing direction, for example.

Moreover, a tail member, although not being illustrated, may also be provided to a back surface of the robot 100. As similar to the foregoing horn member T1, the tail member also includes a tail driver mechanism (not illustrated) configured to move the tail member to the right and left, back and forth, and rotationally according to the action command from the robot control device 200. A specific configuration of the tail driver mechanism is not particularly limited, and any widely known mechanism can be used.

When the tail member is provided to the robot 100 as described above, the robot 100 can present the pointing direction more specifically, by pointing the tail member to the pointing direction.

Furthermore, as shown in FIGS. 8(A) to (C), the robot 100 may be provided with hand members H1, H2 like human hands, and a hand driver mechanism (not illustrated) configured to move a tip end of each of the hand members H1, H2 to the right and left, up and down, and rotationally according to the action command from the robot control device 200. A specific configuration of the hand driver mechanism is not particularly limited, and any widely known mechanism can be used.

When the hand members are provided to the robot 100 as described above, the robot 100 can present the pointing direction more specifically, by pointing the tip end of any one of the hand members to the pointing direction, for example.

In addition, the light emitters 132 may be caused to emit light in conjunction with the action of each of the above projections.

When the light emitters 132 emits light in conjunction with the action of each of the above projection as described above, the movement of the projection can draw more attention of the passenger.

Second Embodiment

An information presentation system 1000 of a second embodiment presents information and after rotating a robot 100 and causing the robot 100 to take the advance notice action by turning the front side f to the passenger on a vehicle.

Figure 9:
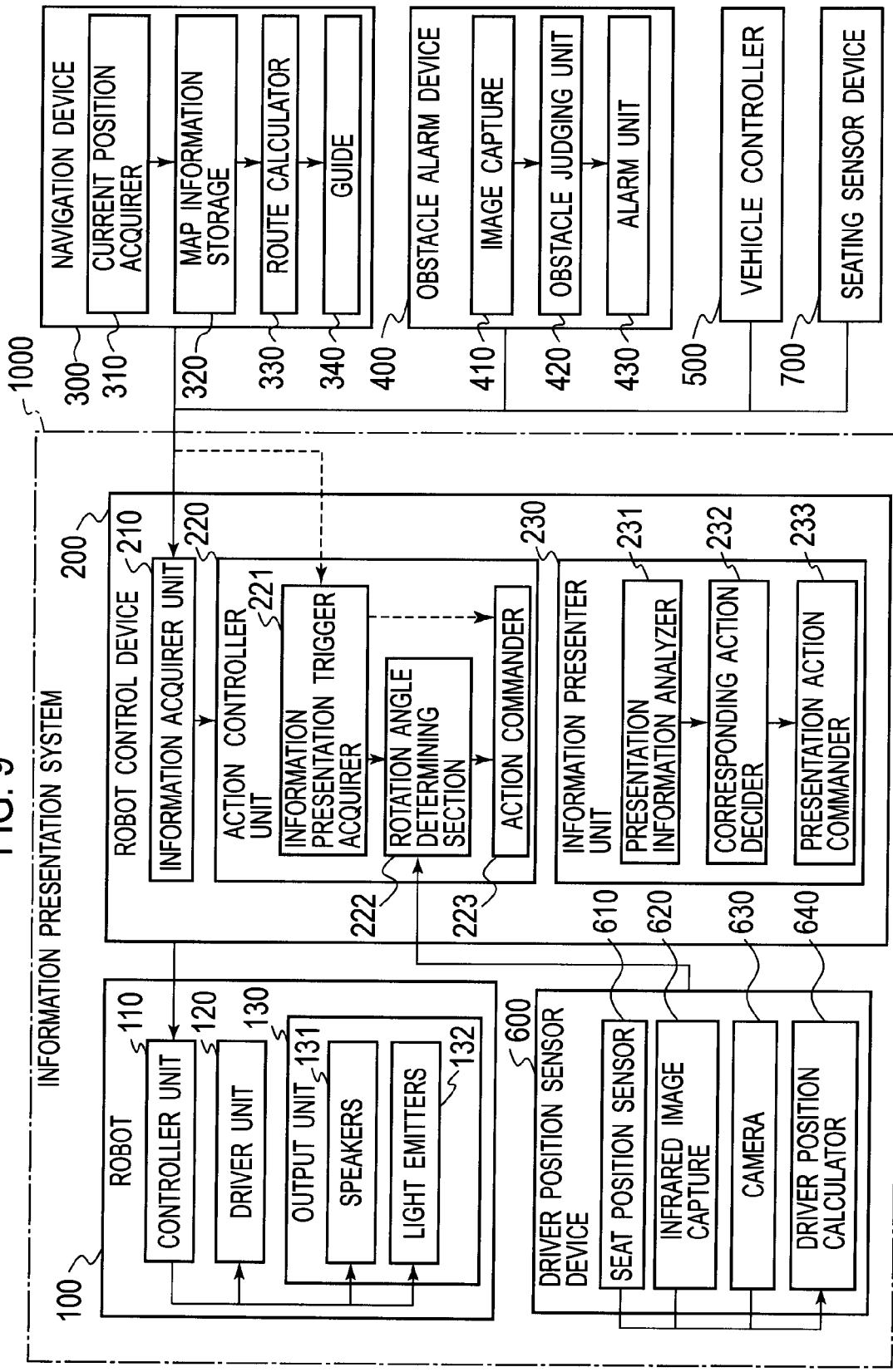
FIG. 9 is a block configuration diagram showing an overview of an information presentation system in a second embodiment.

As shown in FIG. 9, the information presentation system 1000 includes the robot 100, a robot control device 200 and a driver position sensor device 600.

Moreover, as shown in FIG. 9, the robot 100 includes a controller unit 110, a driver unit 120 and an output unit 130.

Figure 11:
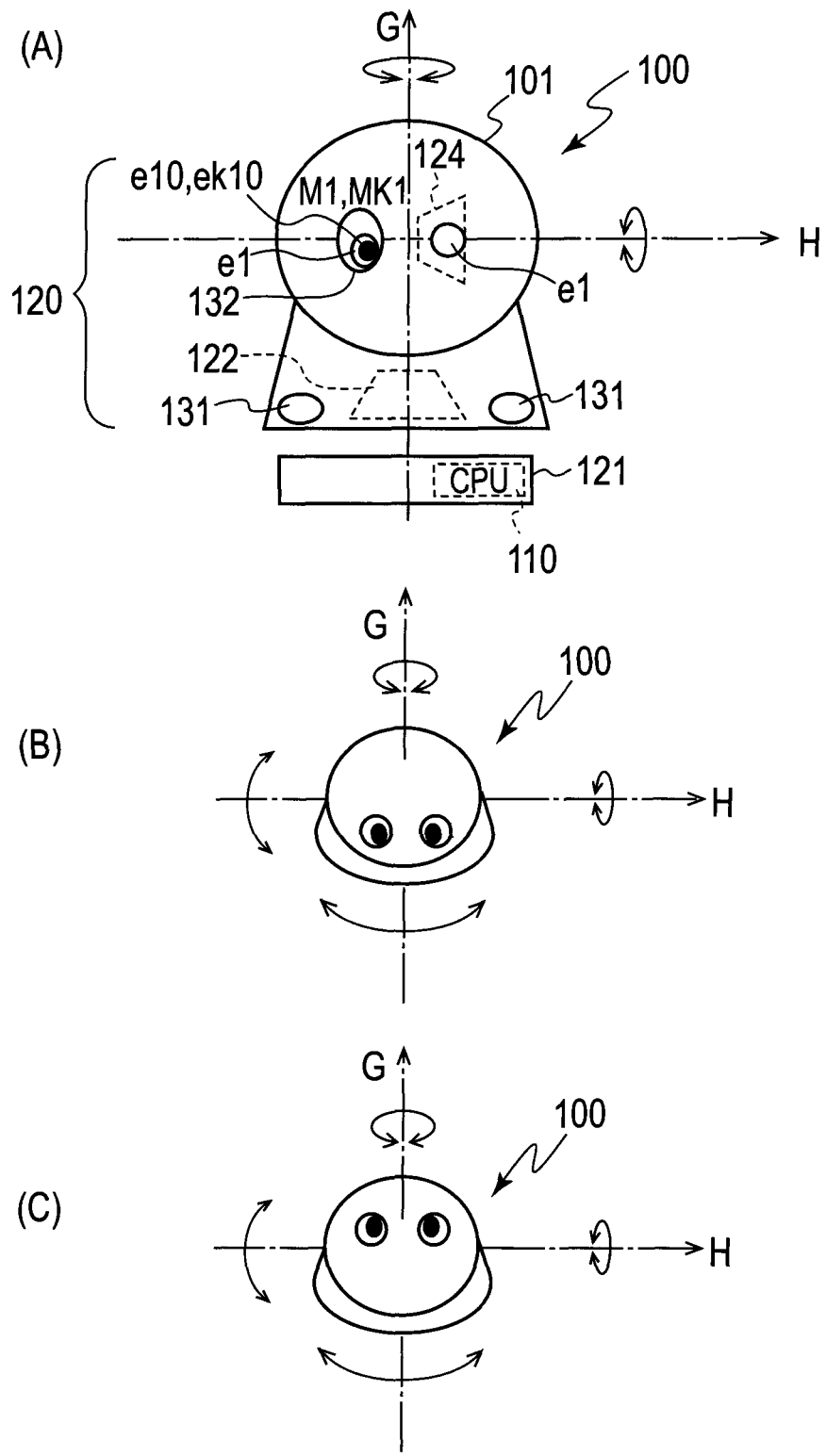
FIG. 11 is a diagram for explaining another configuration and action of the robot according to the second embodiment.

Specific configurations of the robot 100 are shown in FIG. 10 and FIG. 11.

As shown in FIGS. 10(A) to (C), the driver unit 120 includes a first axis G, a motor mechanism 122 configured to rotate the robot 100 about the first axis G as the rotational axis, a second axis H extending in a direction different from an extending direction of the first axis G, and a motor mechanism 124 configured to rotate a robot main body 101 about the second axis H as the rotational axis. Generally-known instrumental techniques can be applied to the first axis G, the second axis H and the motor mechanism 124, and thus the detailed description thereof is omitted herein.

A relationship between the extending direction of the first axis G and the extending direction of the second axis H is not limited particularly.

In addition, the first axis G and the second axis H may be provided to cross each other or may be provided not to cross each other. FIGS. 11(A) to (C) show an example of the robot 100 in which the second axis H extends in a direction approximately perpendicular to the first axis G.

When the robot 100 is driven by the motor mechanism 124, the robot 100 takes a rotation action about the second axis H as the rotational axis, as shown in FIGS. 11(B) and (C).

With this action, the robot main body 101 can turn the front side f to any direction around the second axis H. When the robot 100 is rotated to turn the front side f of the robot 100 to a head part (face part) of one of passengers (including a driver), the passenger can observe the robot 100 looking up at the passenger himself/herself.

Thus, the robot 100 can be caused to take an action of looking up at a passenger by taking an action of two steps of rotating about the first axis G and then rotating about the second axis, and thereby the robot 100 can draw attention of the passenger.

Moreover, the front side f of the robot 100 in this embodiment may be provided with eye members e1, e2 which are designed to look like human or animal eyes. When the robot 100 is provided with the eye members e1, e2, the robot 100 after turning back and the passenger can look at each other and make a so-called eye contact with each other.

In addition, when the first axis G is inclined from the vertical direction, an artificial sight line of the eye members e1, e2 is directed to the face or head of a passenger in the advance notice action of the robot 100. Thus, the robot 100 can make an eye contact with the passenger.

Additionally, the output unit 130 of the robot 100 includes speakers 131 and light emitters 132.

The speakers 131 read aloud the presentation information by use of a TTS (Text To Speech) function, on the basis of an action command from the robot control device 200.

The light emitters 132 take a light emission action based on an action command from the robot control device 200.

A lamp or an LED may be provided as each of the light emitters 132.

The light emitters 132 can be provided on the front side f of the robot 100.

As shown in FIG. 10(A), the light emitters 132 can be provided near the respective eye members e1, e2. Also, as shown in FIG. 11(A), the light emitters 132 can be provided inside the respective eye members e1, e2.

By emitting light from the eyes e1, e2 of the robot 100 after turning back, the robot 100 can draw attention of the passenger. A specific method of light emission control of the light emitters 132 is not particularly limited and any widely known method may be used.

Next, the robot control device 200 is described.

As shown in FIG. 9, the robot control device 200 includes an information acquirer unit 210, an action controller unit 220 and an information presenter unit 230.

The information acquirer unit 210 acquires information generated in response to vehicle conditions (including a signal indicating the generation of the information) from the navigation device 300, the obstacle alarm device 400, the vehicle controller 500, and the seating sensor device 700.

In the embodiment, the information generated in response to the vehicle conditions at least includes route guide information presented by the navigation device 300, obstacle information presented by the obstacle alarm device 400, speed information, energy level information and time information presented by the vehicle controller 500, and a passenger seating state presented or outputted by the seating sensor device 700.

The information acquirer unit 210 acquires these types of presentation information from the navigation device 300, the obstacle alarm device 400, the vehicle controller 500, and the seating sensor device 700.

The action controller unit 220 includes an information presentation trigger acquirer 221, a rotation angle determining section 222 and an action commander 223. In response to an event in which the information acquirer unit 210 acquires the presentation information and/or acquires the generation of the presentation information, the action controller unit 220 generates a control signal to cause the robot 100 to take the advance notice action of informing the passenger that information will be presented (also referred to as "a contact action" below), for example.

The information presentation trigger acquirer 221 acquires information that the information acquirer unit 210 acquires the presentation information or the information indicating the generation of the presentation information. Each of these types of information is an event (trigger) in response to which the action controller unit 220 causes the robot 100 to take the advance notice action.

The rotation angle determining section 222 determines a rotation angle of the robot 100 in the advance notice action on the basis of the positional relationship between the installation position of the robot 100 and the position of the driver seat where the driver is seated.

Figure 15:
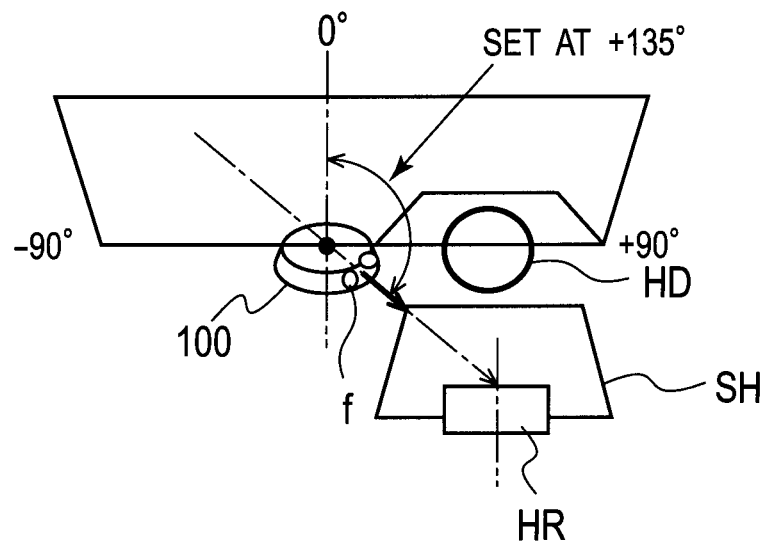
FIG. 15 is a diagram for explaining a setting example of a rotation angle of the robot.

The rotation angle of the robot 100 in the advance notice action is set at an angle from a direction from which the front side f of the robot 100 starts rotating (from the normal direction defined in advance such as a vehicle traveling direction) to a position in which the front side f faces toward a seating surface of the driver sheet. Since the front side f of the robot 100 faces toward the seating surface of the driver seat in the vehicle, a situation where the robot 100 looks at the driver can be produced in the advance notice action. Specifically, as shown in FIG. 15, the rotation angle of the robot 100 in the advance notice action is set at a direction connecting the center of the robot 100 and the center of the head holding surface of the headrest (and a direction within a predetermined angle range with respect to the connecting direction). In an example of the vehicle shown in FIG. 15, assuming that a straight ahead direction of the vehicle is set as a reference (0°), the rotation angle of the robot 100 is +135° (+135°±α°, α is a predetermined certain value). At this angle, the front side f of the robot 100 faces toward the head holding surface of the headrest, and thereby a situation where the robot 100 looks at the head portion or face of the driver can be produced in the advance notice action.

Figure 16:
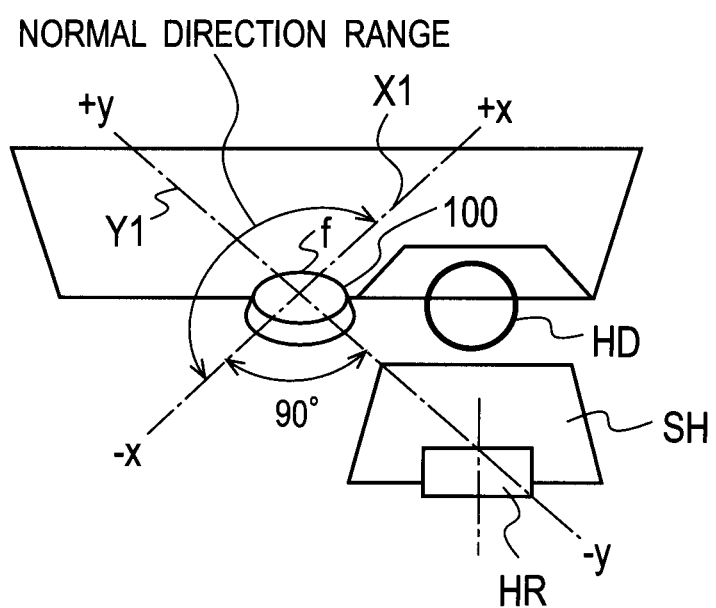
FIG. 16 is a diagram showing a first example of a normal direction of the robot.

Here, the normal direction is explained. The normal direction can be appropriately determined based on the location of the robot 100, the location of the driver seat and the like. For example, as shown in FIG. 16, a coordinate system is firstly defined which has as the origin an intersection point of a straight line Y1 connecting the center of the robot 100 and the center of the head holding surface of the headrest, and a straight line X1 perpendicularly crossing this Y1 on a horizontal plane, and then the normal direction can be set at a direction covering the first quadrant (x>0, y>0) and the second quadrant (x<0, y>0).

Figure 17:
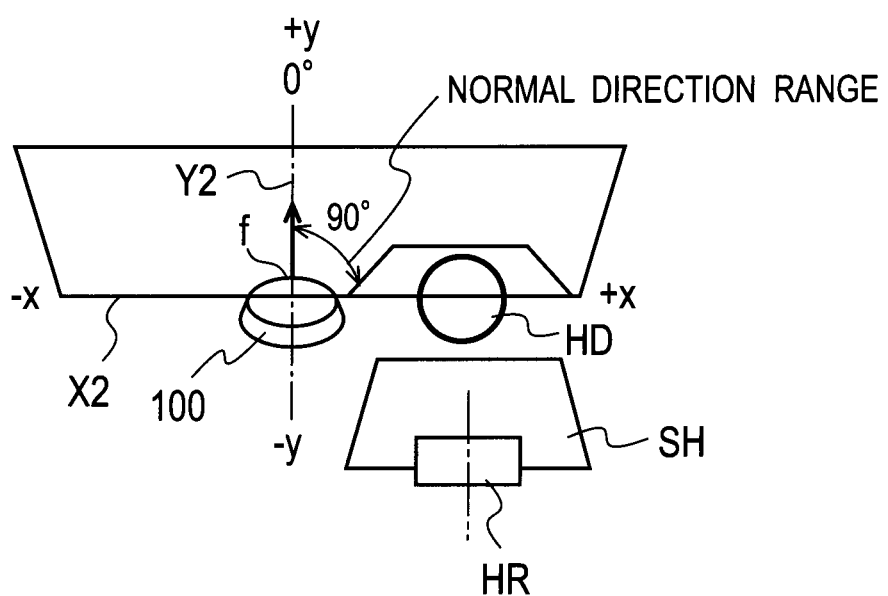
FIG. 17 is a diagram showing a second example of a normal direction of the robot.

Instead, as shown in FIG. 17, a coordinate system is firstly defined which has as the origin an intersection point of a straight line Y2 passing through the center of the robot and extending in the straight ahead direction and a straight line X2 perpendicularly crossing this Y2 on a horizontal plane, and then the normal direction can be set at a direction covering the first quadrant (x>0, y>0).

Otherwise, the normal direction can be determined based on a steering angle of a steering wheel (shown as HD in the drawings). The front side f of the robot 100 faces in the traveling direction of the vehicle, in other words, the same direction as the driver faces. A calculation method of the normal direction, in other words, the rotation angle at which the robot 100 faces in the normal direction is not particularly limited, but the calculation may be carried out by using (the rotation angle at which the robot 100 faces in the normal direction=the steering angle of the steering wheel×(90°/720° (the maximum steering angle of the steering wheel)). When the normal direction is changed depending on the steering angle of the steering wheel, the limits of the normal direction are defined. When the rotation angle of the robot 100 is changed (the head is moved) in conjunction with the steering operation of the steering wheel by the driver as described above, the driver faces in the same direction as the robot 100, and thereby can feel a sense of togetherness (sense of partner).

When the presentation information includes direction information such as right or left, the action command may include a command to rotate the robot 100 about the first axis G as the rotational axis so that the front side f of the robot 100 can face in a direction indicated by the direction information. When the front side f of the robot 100 faces in the direction indicated by the direction information, the driver can be intuitively notified of the direction indicated by the presentation information.

Instead, the rotation angle can be determined based on a relationship between the position of the robot 100 and the position of the driver. In this embodiment, the rotation angle determining section 222 determines the rotation angle of the robot 100 in the advance notice action on the basis of the positional relationship between the position of the robot 100, and the position of the driver seat (shown as SH in the drawings), the headrest (shown as HR in the drawings), or an actually sensed face or hear portion of the passenger.

With this setting, the front side f of the robot 100 faces toward the head holding surface of the headrest, and thereby a situation where the robot 100 looks at the head portion or face of the passenger can be produced in the advance notice action.

The action commander 223 causes the driver unit 120 of the robot 100 to cause the robot 100 to take, as the advance notice action, an action in which the robot 100 rotates so that the front side f of the robot 100 can face toward a passenger aboard the vehicle. With this action, the robot 100 rotates about the first axis G, and the passenger can observe the robot 100 looking at the passenger himself/herself.

Figure 12:
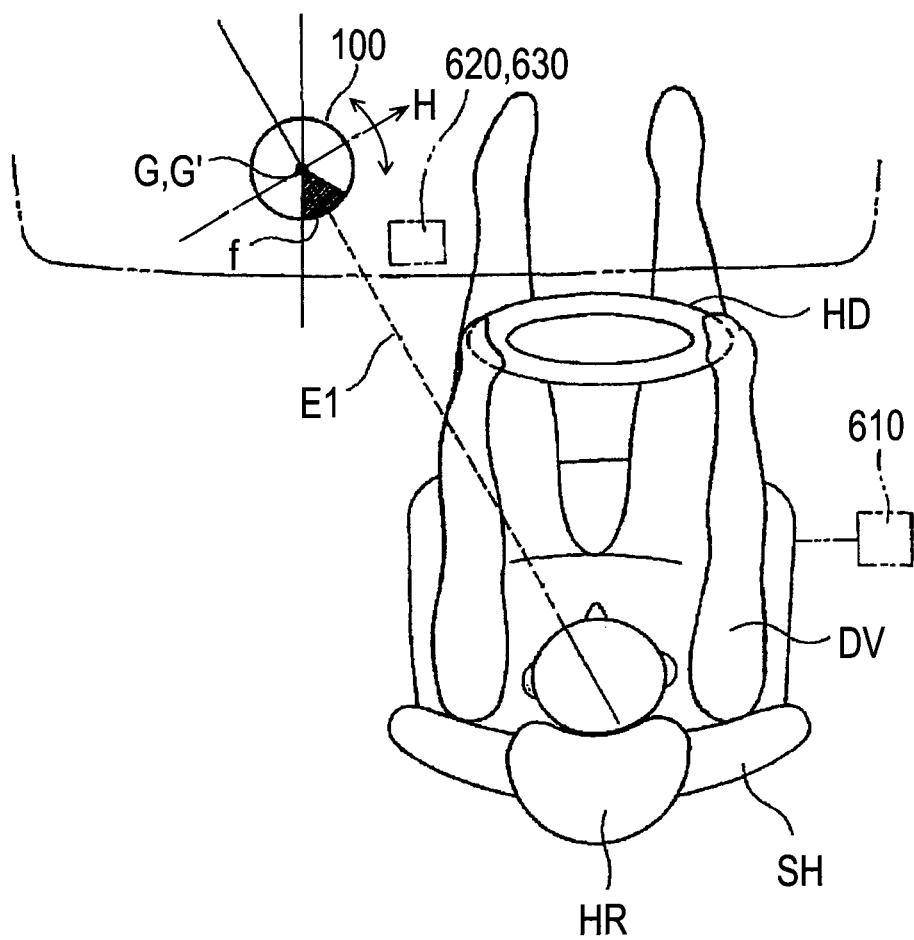
FIG. 12 is a diagram for explaining a state in which a front side of the robot faces toward a passenger.

FIG. 12 shows this state. As shown in FIG. 12, the front side f (shaded portion) of the robot 100 taking the advance notice action faces toward the passenger.

After causing the robot 100 to rotate about the first axis G, the action controller unit 220 causes the robot 100 to rotate about the second axis H as the rotational axis approximately perpendicular to the first axis G so that the front side f of the robot 100 can face toward a head part (face part) of the passenger aboard the vehicle.

Figure 13:
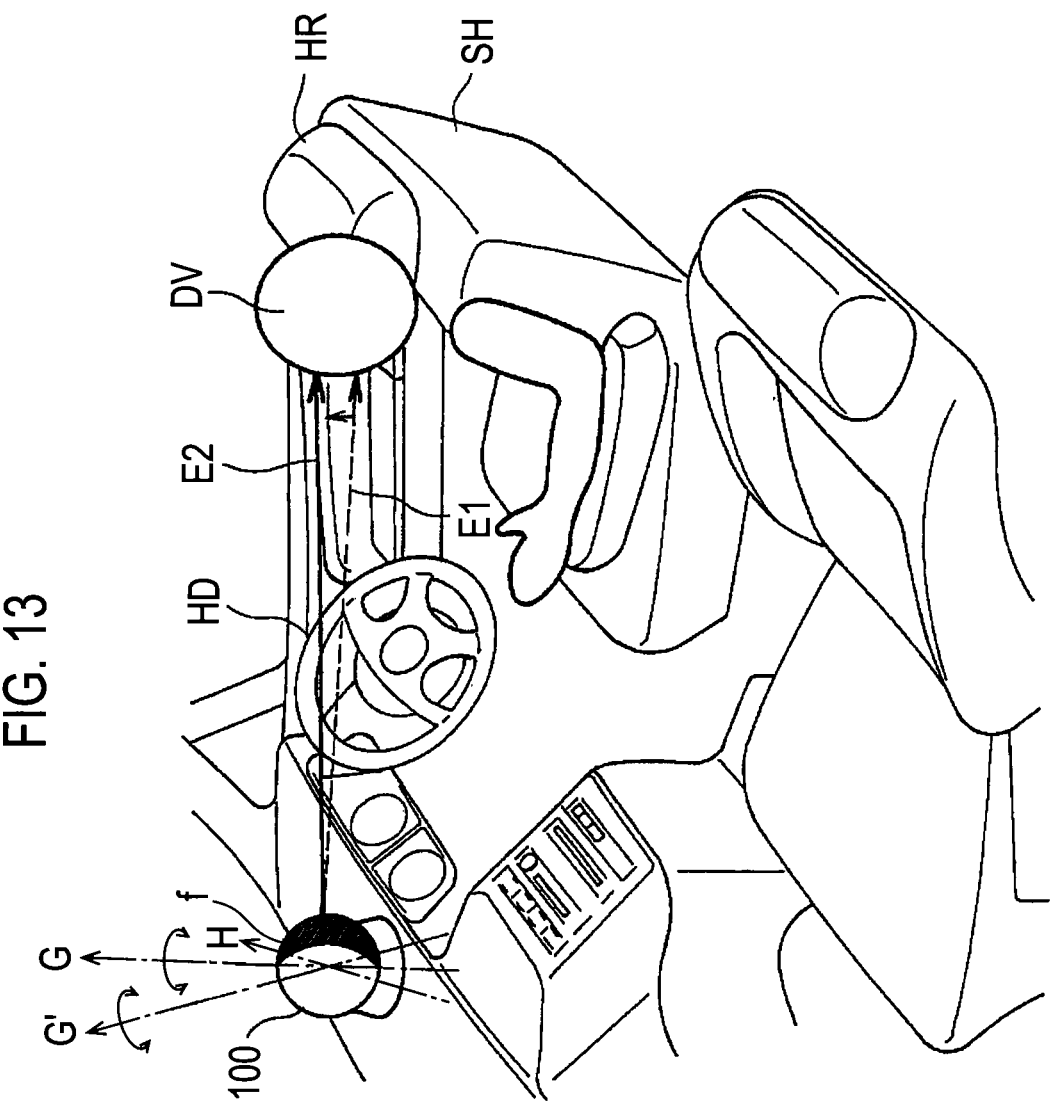
FIG. 13 is another diagram for explaining a state in which the front side of the robot faces toward a passenger.
Figure 14:
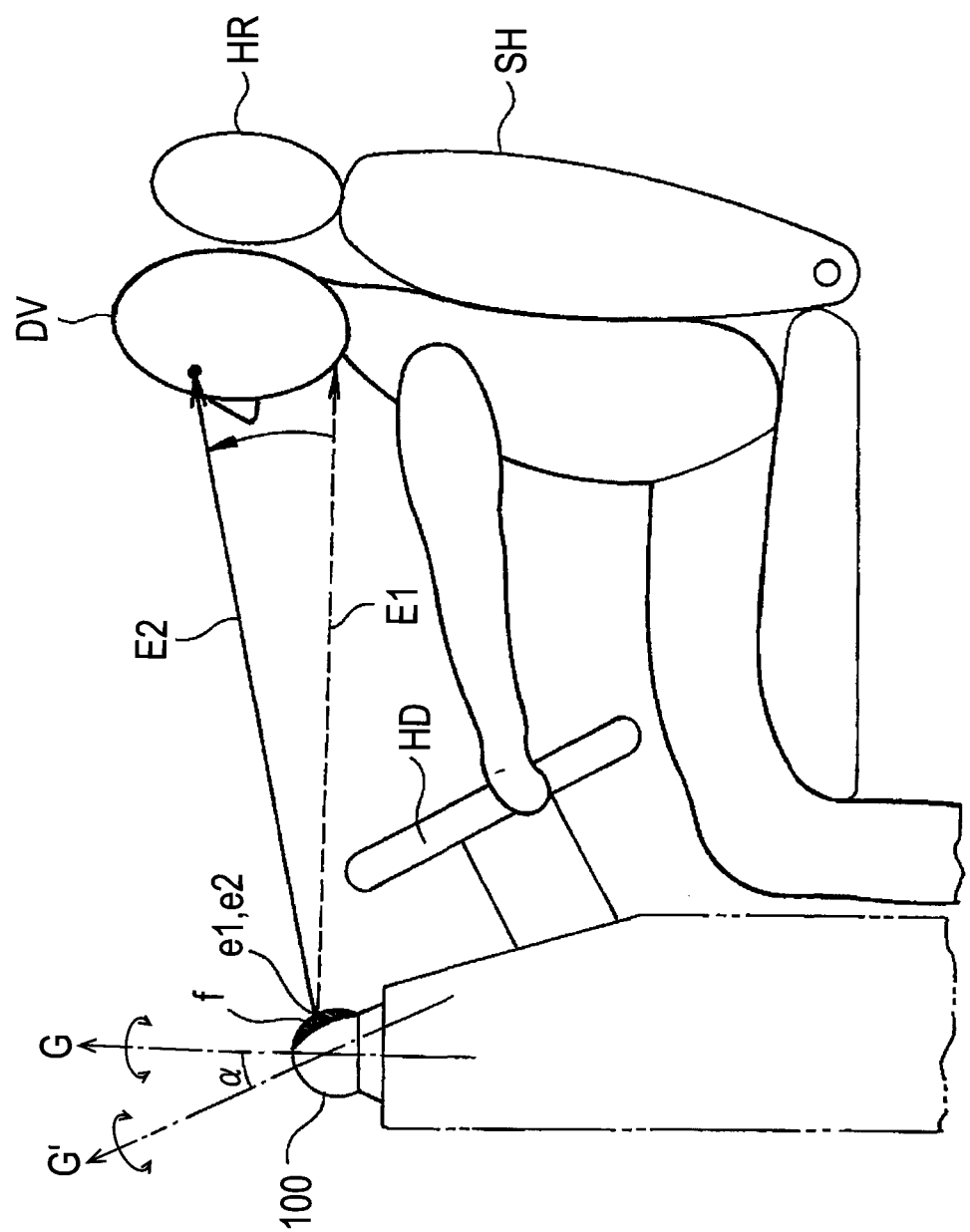
FIG. 14 is a side view of the state shown in FIG. 13.

FIG. 13 and FIG. 14 show this state. As shown in FIG. 13, the front side f of the robot 100 looks at the passenger in a direction of a broken line E1, and thereafter looks up at the passenger in a direction of a straight line E2.

Meanwhile, FIG. 14 is a diagram showing a side view of the state shown in FIG. 13. As shown in FIG. 13 and FIG. 14, the robot 100 rotates to turn back to the passenger, and then looks up at the passenger. In this way, the robot takes the advance notice action for trying to build a relationship with the passenger.

Moreover, as shown in FIG. 9, the information presenter unit 230 includes a presentation information analyzer 231, a corresponding action decider 232 and a presentation action commander 233.

The presentation information analyzer 231 analyzes a content of the presentation information acquired by the information acquirer unit 210.

Specifically, the presentation information analyzer 231 makes analysis to determine that the content of the presentation information transmitted to the robot 100 side from the navigation device 300, the obstacle alarm device 400, the vehicle controller 500, and the seating sensor device 700 indicates "right turn guide," "left turn guide," "caution to the right," "caution to the left," "prohibition of opening right doors," or "prohibition of opening left doors," for example.

The corresponding action decider 232 decides the action command corresponding to the acquired presentation information, in reference to predefined correspondences between contents of the presentation information and action commands of the presentation actions.

Here, FIG. 18 shows an example of the correspondences between the contents of the presentation information and the action commands. The action commands include a drive command to the driver unit 120 of the robot 100, a speech command to the speakers 131 of the robot 100, and a light emission command to the light emitters 132.

Figure 19:
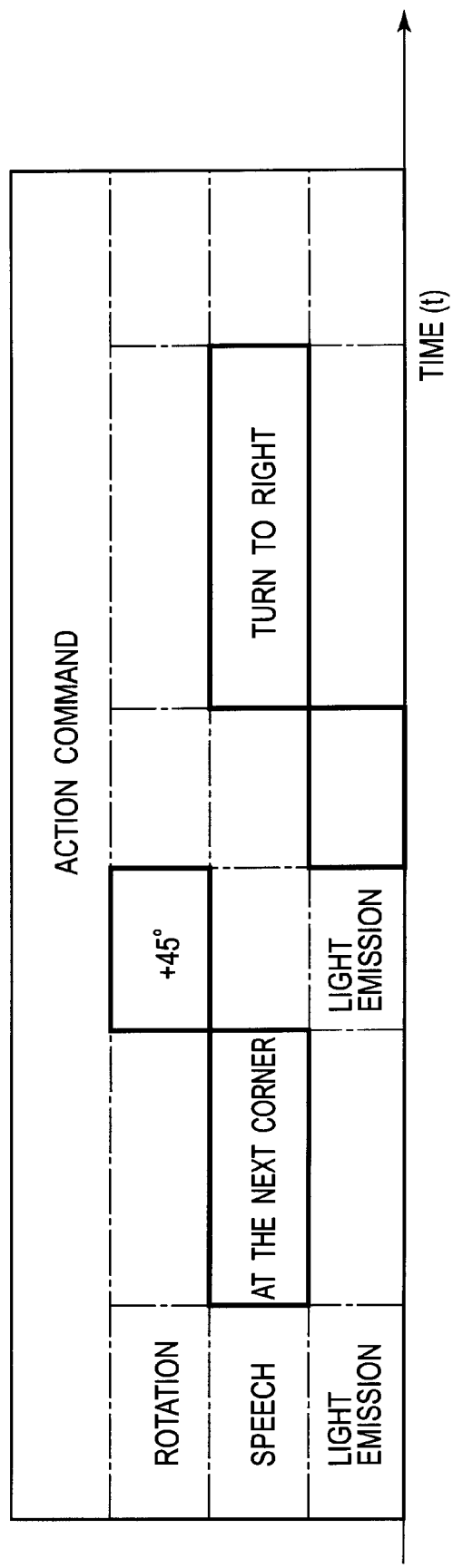
FIG. 19 is a diagram for explaining an example of the action command.

FIG. 19 shows an example of the action command. As shown in FIG. 19, the action command of a presentation action includes a drive command (rotation amount, rotation direction, and rotation timing), a speech command (speech content, speech start timing, and speech end timing), and a light emission command (light emission manner, light emission timing, and light emission duration), an execution timing, and an execution duration.

The presentation action commander 233 transmits the action command decided by the corresponding action decider 232 to the controller unit 110 of the robot 100.

The navigation device 300 includes a current position acquirer 310, a map information storage 320, a route calculator 330, and a guide 340.

The current position acquirer 310 detects the current position of its own vehicle by use of a GPS function or the like.

The map information storage 320 stores electronic map information.

The route calculator 330 performs route calculation and route guide on the basis of the current position of its own vehicle and the electronic map information.

The guide 340 transmits the guide information to the outside.

When its own vehicle comes near a guide point where route guide should be provided, the navigation device 300 in this embodiment transmits the route guide information as the presentation information to the robot control device 200. The information acquirer unit 210 of the robot control device 200 acquires this presentation information. A configuration of the navigation device 300 is not limited, but any widely known navigation device can be used.

The obstacle alarm device 400 includes an image capture 410, an obstacle judging unit 420 and an alarm unit 430.

The image capture 410 is an infrared camera, a CCD camera, or the like, and captures images of the surroundings of the vehicle.

The obstacle judging unit 420 judges the presence of an obstacle, a positional relationship between an obstacle and the vehicle, an approach of an obstacle, a danger degree of an obstacle, and the like by use of certain methods.

In addition, the obstacle judging unit 420 can acquire the seating states of the respective vehicle seats from the seating sensor device 700 which will be described later, and can detect an obstacle according to the seating states. For example, only when a passenger is seated on the rear seat behind the driver seat, an obstacle around the right back door can be reported.

The alarm unit 430 transmits the presentation information on the obstacle to the outside. A configuration of the obstacle alarm device 400 is not particularly limited, and any widely known obstacle alarm device of this kind or any widely known obstacle alarm device using ultrasonic waves can be used.

The vehicle controller 500 acquires information on the vehicle. Here, the information on the vehicle includes the steering angle information, the speed information, the break operation information and the vehicular gap information.

The vehicle controller 500 outputs the information on the vehicle in certain cycles to the robot control device 200, or the navigation device 300, the obstacle alarm device 400, the vehicle controller 500, and the seating sensor device 700.

The vehicle controller 500 may further include a driving evaluation unit 510 configured to evaluate driving conditions. The driving evaluation unit 510 evaluates the driving conditions from a steering angle change, a speed change, break operation timing, a vehicular gap and the like, and transmits the evaluation result as the presentation information to the robot control device 200. The information acquirer unit 210 of the robot control device 200 acquires these pieces of presentation information.

The driver position sensor device 600 includes a seat position sensor 610, an infrared image capture 620, a camera 630, and a driver position calculator 640.

The seat position sensor 610 senses the position of the driver seat, and the position of the headrest.

The infrared image capture 620 is an infrared camera, for example, is installed inside the vehicle so as not to block the view of a driver, and captures images of a passenger and the like.

The camera 630 is a CCD camera, for example, or the like, is installed inside the vehicle so as not to block the view of the driver, and captures images of a passenger and the like.

The driver position calculator 640 calculates the position of a head portion of the seated driver on the basis of image information acquired from the seat position sensor 610, the infrared image capture 620 and the camera 630. Incidentally, the driver position sensor device 600 may store the position of the head portion of the driver together with a user ID in advance. A predetermined user ID and the seat position are transmitted from the driver position sensor device 600 in response to an input of the user ID, and thus are acquired by the rotation angle determining section 222. Based on this, the turning-back angle (the rotation angle in the advance notice action) of the robot 100 can be set depending on a car model and a seat setting position for each driver, and thereby the robot 100 can be turned back to the driver.

The seating sensor device 700 senses whether or not someone is seated on each vehicle seat (a driver seat, an assistant driver's seat and rear seats). A method of sensing whether or not someone is seated is not particularly limited, but this embodiment uses pressure sensors.

The seating sensor device 700 transmits the seating information in certain cycles to the robot control device 200 or the other on-vehicle devices. The above-shown table 1 shows an example of the correspondences between the acquired vehicle information and the presentation information outputted from the on-vehicle devices.

[Action Command Generation Processing]

Figure 20:
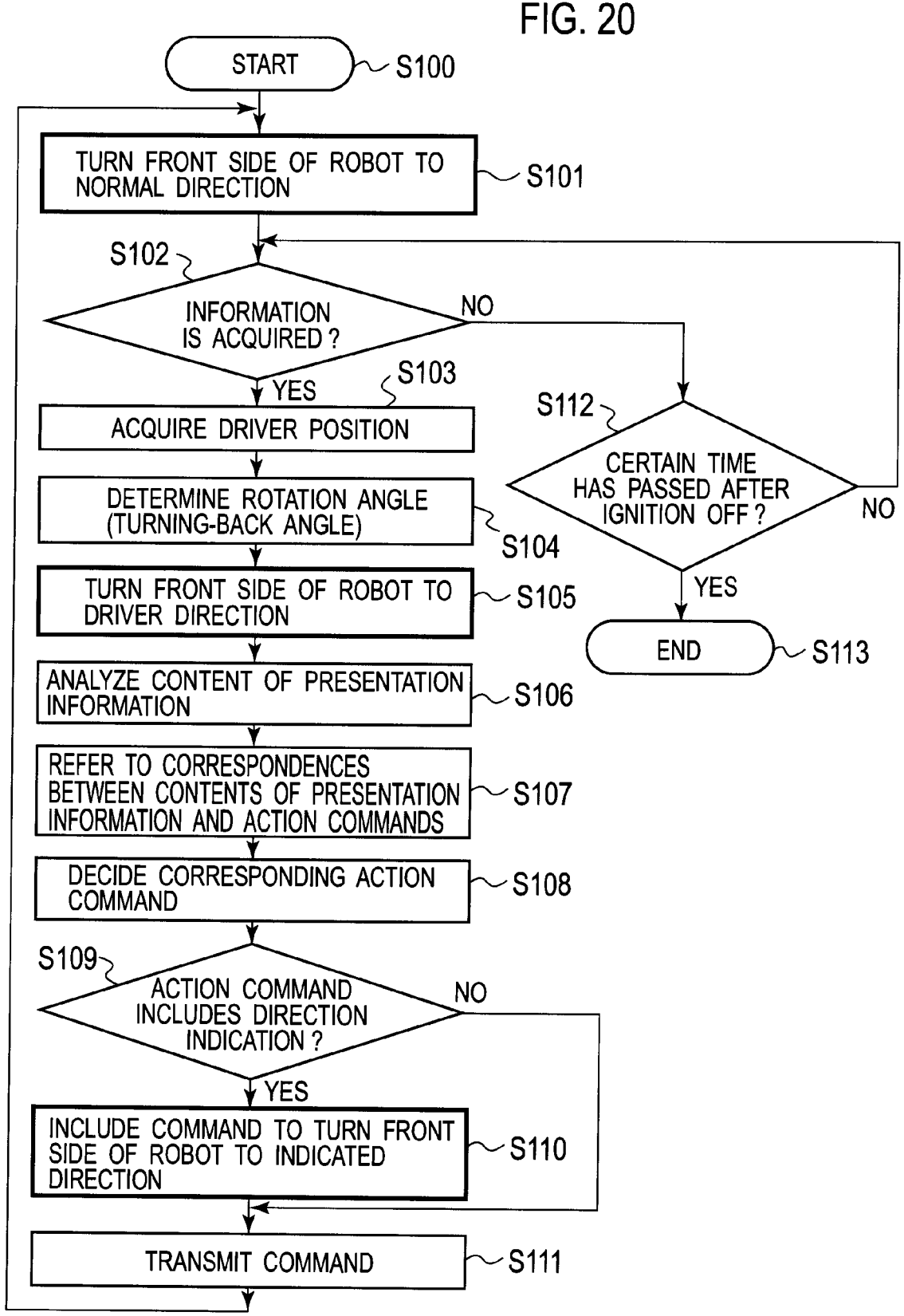
FIG. 20 is a flow chart diagram for explaining processing of the information presentation system in the second embodiment.

FIG. 20 is a flow chart diagram for explaining action command generation processing performed in the information presentation system 1000 in this embodiment. FIGS. 21(A) to (D) are diagrams for explaining an action of the robot 100 corresponding to the processing in FIG. 20.

As shown in FIG. 20, in steps S100 and S101, the controller unit 110 of the robot 100 controls the driver unit 120 to turn the robot 100 to the normal direction, upon startup of the information presentation system 1000 (ignition ON).

The robot 100 faces frontward in the traveling direction of the vehicle, i.e., in the same direction as the driver faces, as shown in FIG. 21(A). Here, the controller unit 110 of the robot 100 controls the action of turning to the normal direction at the startup time, but the robot control device 200 on the vehicle side may control, instead.

In step S102, the information acquirer unit 210 acquires the presentation information or the information indicating the generation of the presentation information from the navigation device 300, the obstacle alarm device 400, the vehicle controller 500, and the seating sensor device 700, and issues output indicating the acquisition of the information to the action controller unit 220. When no presentation information is generated, the processing advances to step S112, and is terminated after the ignition OFF, or upon lapse of a predetermined time after the ignition OFF.

In step S103, the rotation angle determining section 222 acquires the position of the face (head) of the driver, the position of the driver seat, or the position of the headrest, from the driver position sensor device 600.

In step S104, the rotation angle determining section 222 determines the rotation angle of the robot 100 in the advance notice action. The action commander 223 issues an action command to the controller unit 110 of the robot 100 to rotate the robot 100 about the first axis G and/or second axis H as the rotational axes based on the determined rotation angles.

Based on the acquired position information of the driver, the rotation angle determining section 222 determines the rotation angle for rotation about the first axis G as the rotational axis, and the rotation angle for rotation about the second axis H as the rotational axis, if necessary, such that the front side f of the robot 100 can face toward the driver. Incidentally, if the rotation angle is determined in advance, the value thereof may be read out.

In step S105, the controller unit 110 controls the driver unit 120 so that the robot 100 can rotate by the predetermined rotation angle. At this time, as shown in FIG. 21(B), the robot 100 takes the advance notice action of turning back to the passenger.

In step S106 the presentation information analyzer 231 analyzes the content of the acquired presentation information.

In steps S107 and S108, the corresponding action decider 232 decides and generates an action command in reference to the correspondences between the contents of the presentation information and the action commands.

In steps S109 and S110, when the action command includes a direction indication, the corresponding action decider 232 generates the action command including a command to turn the front side f of the robot 100 to the indicated direction.

In step S111, the presentation action commander 233 transmits the generated action command to the robot 100. Upon completion of the presentation action, the processing turns back to S101, and the front side f of the robot 100 is turned to the normal direction.

In this processing, the processing of generating and transmitting an action command for a presentation action (S106 to S111) is executed after the execution processing of the advance notice action (S105) of the robot 100. As long as the presentation action is executed after the advance notice action (S105), this processing of generating and transmitting an action command for a presentation action (S106 to S111) may be executed at the same time as or prior to the execution processing of the advance notice action S105.

Figure 21:
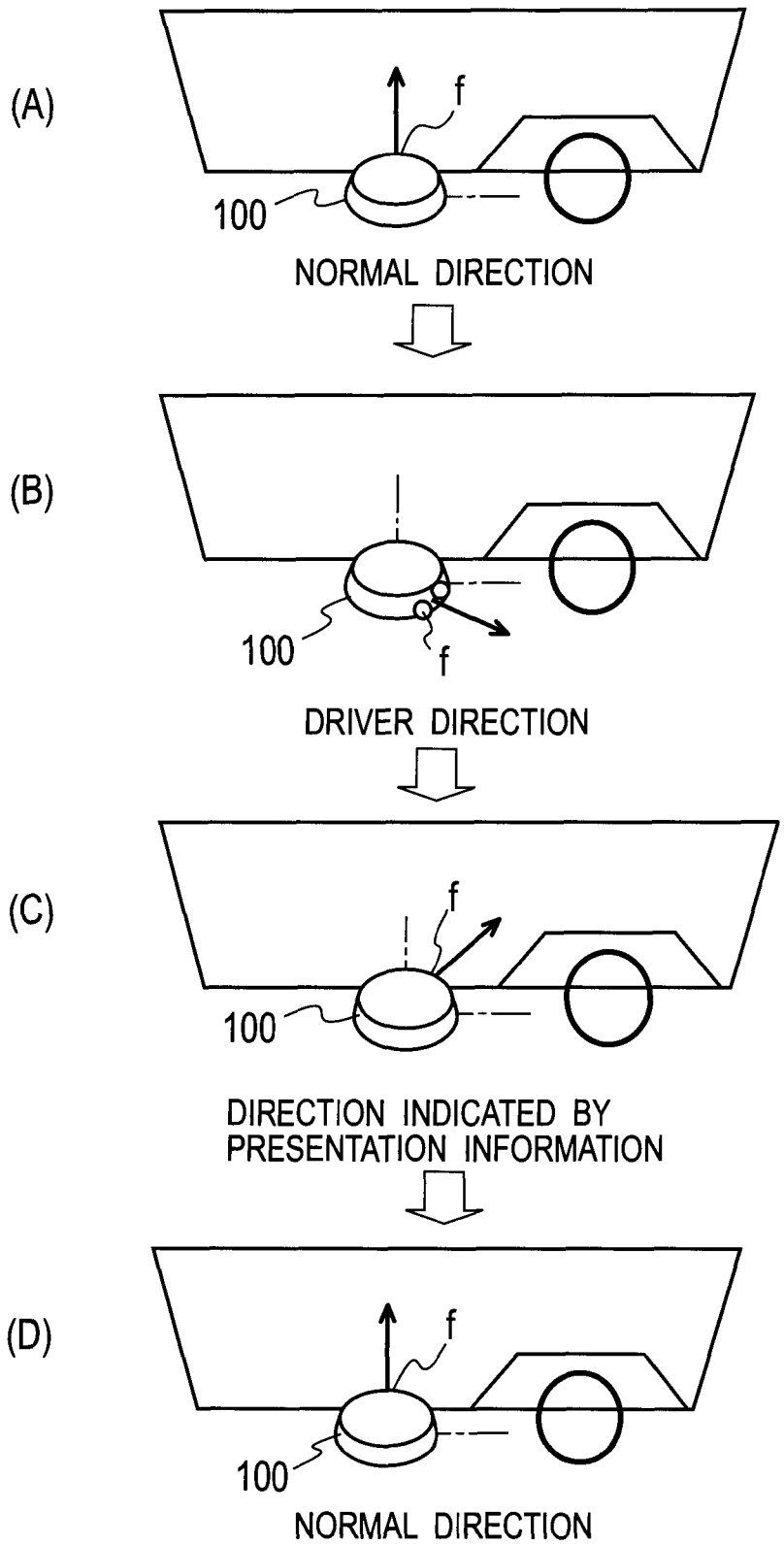
FIGS. 21(A) to (D) are diagrams for explaining an action of the robot 100 corresponding to the processing shown in FIG. 20.
Figure 22:
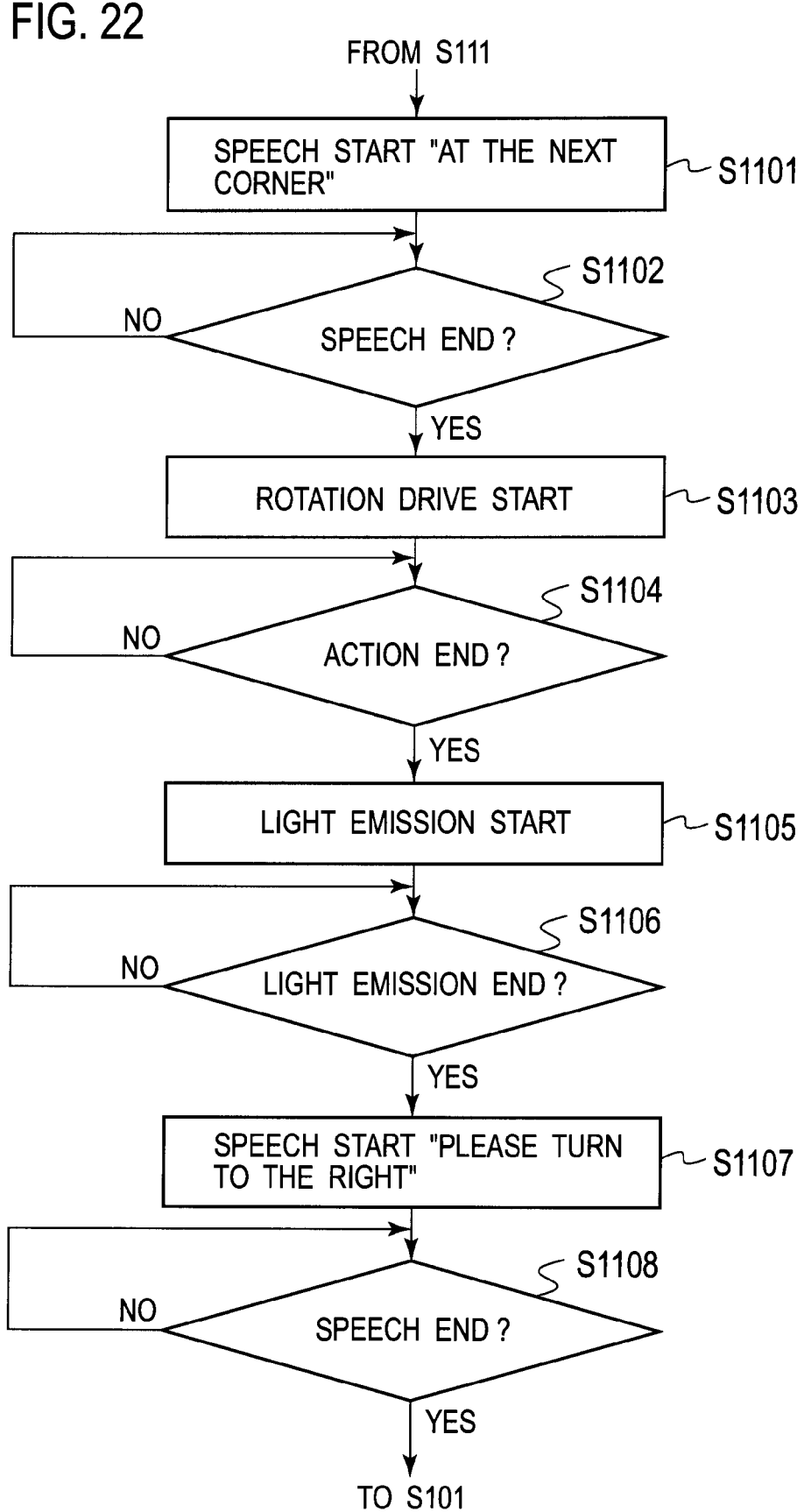
FIG. 22 is a flow chart diagram for explaining a presentation action of "right turn guide."
Figure 23:
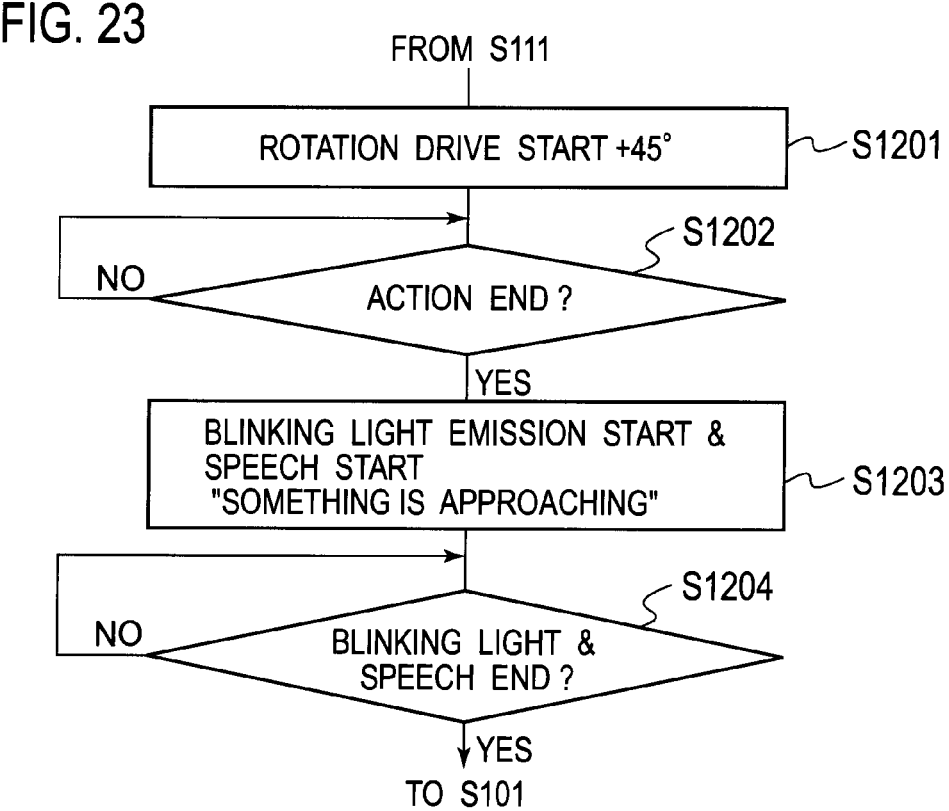
FIG. 23 is a flow chart diagram for explaining a presentation action of "caution to the right."
Figure 24:
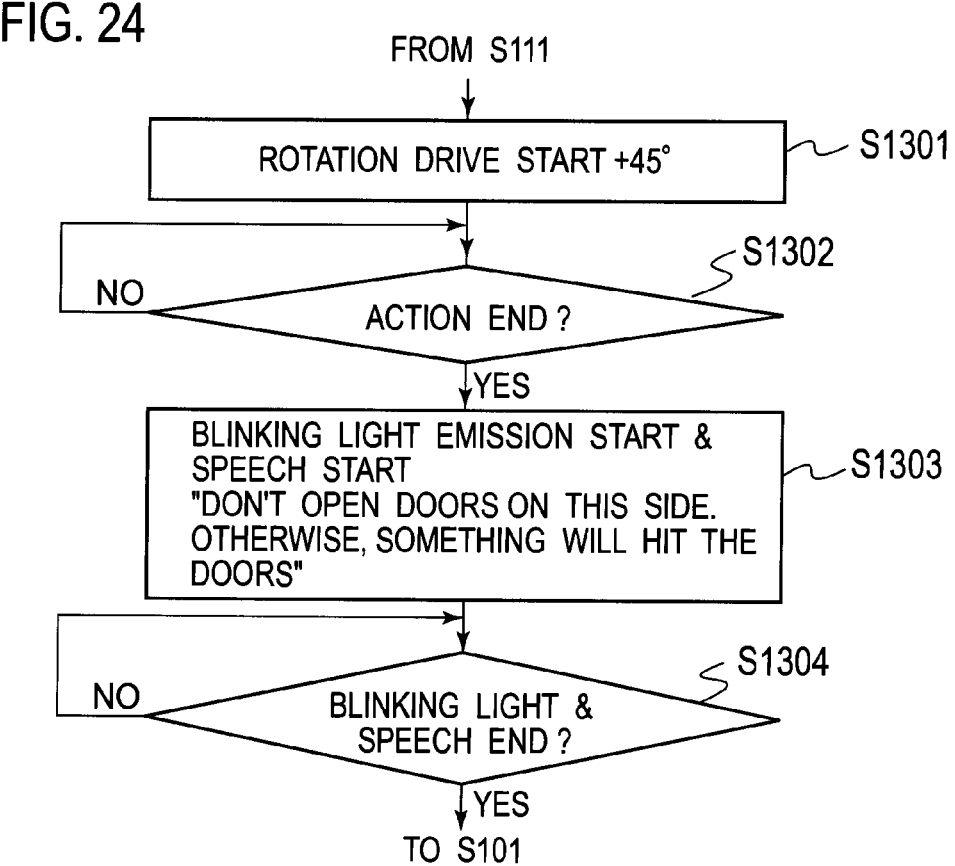
FIG. 24 is a flow chart diagram for explaining a presentation action of "prohibition of opening right doors."

Next, examples of actions of the robot 100 according to action commands for presentation actions generated through the processing from step S100 to step S111 are described based on FIG. 22 to FIG. 24 as well as FIG. 21.

FIG. 22 is a flow chart diagram for explaining information presentation processing for "right turn guide," FIG. 23 is a flow chart diagram for explaining information presentation processing for "caution to the right," and FIG. 24 is a flow chart diagram for explaining information presentation processing for "prohibition of opening right doors."

[Right Turn Guide Presentation Processing]

As shown in FIG. 22, a control flow is stared (step S1100) in response to an event in which the controller unit 110 receives an action command outputted from the presentation action commander 233.

In step S1101, the controller unit 110 causes the speakers 131 to output a voice based on the command outputted from the presentation action commander 233, that is, a voice of "next corner" in this case.

In step S1102, the controller unit 110 judges whether or not the voice output is completed.

In step S1103, the driver unit 120 rotates the robot 100 according to a command from the controller unit 110 based on the command outputted from the presentation action commander 233. Here, the rotation angle is +45°. As shown in FIG. 21(C), the robot 100 takes an action of turning to the indicated direction (+45°).

In step S1104, the controller unit 110 judges whether or not the rotation action of the robot 100 is completed.

In step S1105, the controller unit 110 causes the light emitters 132 to emit light when the rotation action of the robot 100 is judged as completed.

In step S1106, the controller unit 110 judges whether or not the light emitters are caused to emit light over a predetermined duration.

In step S1107, the controller unit 110 judges that the light emitters 132 completes the light emission over the predetermined duration, and causes the speakers 131 to output a voice based on the command outputted from the presentation action commander 233, that is, a voice of "please turn to the right" in this case. Upon completion of the voice output from the speakers 131, the processing turns back to step S101 shown in FIG. 20, and the robot 100 is turned to the normal direction as shown in FIG. 21(D).

[Information Presentation Processing of Caution to the Right]

As shown in FIG. 23, a control flow is started in response to an event in which the controller unit 110 receives an action command outputted from the presentation action commander 233.

In step S1201, the driver unit 120 rotates the robot 100 according to a command from the controller unit 110 based on the command outputted from the presentation action commander 233. Here, the rotation angle is +45°. As shown in FIG. 21(C), the robot 100 takes an action of turning to the indicated direction (+45°).

In step S1202, the controller unit 110 judges whether or not the rotation action of the robot 100 is completed.

In step S1203, after the rotation action of the robot 100 is completed, the controller unit 110 starts blinking light emission of the light emitters 132 and also causes the speakers 131 to output a voice based on the command outputted from the presentation action commander 233, that is, a voice of "something is approaching" in this case.

In step S1204, the controller unit 110 judges whether or not the blinking light emission and the voice output are completed, and the processing turns back to S101 in FIG. 20 when these are completed. Then, as shown in FIG. 21(D), the robot 100 is turned to the normal direction.

[Information Presentation Processing for Prohibition of Opening Right Doors]

As shown in FIG. 24, a control flow is stared (step S1100) in response to an event in which the controller unit 110 receives an action command outputted from the presentation action commander 233.

In step S1301, the driver unit 120 rotates the robot 100 according to a command from the controller unit 110 based on the command outputted from the presentation action commander 233. Here, the rotation angle is +45°. As shown in FIG. 21(C), the robot 100 takes an action of turning to the indicated direction (+45°).

In step S1302, the controller unit 110 judges whether or not the rotation action of the robot 100 is completed.

In step S1303, after the rotation action of the robot 100 is completed, the controller unit 110 starts blinking light emission of the light emitters 132 and also causes the speakers 131 to output a voice based on the command outputted from the presentation action commander 233, that is, a voice of "Don't open doors on this side. Otherwise, something will hit the doors" in this case.

In step S1304, the controller unit 110 judges whether or not the blinking light emission and the voice output are completed, and the processing turns back to 5101 in FIG. 20 when these are completed. Then, as shown in FIG. 21(D), the robot 100 is turned to the normal direction.

According to the information presentation system 1000 in this embodiment, the robot 100 as an example of the three-dimensional object takes the advance notice action of rotating so that the front side f thereof can face toward the front side of a passenger before information presentation, and thus the passenger can be made aware that the information will be presented after the advance notice action. The passenger can be thus well prepared to recognize the presented information from the beginning, and therefore can recognize information presented even in the beginning out of the whole presented information. Moreover, through such advance notice action, the passenger and the robot 100 can make contact with each other to build a partner relationship before the information presentation. Thereby, the presentation information can draw attention of the passenger.

The information presenter unit 230 turns the robot 100 to the normal direction after the robot 100 takes the information presentation action. This increases the rotation amount of the robot 100 in the advance notice action accompanying the generation of the next presentation information. Such a large rotation amount can make a passenger aware that the robot 100 turns back.

Note that, instead of the configuration described in the aforementioned embodiment, the eyeball members e10 and e20, for example, may be also provided in center portions of the respective eye members e1, e2 provided to the robot 100. The eyeball members e10 and e20 each include an eyeball driver mechanism (not illustrated) configured to move the eyeball member e10 or e20 to the right and left, up and down, and rotationally according to the action command from the robot control device 200. A specific configuration of the eyeball driver mechanism is not particularly limited, and any widely known mechanism can be used.

When the eyeball members e10 and e20 are provided in the center portions of the eye members e1, e2 provided to the robot 100 as described above, the robot 100 can take an action similar to a blink of the eyes of a human or animal. This makes the passenger feel a sense of affinity more.

In addition, the eye members e1, e2 may be provided with eyelid members M1, M2 that open and close the eyes e1, e2 by moving up and down. The eyelid members M1, M2 each include an eyelid driver mechanism configured to move the eyelid members M1, M2 up and down according to the action command from the robot control device 200. A specific configuration of the eyelid driver mechanism is not particularly limited, and any widely known mechanism can be used.

When the eyeball member e10, e20 and the eyelid members M1, M2 are provided in the eye members e1, e2 provided to the robot 100 as described above, the robot 100 can be made more human-like or animal-like. This makes the passenger feel a sense of affinity further more.

In addition, the action commander 223 in this embodiment can cause the eyeball driver mechanisms to move the eyeball members e10, e20 of the robot 100 up and down, to the right and left, or rotationally, after rotating the robot 100.

Moreover, the action commander 223 in this embodiment can cause the eyelid driver mechanisms to move the eyelid members M1, M2 up and down, after rotating the robot 100.

In this way, by taking these actions as the advance notice action after the rotation action, the robot 100 can attract attention of the passenger, and thus can build a relationship with the passenger.

In addition, the action commander 223 causes the light emitters 132 of the robot 100 to emit light after rotating the robot 100.

In this way, by taking the light emission action as the advance notice action after the rotation action, the robot 100 can make an appeal of its own presence to the passenger, and thus can attract attention of the passenger.

Additionally, as shown in FIG. 13 and FIG. 14, the extending direction of the first axis G may be inclined like the first axis G' from the vertical direction. When the first axis G' is inclined from the vertical direction, the robot 100 rotating about the first axis G' takes an action of looking up at the passenger while turning back to the passenger. In particular, in the case where the installation position of the robot 100 is lower (or higher) than the position of the face or head portion of the passenger, the front side f of the robot 100 can be turned toward the passenger (or the face or head portion of the driver). As shown in FIG. 13, the inclination angle of the first axis G' can be set such that the front side f of the robot 100 taking the advance notice action can face toward the face or head portion of the passenger. When the robot 100 is provided with the eye members e1, e2, the inclination angle α of the first axis G' can be set such that the artificial sight line of the eye members e1, e2 can meet the position of the face or head portion of the passenger, more preferably, the eyes of the passenger.

With this setting, the robot 100 turns back to the passenger or turns back to look up at the passenger before the information presentation. Thus, the robot 100 can attract the attention of the passenger by making a notification that the information will be presented, and thereby enhance the recognition rate of the presentation information.

Further, the rotation angle determining section 222 may determine the rotation angle of the robot 100 in the advance notice action based on the positional relationship between the installation position of the robot 100 and the position of the driver seat where the driver is seated. In this case, the rotation angle of the robot 100 in the advance notice action is set at the angle from a direction from which the front side f of the robot 100 starts rotating (from the normal direction defined in advance such as the vehicle traveling direction) to a position in which the front side f faces toward the seating surface of the driver sheet. Since the front side f of the robot 100 faces toward the seating surface of the driver seat in the vehicle, a situation where the robot 100 looks at the driver can be produced in the advance notice action.

Instead, the rotation angle determining section 222 may determine the rotation angle of the robot 100 in the advance notice action based on the positional relationship between the installation position of the robot 100 and the position of the headrest used by the driver. In this case, the rotation angle of the robot 100 in the advance notice action is set to an angle from a direction from which the front side f of the robot 100 starts rotating (from the normal direction defined in advance such as the vehicle traveling direction) to a position in which the front side f faces toward the head holding surface of the headrest.

Specifically, as shown in FIG. 15, the rotation angle of the robot 100 in the advance notice action is set at a direction connecting the center of the robot 100 and the center of the head holding surface of the headrest (and the direction within the predetermined angle range with respect to the connecting direction). In the example of the vehicle shown in FIG. 15, assuming that the straight ahead direction of the vehicle is set as the reference (0°), the rotation angle of the robot 100 is +135° (+135°±α°, α is the predetermined certain value). Here, in consideration of the presence of the driver's head, the center position of the head holding surface of the headrest as the reference may be shifted in the vehicle traveling direction by a predetermined distance.

In this way, since the front side f of the robot 100 faces toward the head holding surface of the headrest, a situation where the robot 100 looks at the head portion or face of the driver can be produced in the advance notice action.

Otherwise, the rotation angle determining section 222 may determine the rotation angle of the robot 100 in the advance notice action based on the positional relationship between the installation position of the robot 100 and the position of the face or head of the driver sensed by the driver position sensor device 600. The driver position calculator calculates the position of the face or the position of the head of the driver on the basis of image information on an area including the driver seat and its surroundings captured by the infrared image capture 620 or the camera 630. The rotation angle of the robot 100 is set at an angel from a direction from which the front side f of the robot 100 starts rotating (from the normal direction defined in advance such as the vehicle traveling direction) to a position in which the front side f faces toward the sensed head or face of the driver.

With this setting, the front side f of the robot 100 faces toward the actually sensed position of the face or head of the driver, and thereby a situation where the robot 100 looks at the head portion or face of the driver can be produced in the advance notice action. In addition, even when a single car is shared by drivers, the turning-back angle (the rotation angle in the advance notice action) of the robot 100 can be set depending on each of the drivers.

Further, the rotation angle determining section 222 may determine the rotation angle of the robot 100 in the case of rotating about the second axis H as the rotational axis, on the basis of the positional relationship between the position of the eyes e1, e2 of the robot 100 and the position of the eyes of the driver calculated by the driver position calculator 640. For example, the rotation angle about the second axis H is set at an angle from a direction from which the position of the eyes e1, e2 on the front side f of the robot 100 rotates about the first axis G to a position in which the position of the eyes e1, e2 faces toward the sensed eyes of the driver.

With this setting, the robot 100 can take an action of turning back to the passenger (including the driver) and looking at the eyes of the passenger, and thereby can make the passenger feel a sense of affinity to the robot 100 even further more.

Moreover, the action command may include a command for the light emitters 132 to emit light after the robot 100 is turned to a direction indicated by the direction information. By emitting light after turning the front side f of the robot 100 to the direction indicated by the direction information, the robot 100 can clearly notify the passenger of the direction indicated by the presentation information.

Furthermore, the action command may include a command for the speakers 131 to output the presentation information after the robot 100 is turned to a direction indicated by the direction information. By speaking after turning the front side f of the robot 100 to the direction indicated by the direction information, the robot 100 can notify the passenger of information on a guide, warning or the like under the condition in which the passenger recognizes the direction indicated by the presentation information. Thus, the robot 100 can make a notification of the information.

Third Embodiment

An information presentation system 1300 of a third embodiment is characterized in that an action controller unit 220 includes a driver response acquirer 224 in comparison with the second embodiment. To avoid overlaps of the descriptions, characteristic points of this embodiment will be mainly described herein.

Figure 25:
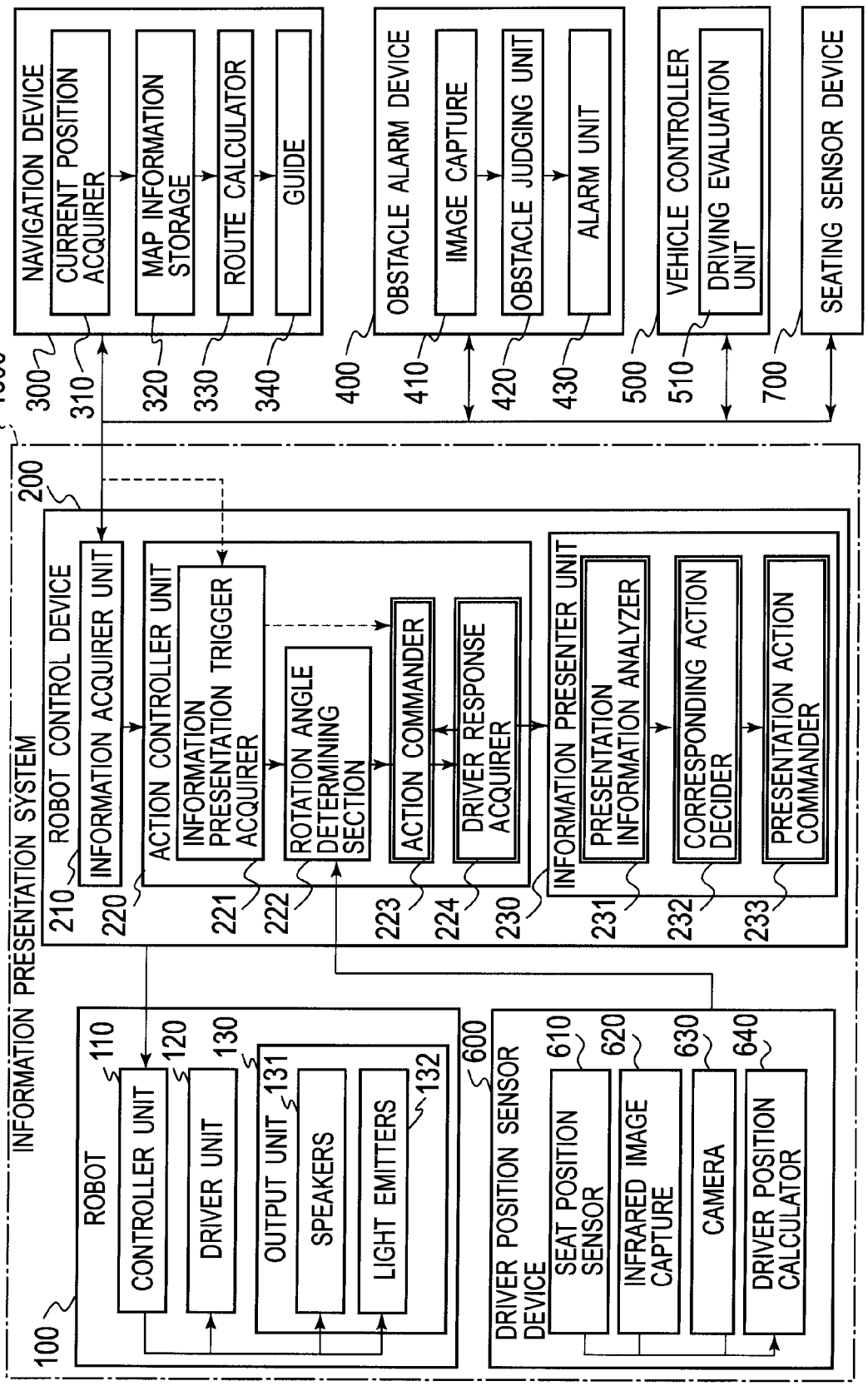
FIG. 25 is a block configuration diagram of an information presentation system in a third embodiment.

FIG. 25 is a diagram showing a block configuration of the information presentation system 1300 of the third embodiment.

The information presentation system 1300 of the third embodiment is different in that the action controller unit 220 in the information presentation system 1000 of the second embodiment includes the driver response acquirer 224 and in that the vehicle controller 500 includes a driving evaluation unit 510. Hereinafter, the driver response acquirer 224 and the driving evaluation unit 510 are described.

When the presentation information acquired by an information acquirer unit 210 is certain warning information, the driver response acquirer 224 makes a presentation to prompt the driver to respond, and waits for input of a response from the driver.

The response from the driver is a response by speech, a response by operating a certain switch, a response by touching a robot 100, or the like. For this reason, the driver response acquirer 224 is provided in advance with at least one touch sensor (not illustrated), a sound collecting microphone (not illustrated) or the like. Such a device is not particularly limited, and any device can be used as long as the device is capable of detecting a response from the driver.

The driving evaluation unit 510 selects predefined "presentation information related to the driving evaluation" based on the vehicle information acquired from a navigation device 300, an obstacle alarm device 400, a vehicle controller 500, and a seating sensor device 700, and outputs the selected presentation information to the information acquirer unit 210. When acquiring the certain warning information, the information acquirer unit 210 issues output indicating the acquisition to the driver response acquirer 224.

Here, "the presentation information related to the driving evaluation" is explained. For example, if the speed reached 10 seconds after start is 20 km/h or higher, the driving operation may be evaluated as resulting in poor fuel economy, and information that "try to drive as ecologically as possible" may be presented.

Next, processing for an action in this embodiment is described with reference to FIG. 27 and FIG. 28.

[Processing for Actions]

FIG. 27 is a flow chart for explaining action command generation processing performed in the information presentation system 1300 in this embodiment. To be more specific, the processing is processing for presenting the warning information (presentation information) that "the driving operation is not environment-friendly."

Here, the processing shown in FIG. 27 is processing subsequent to the advance notice action in S105 in the flowchart shown in FIG. 20. A controller unit 110 controls a driver unit 120 so that the driver unit 120 can rotate the robot 100 by the predetermined rotation angle. Then, after the robot 100 takes the advance notice action of turning back to the driver as shown in FIG. 21(B), a control flow is started.

In step S2101, the driver response acquirer 224 waits for input of a response from the driver after the robot 100 takes the advance notice action. When no response from the driver is inputted until a predetermined time period passes, the processing turns back to step S101 in the flow chart shown in FIG. 20 (S2106).

In step S2102, the driver response acquirer 224 notifies an information presenter unit 230 that the response from the driver is inputted before the predetermined time period passes. Then, the information presenter unit 230 selects the presentation action corresponding to the warning information in reference to correspondence information between presentation information and action commands as illustrated in FIG. 26. A presentation action commander 233 outputs the action command to the controller unit 110 so that the robot 100 will take the selected presentation action.

In step S2103, the controller unit 110 causes speakers 131 to output voice information indicating that "the accelerator is pressed down a little bit too much" according to the action command of the selected presentation action.

In step S2104, the controller unit 110 judges whether or not the speech prompting the driver to be careful (presentation action) is completed. If the speech is completed (YES in S2104), the processing turns back to step S101 in the flow chart shown in FIG. 20.

Figure 28:
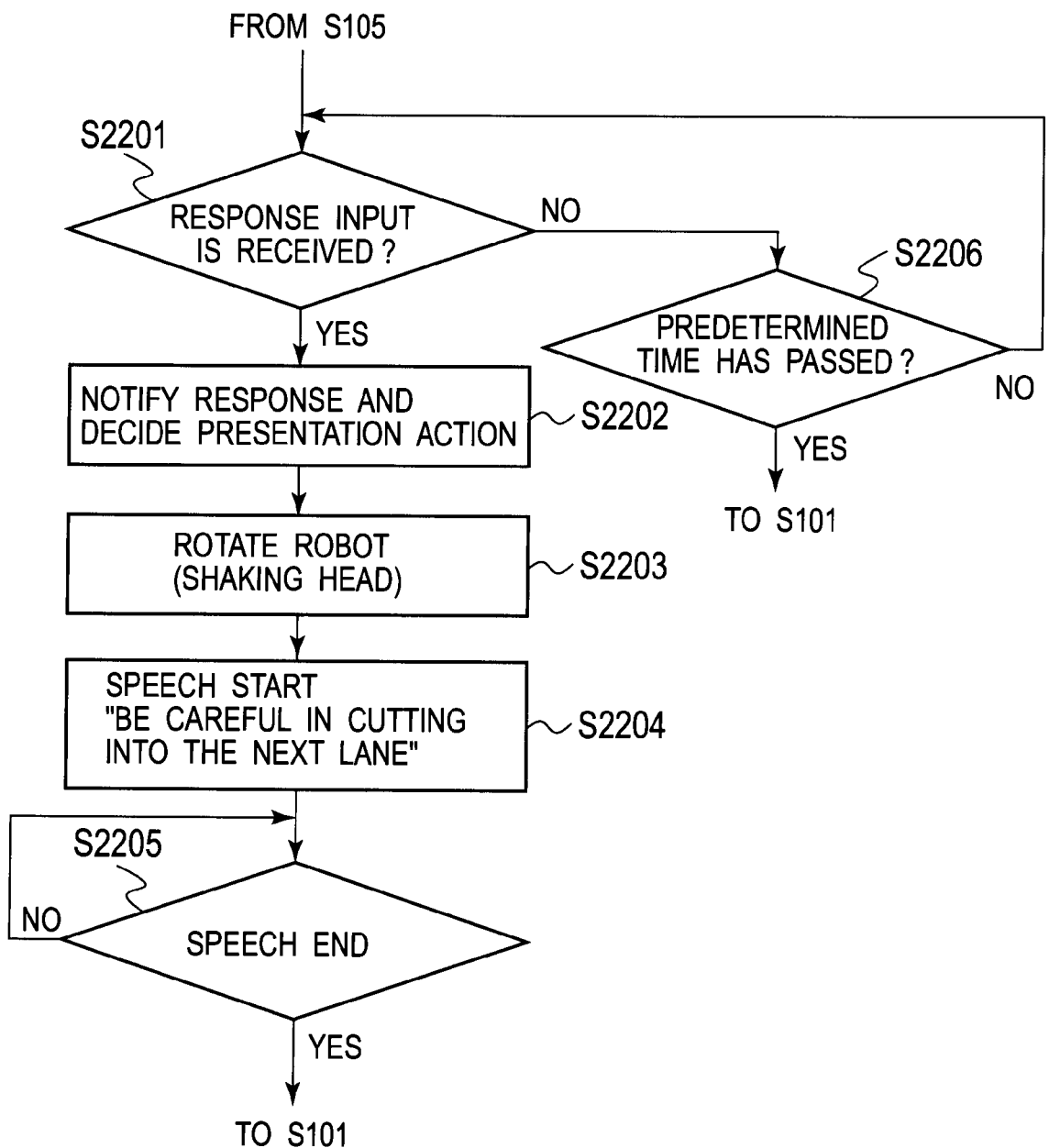
FIG. 28 is a flow chart diagram showing processing for presenting warning information (presentation information) related to driving.

FIG. 28 is a flow chart diagram showing processing for presenting warning information (presentation information) indicating "prohibition of cutting into the next lane in driving."

Here, the processing shown in FIG. 28 is processing subsequent to the advance notice action in S105 in the flow chart shown in FIG. 20. The controller unit 110 controls the driver unit 120 so that the driver unit 120 can rotate the robot 100 by the predetermined rotation angle. Then, after the robot 100 takes the advance notice action of turning back to the driver as shown in FIG. 21(B), a control flow is started.

In step S2201, the driver response acquirer 224 waits for input of a response from the driver after the robot 100 takes the advance notice action. When no response from the driver is inputted until a predetermined time period passes, the processing turns back to step S101 in the flow chart shown in FIG. 20 (S2206).

In step S2202, the driver response acquirer 224 notifies the information presenter unit 230 that the response from the driver is inputted before the predetermined time period passes. Then, the information presenter unit 230 selects the presentation action corresponding to the warning information in reference to the correspondence information between presentation information and action commands as illustrated in FIG. 26. The presentation action commander 233 outputs the action command to the controller unit 110 so that the robot 100 will take the selected presentation action.

In step S2203, the controller unit 110 controls the driver unit 120 so that the driver unit 120 can rotate the robot 100 by a predetermined rotation angle in order to cause the robot 100 to take the presentation action according to the action command of the selected presentation action. Then, the driver unit 120 of the robot 100 rotates the robot 100 by +30° from the direction of the driver that is set as a reference (0°), and then rotates the robot 100 by −30°. A direction preferable as the reference is a direction in which the robot 100 faces toward the driver when taking the contact action. With this action, the robot 100 can shake its head, and thereby can show a negative attitude toward the driver.

Subsequently, in step S2204, the controller unit 110 causes the speakers 131 to output voice information indicating that "please drive carefully in lane change."

In step S2205, the controller unit 110 judges whether or not the speech prompting the driver to be careful (presentation action) is completed. If the speech is completed (YES in S2205), the processing turns back to step S101 in the flow chart shown in FIG. 20.

According to the information presentation system 1300 in this embodiment, as similar to the first embodiment, the robot 100 as an example of the display member takes the advance notice action of rotating so that the front side f thereof can face toward the front side of a driver before information presentation, and thus a passenger can be made aware that the information will be presented after the advance notice action. The passenger can be thus well prepared to recognize the presented information from the beginning, and therefore can surely recognize information presented even in the beginning out of the whole presented information.

Moreover, through such advance notice action, the passenger and the robot 100 can make contact with each other to build a partner relationship before information presentation. Thereby, the presentation information can draw attention of the passenger.

In addition, according to this embodiment, the robot 100 takes the advance notice action and presents the information after confirming the response from the driver. Therefore, the warning information, which is difficult to aggressively present to the driver, can be presented in such a manner that the driver can accept it more readily.

Further, the warning information is presented according to the will of the driver in a state where the driver is feeling a sense of partner (sense of togetherness) through the advance notice action. Therefore, the driver can accept the warning without being offended.

Instead of the configuration shown in the aforementioned embodiment, the action command in this embodiment includes a rotation command, for example. When the response from the driver is received, the action commander 223 notifies the information presenter unit 230 of the reception, and may cause the robot 100 to take another advance notice action (second advance notice action) in which the robot 100 rotates.

In this way, in addition to the advance notice action executed in the first place, the other advance notice action (second advance notice action) in which the robot 100 rotates is executed immediately before the presentation of the warning information, whereby the warning information can draw the attention.

Fourth Embodiment

An information presentation system 1400 of a fourth embodiment is characterized in that an action controller unit 220 includes an observation action commander 226 in comparison with the second embodiment. To avoid overlaps of the descriptions, characteristic points of this embodiment will be mainly described herein.

Figure 29:
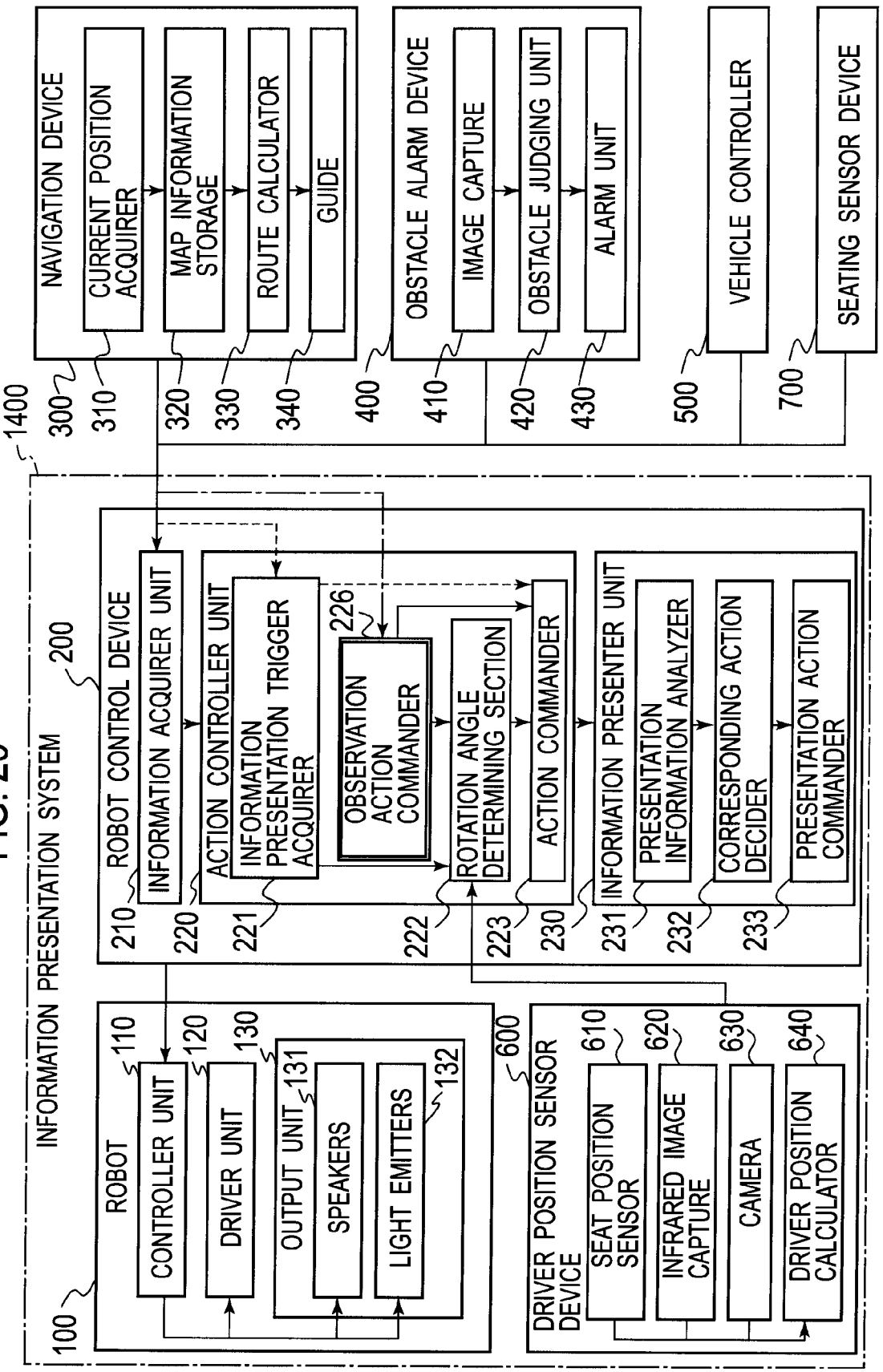
FIG. 29 is a block configuration diagram of an information presentation system in a fourth embodiment.

FIG. 29 is a diagram showing a block configuration of the information presentation system 1400 of the fourth embodiment.

The information presentation system 1400 of the fourth embodiment is different in that the action controller unit 220 in the second embodiment includes the observation action commander 226.

The observation action commander 226 outputs a command for a robot 100 to take an action different from the advance notice action to an action commander 223. In this action, the robot 100 before taking the advance notice action for informing the passenger that information will be presented takes an action of observing the surroundings of the vehicle.

Here, the action of observing the surroundings of the vehicle can be defined in advance, and may be defined as an action in which the robot 100 rotates about the G axis to change the direction of the front side f as if the robot 100 looks around the vehicle; an action in which the robot 100 rotates about the G axis in the right and left directions within a predetermined angle range; an action in which the robot 100 moves the directions of hand members H1, H2, a horn member T1 or the like to the right and left; and another equivalent action.

In addition, the observation action commander 226 may cause the robot 100 to take, as the action of observing the surroundings of the vehicle, an action of turning the front side f thereof toward an area where information is sensed. The direction of the area where the information is sensed is acquired from an obstacle alarm device 400 through an information acquirer unit 210.

FIG. 30 is a flow chart diagram showing a control procedure of the information presentation system 1400 in this embodiment. The control procedure shown in FIG. 30 is in common with the control procedure shown in FIG. 20 described in the second embodiment, but additionally includes a control for an observation action of the robot 100 between step S101 and step S102.

In step S1011, the observation action commander 226 acquires a signal indicating that the obstacle alarm device 400 and the navigation device 300 start processing after the robot 100 is turned to the normal direction in step S101.

In step S1012, upon acquisition of the signal indicating that the obstacle alarm device 400 and the navigation device 300 start processing, the observation action commander 226 causes the action commander 223 to command the robot 100 to take the action of observing the surroundings of the vehicle. Then, when information is acquired in step S102, the robot 100 is stopped from taking the action of observing the surroundings. Thereafter, the processing in step S103 and subsequent steps is executed. The processing in step S103 and subsequent steps is the same as the processing in the second embodiment explained based on FIG. 20.

When the robot is caused to take the action of observing the surroundings, which is an action different from the advance notice action, before taking the advance notice action for informing the passenger that information will be presented as described above, the robot 100 can properly give notice that information will be presented through its action change. To put it differently, the driver can recognize that no information is presented while the robot 100 is taking the action of observing the surroundings, and that some information will be presented when the robot 100 takes the advance notice action for informing the passenger that information will be presented after stopping the action of observing the surroundings.

Fifth Embodiment

An information presentation system 1500 of a fifth embodiment is characterized by classifying information into first information having large influence on its own vehicle, and second information other than the first information, and by causing a robot 100 to firstly take the action of giving notice that information will be presented, and thereafter to take the information presentation action when the information is the first information.

The first information includes warning information reported by an obstacle alarm device 400. The warning information includes warnings related to vehicle running such as the presence of an obstacle, the possibility that an obstacle exists, and a warning related to driver's vehicle control (driving operation).

FIG. 31 shows a block configuration of the information presentation system 1500 in the fifth embodiment.

As shown in FIG. 31, a robot control device 200 in the fifth embodiment further includes an information classifier unit 250 in comparison with the information presentation system 1000 in the second embodiment described above.

Herein, the description on the information presentation systems in the first embodiment to the fourth embodiment is incorporated while the overlapping description is omitted.

An information acquirer unit 210 acquires information including vehicle information on its own vehicle sensed on the vehicle side, and alarm information on an alarm target object sensed on the vehicle side, from a navigation device 300, various types of sensor devices 4400 included in an obstacle alarm device 400, and a vehicle controller 500.

The vehicle information on its own vehicle sensed on the vehicle side is not particularly limited, and includes route guide information outputted by the navigation device 300.

The navigation device 300 includes a current position acquirer 310, a map information storage 320, a route calculator 330 and a guide 340.

The current position acquirer 310 detects the current position of its own vehicle by use of a GPS function or the like.

The map information storage 320 stores electronic map information.

The route calculator 330 performs route calculation and route guide on the basis of the current position of its own vehicle and the electronic map information.

The guide 340 outputs the guide information to the outside.

When its own vehicle comes near a guide point where route guide should be provided, the navigation device 300 in this embodiment transmits the route guide information as the alarm information to the robot control device 200.

As shown in the same drawing, the obstacle alarm device 400 includes an image sensor device 4410 having an image capture such as a CCD camera, an infrared sensor device 4420 having an infrared camera, an ultrasonic sensor device 4430 configured to transmit and receive ultrasonic waves, and a millimeter wave sensor device 4440 configured to transmit and receive millimeter waves.

Besides those above mentioned, the various types of sensor devices 4400 may include a usually-used sensor for sensing an alarm target object. The various types of sensor devices 4400 sense alarm information based on captured images of the surroundings of the vehicle and ultrasonic waves or millimeter waves transmitted to the surroundings of the vehicle by using well-known methods. The alarm information indicates the presence of an obstacle, a distance between the obstacle and its own vehicle, whether the obstacle is moving or not, the speed of the obstacle, relative position between the obstacle and its own vehicle, relative speed between the obstacle and its own vehicle, and a type of the obstacle (the obstacle is a pedestrian, the obstacle is a two-wheeled vehicle, the obstacle is a vehicle, or the obstacle is a stationary object). Then, the various types of sensor devices 4400 transmit the sensed alarm information to the information acquirer unit 210 in the robot control device 200.

The vehicle controller 500 acquires the vehicle information on its own vehicle sensed on the vehicle side.

This vehicle information includes vehicle driving operation information, vehicle condition information and other vehicle information.

The vehicle driving operation information includes steering angle information, speed information, break operation information, gear operation information, wiper operation information, light operation information, fog lamp operation information, rear defogger operation information, and information related to other operations on its own vehicle. The vehicle condition information includes vehicle speed information, acceleration information, brightness sensor information, raindrop sensor information, and information related to other conditions of its own vehicle.

The information acquirer unit 210 transmits, if necessary, the acquired vehicle information and alarm information on the alarm target object to the underdescribed information classifier unit 250 and the action controller unit 220.

The information classifier unit 250 includes a driving scene judge section 251 and a classifier section 252.

The driving scene judge section 251 presumes a driving scene of its own vehicle on the basis of the vehicle information acquired by the information acquirer unit 210, and judges whether the presumed driving scene is included in given driving scenes stored in advance.

Firstly, the driving scene judge section 251 presumes a driving scene of the vehicle corresponding to the acquired "vehicle information" in reference to "correspondences between the vehicle information and driving scenes" defined in advance. FIG. 32 shows a specific example of the "correspondences between the vehicle information and driving scenes."

For example, when the driving scene judge section 251 acquires the current position information that "10 m before an intersection" from the navigation device 300 at timing t1, the driving scene judge section 251 can presume that its own vehicle is reaching an intersection.

Thereafter, when the driving scene judge section 251 acquires the current position information that "intersection passing is completed" from the navigation device 300 at timing t2 after t1, the driving scene judge section 251 can presume that its own vehicle has passed through the intersection.

From these pieces of information, the driving scene judge section 251 can judge that its own vehicle is present in the "intersection" in a period from t1 to t2. The vehicle information and the alarm information sensed in the period from t1 to t2 are targeted for information classification processing which will be described below.

Then, the driving scene judge section 251 judges whether or not the presumed driving scene (here, intersection passing) is a "given driving scene" defined in advance as a scene for which information should be presented.

Here, the given driving scene can be defined in advance appropriately as needed. Specifically, a scene that can be defined as a "given driving scene" is a scene considered as needing support information related to the driving, and includes a scene of "intersection passing," a scene of "right/left turn," a scene of "lane change," a scene of "driving start," a scene of "parking," and the like.

The classifier section 252 classifies the alarm information into the "first information" judged to have large influence on its own vehicle, and the "second information" other than the first information, the alarm information acquired by the information acquirer unit 210. In addition, the classifier section 252 acquires a content of the alarm information sensed in the given driving scene and its certainty through the information acquirer unit 210.

FIG. 33 shows an example of each content of the alarm information sensed in the driving scenes of "intersection," "lane change (right)," "lane change (left)" or "driving start" and certainty (accuracy) of the alarm information. The degree of certainty of the alarm information acquired by the classifier section 252 is determined as a result of relative evaluation using as a reference a threshold which ensures that a preset level of reliability of the alarm information is obtained. More specifically, the certainty of the alarm information is evaluated as "high" when the certainty is higher than a threshold indicating a predetermined level of reliability, and is evaluated as "low" when the certainty is lower than the threshold.

The certainty of the alarm information can be defined from the viewpoint of a detail level of the alarm information, or can be defined from the viewpoint of correctness of the alarm information.

Specifically, when the certainty of alarm information is defined from the viewpoint of the detail level of alarm information, the certainty can be defined such that the certainty becomes high as the information on an alarm target object becomes more in detail. For example, the certainty can be defined such that the certainty of alarm information that "a person exists within 10 m in the traveling direction" is higher than the certainty of alarm information that "there is some alarm target object (whether a person or object is unclear)."

Instead, when the certainty of alarm information is defined from the viewpoint of correctness of alarm information, the certainty of alarm information can be defined such that the certainty becomes high as the sensed information on an alarm target object becomes more probable.

For example, the certainty can be defined such that the certainty of alarm information having "a matching rate Q % (a threshold RT<Q) with a reference pattern" is higher than the certainty of the alarm information having "a matching rate P % (the threshold RT>P) with the reference pattern." Otherwise, the certainty can be defined such that the certainty of the alarm information sensed by "K sensors (a threshold LT<K) provided" as the various types of sensor devices 4400 is higher than the certainty of the alarm information sensed by "M sensors (the threshold LT>M) provided" as the various types of sensor devices 4400.

The classifier section 252 acquires the operation information on its own vehicle, vehicle condition information, and other vehicle information from the vehicle controller 500 through the information acquirer unit 210. How its own vehicle will behave can be judged based on the vehicle information.

For example, it can be judged that its own vehicle will start running (move) from now on based on vehicle information that the break of its own vehicle is released, and it can be judged that its own vehicle will turn to the right from now on based on vehicle information that the right-turn signal lever of its own vehicle is operated, Moreover, through comparison between the vehicle information and the alarm information, the classifier section 252 can judge whether an alarm target object (a pedestrian, another vehicle or a stationary object) and its own vehicle have a relationship in which the two come close to each other or have a relationship in which the two go away from each other, in short, judge influence of the alarm target object on its own vehicle.

When its own vehicle moves in a driving scene where an alarm target object is sensed, more specifically, when its own vehicle comes close to the alarm target object, in other words, when its own vehicle does not go away from the alarm target object, it can be judged that the alarm target object has large influence on its own vehicle.

On the basis of the content of the alarm information sensed in a given driving scene and the certainty of the alarm information, the classifier section 252 classifies the acquired alarm information into the first information judged to have large influence on its own vehicle in the driving scene, and the second information other than the first information.

Specifically, when a content of acquired alarm information is a predetermined content defined in advance, and has the certainty of the alarm information equal to or higher than the threshold indicating the predetermined level of reliability, the classifier section 252 judges the alarm information to have large influence on its own vehicle and classifies the alarm information into the first information.

The contents of the alarm information can be defined in advance from the viewpoint of whether or not an alarm target object related to the alarm information has large influence on its own vehicle. For example, alarm information that can be defined as alarm information having large influence on its own vehicle includes, in the driving scene where its own vehicle exists, alarm information having a generic content indicating that "there is an alarm target object," and having specific contents indicating that "the alarm target object is located within a predetermined distance," "its own vehicle is approaching the alarm target object," "the following vehicle is approaching," and "a pedestrian is sensed."

Additionally, the "content of alarm information" can be defined for each driving scene. This allows judgment to be made as to whether or not alarm information sensed in a specific driving scene is information having influence on its own vehicle in the driving scene.

In contrast, even if a content of alarm information is a certain content defined in advance, but when the certainty of the alarm information is lower than the threshold indicating the predetermined level of reliability, the classifier section 252 judges that the alarm target object in the alarm information does not have large influence on its own vehicle, and classifies the alarm information into the second information instead of the first information.

Further, the classifier section 252 can judge influence of the alarm information on its own vehicle on the basis of "correspondences between a combination of the alarm information and the vehicle information, and evaluation of influence on its own vehicle."

Specifically, the classifier section 252 judges that influence of the alarm information on its own vehicle is large when a combination of a content of the alarm information and a content of the vehicle information is a combination defined in advance as having large influence on its own vehicle.

FIG. 34 shows an example of the "correspondence between a combination of the alarm information and the vehicle information, and evaluation of influence on its own vehicle." When the alarm information that "something is approaching on the right side" and the vehicle information that the vehicle speed is 0 Km/h are acquired in an intersection, the influence of the alarm target object on its own vehicle can be considered as small because its own vehicle is in a stationary state. For this reason, as shown in FIG. 34, this combination of the alarm information and the vehicle information is associated with the influence "small." On the other hand, when the alarm information that "something is approaching on the right side" and the vehicle information that the vehicle speed is not 0 Km/h are acquired in an intersection, the influence of the alarm target object on its own vehicle can be considered as large because its own vehicle is running. For this reason, as shown in FIG. 34, this combination of the alarm information and the vehicle information is associated with the influence "large."

Note that, the combinations shown in FIG. 34 are not limited, and any combination can be defined appropriately as needed, such as combinations of: the alarm information that there is an alarm target object, and the vehicle information that its own vehicle is released from stopping (break release); the alarm information that there is an alarm target object, and the vehicle information that its own vehicle is approaching (steering angle operation); and the alarm information that there is a moving object, and the vehicle information that the relative speed is increased (acceleration β Km/h/sec>0).

For example, as shown in FIG. 35, when the content of the alarm information is a certain content defined in advance (such as "something is approaching on the right side"), when the certainty of the alarm information is equal to or higher than the predetermined level of reliability (the certainty "high"), and when the influence judged based on the vehicle information is large (the influence "large"), the alarm information is classified into the "first information" judged to have large influence on its own vehicle.

Additionally, the classifier section 252 classifies the alarm information, which is other than the alarm information classified into the first information, into the second information. The second information includes: (1) alarm information having a content other than the certain contents defined in advance, for example, information, whose necessity for alarm is relatively low, such as "there is no alarm target object (nothing is approaching on the right side);" (2) alarm information having the certainty lower than the predetermined level of reliability, for example, information having a "low" certainty or an undetectable certainty; and (3) alarm information judged to have small influence based on the vehicle information, for example, information evaluated as having "small" influence on its own vehicle.

Furthermore, importance can be placed on the certainty of the alarm information in order to provide correct information to a passenger. In this case, even if the content of the alarm information is one of the certain contents defined in advance and has large influence on its own vehicle, but when the certainty of the alarm information is lower than the threshold indicating the predetermined level of reliability, the alarm information can be classified into the second information instead of the first information.

Since the first information is information of an alarm target object having large influence on its own vehicle as described above, the information should be correctly recognized by a passenger. On the other hand, the second information has smaller influence on its own vehicle than the first information, and is information allowable even when it is recognized by the passenger incorrectly. In this embodiment, pieces of alarm information can be classified into two groups in consideration of the influence of the pieces of the alarm information on its own vehicle. Thus, information can be presented in a manner suitable for a feature of each piece of the alarm information.

Next, the action controller unit 220 is explained. The action controller unit 220 includes an information presentation trigger acquirer 221 and an action commander 223.

When the alarm information is classified into the first information by the classifier section 252, the action commander 223 causes the robot 100 to take the advance notice action for informing a passenger in the vehicle that information will be presented to the passenger, before the information presentation. The advance notice action is not particularly limited, and may be any action such as the action of rotating the robot 100, or the action of rotating the hand member H1, the horn member T1 or the tail member as described in the first embodiment, or may be any action such as the action of turning the front side f of the robot 100 to the passenger, the action of turning the artificial sight line of the robot 100 to the passenger as described in the second embodiment. Thus, the advance notice action is not particularly limited. In addition, any of these actions of the robot 100 may be combined with an action such as the light emission action or the voice output.

In addition, the action commander 223 can cause the robot 100 to take an action of monitoring the surroundings of the vehicle while the vehicle is running in a given driving scene, before causing the robot 100 to take the advance notice action.

The action of monitoring the surroundings of the vehicle can be determined in advance depending on driving scenes. FIG. 36 shows an example of the action of monitoring the surroundings of the vehicle in each of the driving scenes. As shown in FIG. 36, the action of monitoring the surroundings of the vehicle in an intersection is set at a rotation action in which the robot 100 rotates about the first axis G (a rotation action of moving back and forth within a range from +45 to −45° with respect to the traveling direction (0°)). When the robot 100 is caused to take this action, the passenger can observe the robot 100 looking around the surroundings (warming area) restlessly. As shown in FIG. 36, the action of monitoring the surroundings can be set as an action in which the front side f of the robot 100 faces toward an area where alarm information is sensed in each given driving scene. This action of the robot 100 can show the passenger a range where the passenger should be careful in the driving scene.

Moreover, the action commander 223 generates an action command to take the action of monitoring the surroundings depending on a driving scene, and transmits the action command to the controller unit 110 of the robot 100. This action of monitoring the surroundings (sensing action) can be taken prior to the information presentation action. When the action of monitoring the surroundings in the driving scene is taken before the information presentation as described above, the information can be presented after the monitoring action enhances the awareness level of the passenger. Since the awareness of the passenger can be gradually enhanced before the generation of the alarm information, the passenger can be prepared for a time of the generation of the alarm information.

Next, the information presenter unit 230 is explained.

The information presenter unit 230 includes a judge section 234, a presentation information analyzer 231, a corresponding action decider 232, and a presentation action commander 233.

When information is classified into the first information by the classifier section 252, the judge section 234 causes the robot 100 to take the information presentation action after taking the action of giving notice that information will be presented. On the other hand, when information is classified into the second information by the classifier section 252, the judge section 234 causes the robot 100 to take the information presentation action without waiting for the execution of the action of giving notice that information will be presented.

The functions and operations of the presentation information analyzer 231, the corresponding action decider 232 and the presentation action commander 233 in the information presenter unit 230 are in common with the functions and operations of the presentation information analyzer 231, the corresponding action decider 232 and the presentation action commander 233 in the second embodiment.

Subsequently, description is provided for types of an action which can be included in the action command for the presentation action.

The types of the presentation actions in this embodiment are not particularly limited. When the alarm information includes the direction information, however, the presentation action can include an action in which the front side f of the robot 100 turns to the direction indicated by the direction information. This action of the robot 100 shows the indicated direction which the passenger (including the driver) is desired to look at carefully. The passenger looking at the behavior of the robot 100 can recognize that there is something (an alarm target object) in the pointing direction of the robot 100, and therefore can look at the direction carefully.

Moreover, when the front side f of the robot 100 is provided with eye members e1, e2 like human-eyes the presentation action may include an action in which the artificial sight line of the eye members e1, e2 of the robot 100 turns to the direction indicated by the direction information. In this way, the indicated direction can be pointed by the direction of the artificial sight line of the eye members e1, e2, and thus the indicated direction which the passenger is desired to look at carefully can be shown specifically.

Additionally, when front side portions of the robot 100 are provided with light emitters 132 as described above, the light emitters 132 can be caused to emit light after the robot 100 is driven so that the front side f of the robot 100 turns to a direction indicated by the direction information included in the alarm information. The light emission in the indicated direction allows the pointing direction to be clearly shown.

Further, when the output unit 130 of the robot 100 is provided with the speakers 131 as described above, the speakers 131 can be caused to output alarm information after the robot 100 is driven so that the front side f of the robot 100 turns to a direction indicated by the direction information included in the alarm information. Reading aloud text corresponding to the alarm information while pointing the indicated direction allows the passenger to be notified of the direction and content about which the passenger should be careful.

On the other hand, when the alarm information does not include the direction information, the speakers 131 can be caused to output the alarm information after the robot 100 is driven so that the front side f of the robot 100 turns toward the passenger on the vehicle. If the robot 100 turns to a particular direction for the alarm information not including the direction information, the passenger may misunderstand that the alarm information is related to the direction. Giving a speech while facing toward the passenger as in this embodiment allows the alarm information to be provided to the passenger without a particular direction pointed.

Figure 37:
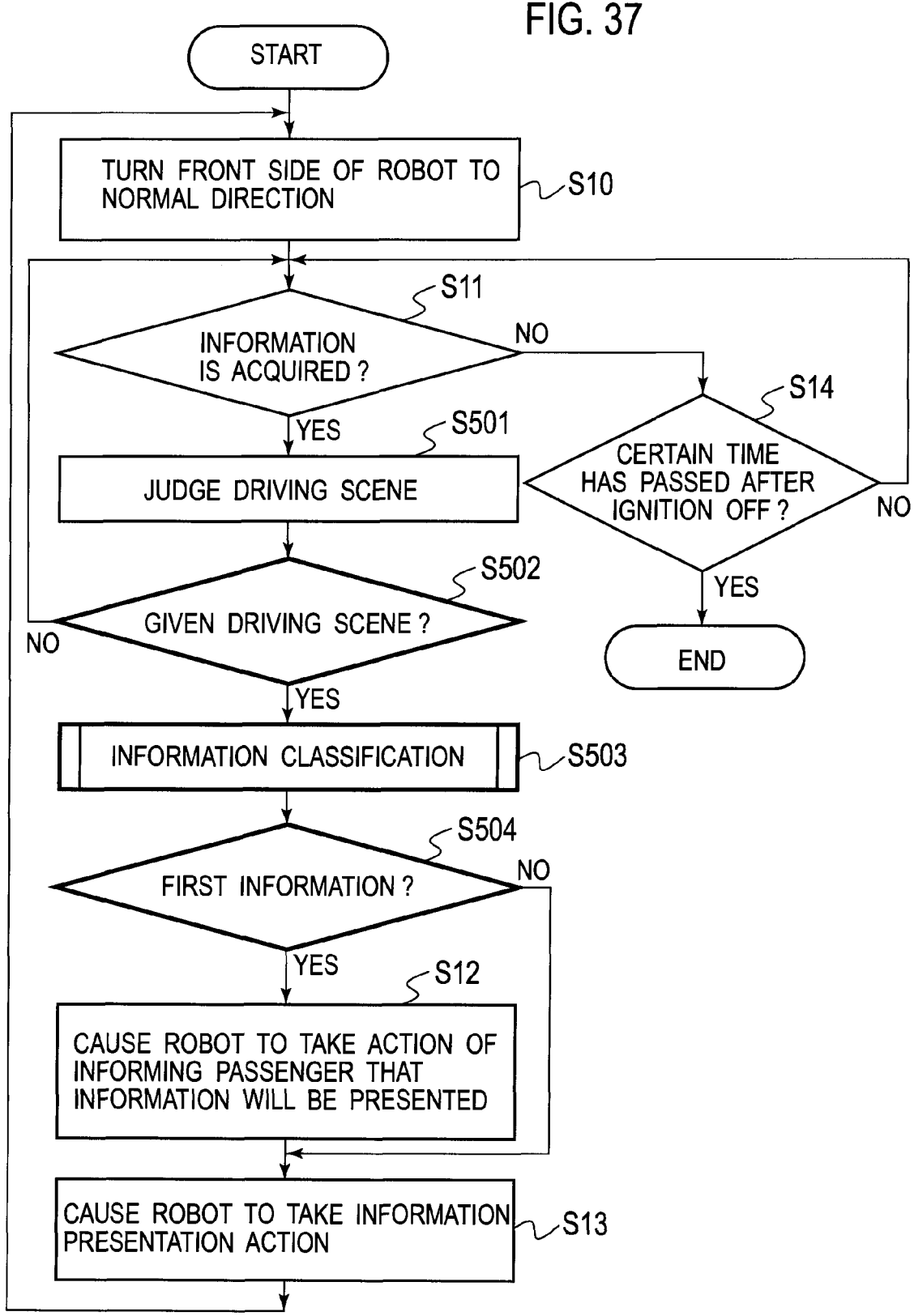
FIG. 37 is a flow chart diagram for explaining an overview of processing of the information presentation system in the fifth embodiment.

Next, an operation of the information presentation system 1500 in this embodiment is described based on FIG. 37. FIG. 37 is a flow chart diagram for explaining processing of the information presentation system 1500 in this embodiment. The processing in FIG. 37 is basically in common with the processing of the information presentation system 1000 in the first embodiment shown in FIG. 7.

In step S10, upon startup of the information presentation system 1500 (ignition ON), the controller unit 110 of the robot 100 controls the driver unit 120 so that the robot 100 will turn to the normal direction.

In step S11, the information acquirer unit 210 acquires information including the vehicle information and the alarm information from the navigation device 300, the obstacle alarm device 400, the vehicle controller 500, and the seating sensor device 700, and then outputs the vehicle information and the alarm information to the information classifier unit 250. On the other hand, when the information acquirer unit 210 does not acquire the information including the vehicle information and the alarm information, the processing advances to step S14, and is terminated immediately after ignition OFF or upon lapse of a predetermined time after the ignition OFF.

In step S501, the driving scene judge section 251 judges the current driving scene based on the vehicle information. Specifically, the driving scene judge section 251 judges the driving scene of its own vehicle based on the vehicle information in reference to the correspondences shown in FIG. 32.

In step S502, the driving scene judge section 251 judges whether the judged driving scene is one of the given driving scenes. When the driving scene is not the given driving scene, the processing turns back to step S11, and the vehicle information and the alarm information are newly acquired.

In step S503, the information classifier unit 250 classifies the information into the first information judged to have large influence on its own vehicle, and the second information other than the first information, on the basis of the content of the alarm information sensed in the given driving scene and the certainty of the alarm information. Note that the processing in step S503 will be described later in detail.

When the information classified in preceding step S503 is the first information in step S504, the processing advances to step S12. On the other hand, when the information classified in preceding step S503 is not the first information, the action controller unit 220 does not execute the processing in step S12. For this reason, the processing advances to step S13 in order that the information presenter unit 230 can immediately cause the robot 100 to take the information presentation action.

In step S12, the action controller unit 220 causes the robot 100 to take the action of informing the passenger that information will be presented.

In step S13, the action controller unit 220 causes the robot 100 to take the presentation action of information (first information).

A type of action that the robot 100 is caused to take is not particularly limited, and any type of the actions disclosed in the other embodiments can be taken.

Figure 38:
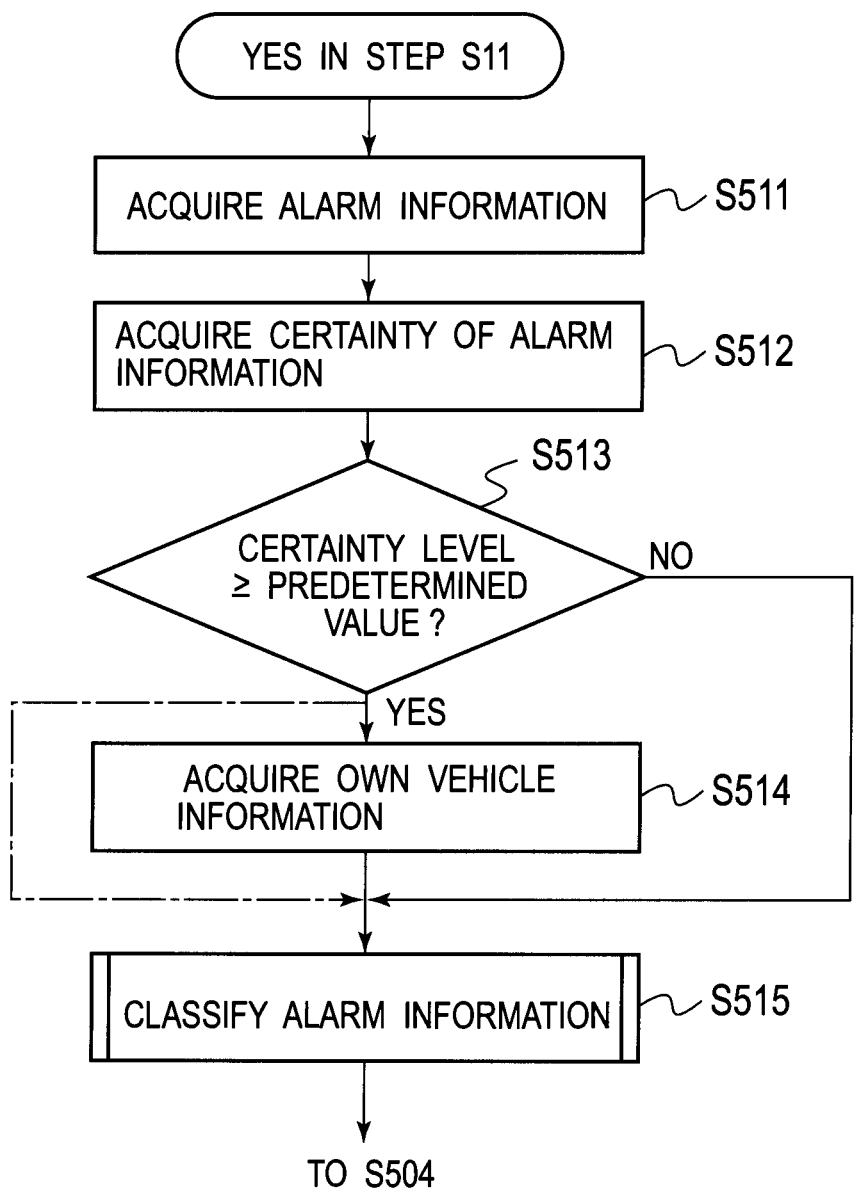
FIG. 38 is a flow chart diagram for explaining processing for classifying alarm information.

Next, alarm information classification processing executed in step S503 is described based on FIG. 38.

In step S511, the information acquirer unit 210 acquires the alarm information.

In step S512, the information acquirer unit 210 acquires the certainty of the acquired alarm information.

In step S513, the information acquirer unit 210 judges whether the level of the certainty of the acquired alarm information is equal to or higher than the threshold indicating the predetermined level of reliability. When the level of the certainty of the alarm information is equal to or higher than the threshold indicating the predetermined level of reliability, the processing advances to step S514. When the level of the certainty of the alarm information is smaller than the threshold indicating the predetermined level of reliability, the processing advances to step S515.

In step S514, the information acquirer unit 210 acquires the vehicle information in order to judge the influence of the alarm information.

In step S515, the information classifier unit 250 classifies the alarm information into the "first information" and the "second information" based on the vehicle information. Specifically, in the case where the content of the acquired alarm information is one of the certain contents defined in advance, where the certainty of the alarm information is equal to or higher than the threshold indicating the predetermined level of reliability, and where a combination of the content of the alarm information and the content of the vehicle information is one of the combinations defined in advance as having large influence on its own vehicle, the information classifier unit 250 judges the alarm information to have large influence on its own vehicle, and classifies the alarm information into the first information. The information classifier unit 250 judges the alarm information other than the above to have small influence on its own vehicle and classifies the alarm information into the second information.

The information classifier unit 250 can classify the alarm information into the "first information" having large influence on its own vehicle and the "second information" other than the first information, based on the content of the alarm information sensed in the given driving scene and the certainty of the alarm information, without using the vehicle information. Upon completion of the classification of the alarm information, the processing advances to step S504 shown in FIG. 37.

The information presentation system 1500 in this embodiment configured and operating as described above produces the following effects.

In order to present alarm information through an action of the robot 100, the information presentation system 1500 in this embodiment classifies the alarm information into the "first information" having large influence on its own vehicle and the "second information" other than the first information, and causes the robot 100 to firstly take the advance notice action and thereafter take the information presentation action to the passenger in the case of presenting the first information judged to have large influence on its own vehicle. In this way, information having large influence on its own vehicle is presented after attracting attention of a passenger. Thus, the passenger can properly recognize the information from the beginning.

In addition, the alarm information is classified into the first information and the second information on the basis of the current scene of its own vehicle, the content of the alarm information, and the certainty of the alarm information. Thus, the first information having large influence on its own vehicle can be extracted based on such quantitative judgment.

Moreover, taking the action of monitoring the surroundings of the vehicle when the vehicle exists in a particular given driving scene allows the passenger to be notified that his/her own vehicle is going to enter the driving scene where the passenger should be careful about the surroundings, and also allows the passenger to be notified of a direction or range in which the passenger should be careful for each driving scene.

Sixth Embodiment

An information presentation system 1600 in a sixth embodiment is characterized in that, when the probability (certainty) of alarm information is lower than a predetermined threshold, a reason for shortage of the certainty is presented by being included in the alarm information.

Figure 39:
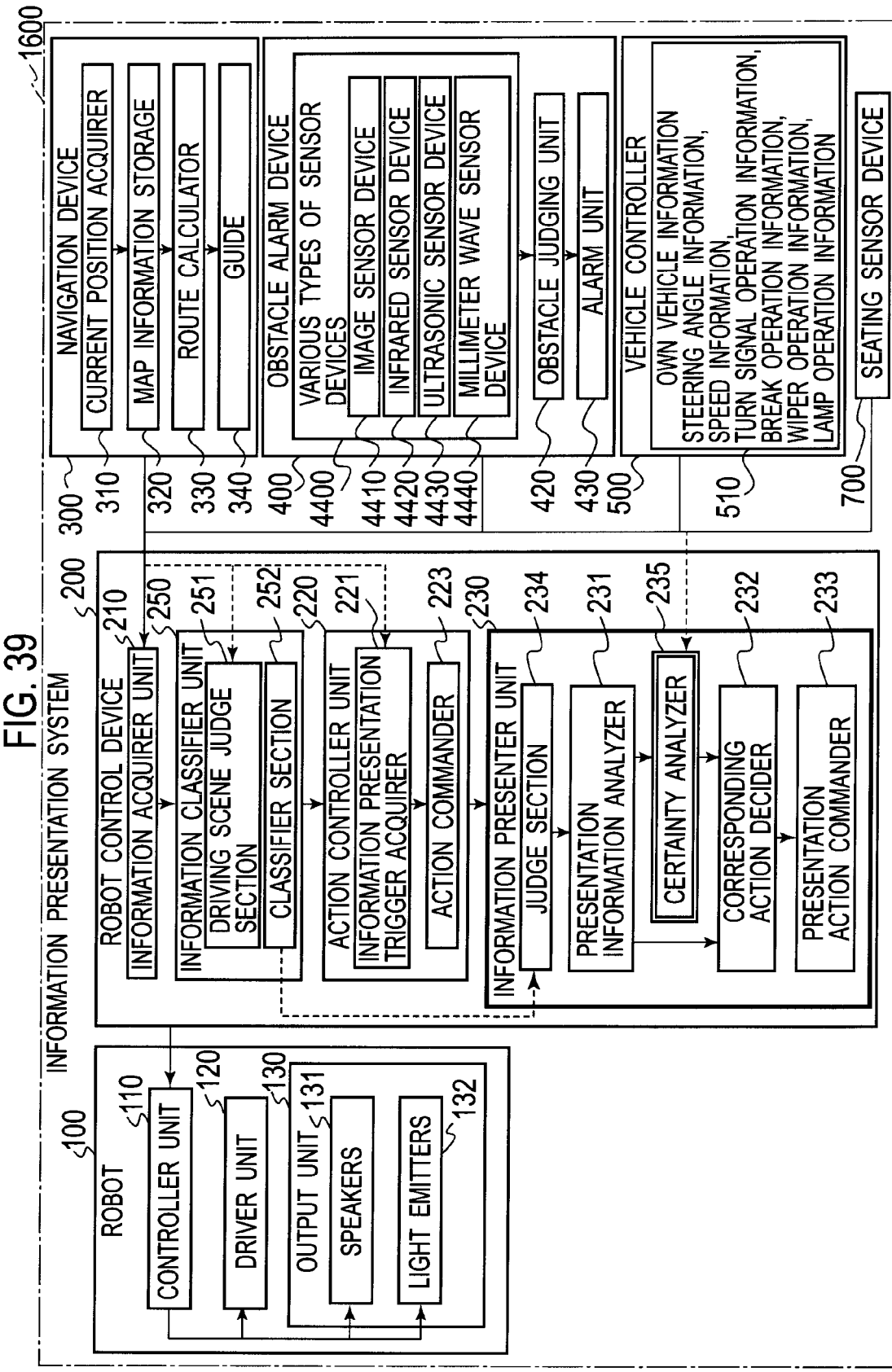
FIG. 39 is a block configuration diagram of an information presentation system in a sixth embodiment.

FIG. 39 is a diagram showing a block configuration according to the sixth embodiment. As shown in FIG. 39, an information presenter unit 230 in this embodiment includes a certainty analyzer 235 configured to make an analysis on the certainty of the alarm information. To avoid overlaps of the descriptions, characteristic points of this embodiment will be mainly described herein.

When the certainty of the alarm information acquired by an information acquirer unit 210 is lower than a threshold indicating a predetermined level of reliability, the certainty analyzer 235 make an analysis to find the reason why this certainty of the alarm information is lower than the threshold indicating the predetermined level of reliability, on the basis of information such as the vehicle information and the alarm information acquired by the information acquirer unit 210.

FIG. 40 shows sensing interference information and reasons for certainty decrease in association with each other. The sensing interference information indicates interferences with sensing of various types of sensor devices 4400, that is, factors of deterioration in sensing accuracy. The reasons for certainty decrease are obtained through analysis of the sensing interference information. In reference to the correspondences between the sensing interference information and the sensing failure reasons shown in FIG. 40, the certainty analyzer 235 makes the analysis to find the reason why the certainty of the alarm information is lower than the threshold, on the basis of the vehicle information, the alarm information and other information acquired through the information acquirer unit 210.

The sensing interference information is different depending on sensing principles of the various types of sensor devices 4400, and therefore is preferably defined for each of pieces of information sensed by the various types of sensor devices 4400, or for each sensing technique. The certainty analyzer 235 performs an analysis based on the sensing interference information that "brightness is equal to or lower than a predetermined value" sensed by a brightness sensor in a vehicle controller 500, and indentifies that a sensing failure reason of an image data captured by a CCD camera is "insufficient brightness." FIG. 40 shows an example of the correspondences between the sensing interference information and the sensing failure reasons. However, such correspondences are not limited to those illustrated, and may include any combination of a sensing failure reason (reason for deterioration in sensing accuracy) and its factor (sensing interference information) as long as they have a considerable causal linkage.

The information presenter unit 230 causes speakers 131 of an output unit 130 to output a speech of information including the reason found through the analysis by the certainty analyzer 235. Speech texts of the speech output thus provided are preferably stored in advance in association with the sensing interference information and the sensing failure reasons. FIG. 40 shows an example of speech texts associated the sensing interference information and the sensing failure reasons.

In addition, a content of a speech text for presenting a sensing failure reason and its causing factor is not particularly limited, but output information includes a sensing failure reason text and a certainty level report text. To be more precise, when the certainty (accuracy) is equal to or lower than the threshold due to insufficient brightness, the speakers 131 of the robot 100 are caused to make a speech including the sensing failure reason text of "because it is dark" and the certainty level report text of "sensing has failed."

Based on a flow chart in FIG. 41, an operation of the information presentation system 1600 in this embodiment is described. The processing from step S10 to step S504 shown in FIG. 41 is in common with the processing in the fifth embodiment. When the alarm information is not the first information (step S504: NO), the certainty analyzer 235 starts functioning.

In step S601, the certainty analyzer 235 extracts information defined as the sensing interference information, from the information acquired by the information acquirer unit 210 (S601).

In step S602, when the sensing interference information is extracted, the certainty analyzer 235 makes the analysis to find the reason why the certainty of the alarm information is lower than the predetermined threshold, in reference to the correspondences shown in FIG. 40 (S602).

In step S603, in reference to the correspondences between the sensing failure reasons and the speech texts shown in FIG. 40, the corresponding action decider 232 decides the information presentation action including the sensing failure reason text and the certainty level report text corresponding to the sensing failure reason found by the analysis in step S602 (S603).

In step S604, the corresponding action decider 232 generates an action command including a command to make a speech of the speech text including the sensing failure reason text and the certainty level report text (S604). A type of the presentation action is not particularly limited, and may be a presentation action in which the robot 100 takes an action and makes a speech of the speech text.

In step S13, the presentation action commander 233 transmits the generated action command to a controller unit of the robot 100, and thereby causes the robot 100 to execute the action command (S13). The robot 100 having received the action command makes a speech of the text including the reason why the certainty of the alarm information is lower than the predetermined threshold, i.e., for example, "because it is dark."

The information presentation system 1600 in this embodiment configured and operating as described above produces the same effects as the information presentation system 1500 in the fifth embodiment.

Moreover, when the certainty of the alarm information sensed by the various types of sensor devices 4400 is lower than the threshold indicating the predetermined level of reliability, the passenger can be notified of the reason according to this embodiment. This allows the passenger to use the alarm information in consideration of the environment of sensing.

Note that, although the part of the description in this embodiment in common with the fifth embodiment is omitted in the descriptions of this embodiment to avoid overlaps of the descriptions, the descriptions and drawings related to the first to fifth embodiments can be incorporated for the explanation of the information presentation system 1600 according to this embodiment.

This embodiment has been described by taking an example of the information presentation system including the robot 100, as an embodiment of the display member, which is a three-dimensional object, and the robot control device 200 as the control device. However, the present invention is not limited to this configuration. In addition, in this description, the explanation has been given to, as a configuration of the control device, the robot control device 200 including the information acquirer unit 210 as an example of an information acquirer, the action controller unit 220 as an example of an action controller, the information presenter unit 230 as an example of an information presenter, and the information classifier unit 250 as an example of an information classifier. However, the present invention is not limited to this configuration. Moreover, in this description, the information presenter unit 230 including the certainty analyzer 235 having a function of analyzing the sensing failure reason has been explained, but the present invention is not limited to this configuration.

Seventh Embodiment

Figure 42:
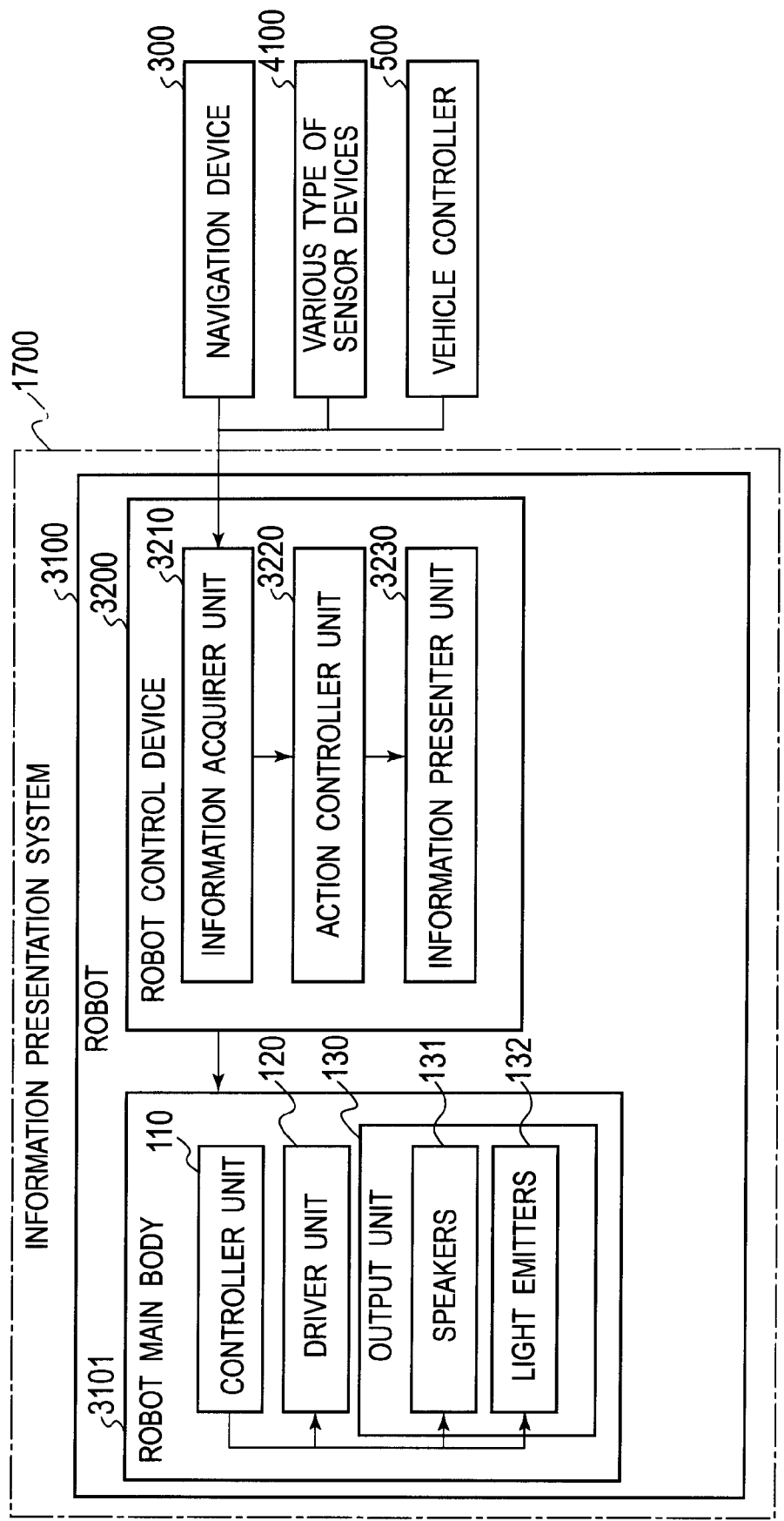
FIG. 42 is a block configuration diagram of an information presentation system in a seventh embodiment.

An information presentation system 1700 of a seventh embodiment is characterized in that a robot control device 3200 is installed in a robot 3100 although the robot control device is installed on the vehicle side in the first to sixth embodiments. FIG. 42 is a diagram showing a block configuration in this embodiment. Functions of a robot main body 3101 in this embodiment are equivalent to the functions of the robot 100 in the first to sixth embodiments. The presentation information is obtained from on-vehicle devices (a navigation device 300, various types of sensor devices 4400 of an obstacle alarm device 400, and a vehicle controller 500). For convenience of description, the same reference numerals are attached to units and the like configured to perform the same processing as the processing performed by the aforementioned units and the like.

The processing performed in this embodiment is basically in common with the processing performed by the information presentation systems in the first to sixth embodiments. A mechanism to perform the processing in this embodiment is similar to those in the information presentation systems in the first to sixth embodiments, and has a difference in that the mechanism is provided in the robot 3100 and not on the vehicle side.

Figure 43:
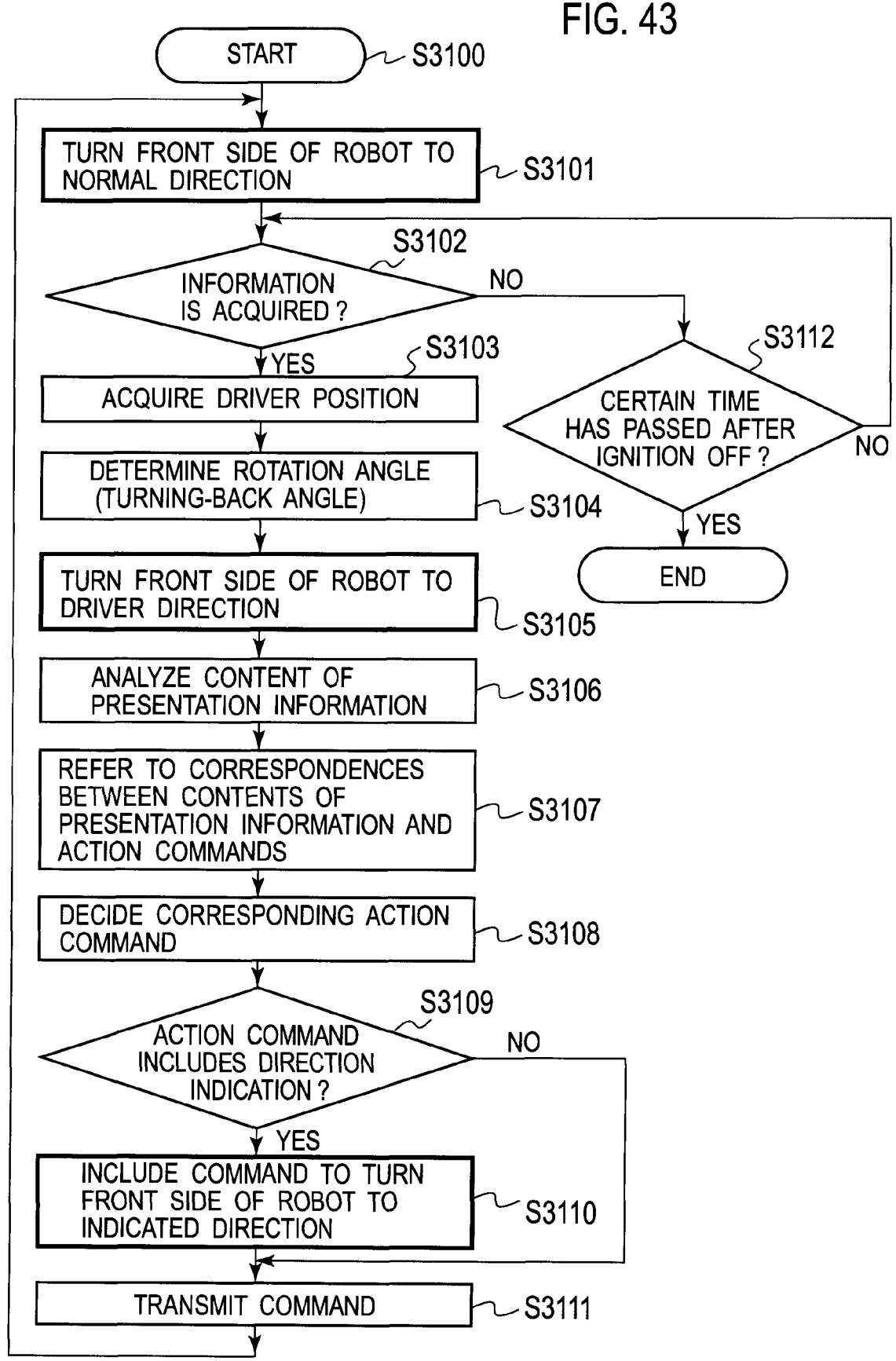
FIG. 43 is a flow chart diagram for explaining an overview of processing of the information presentation system in the seventh embodiment.

FIG. 43 is a flow chart diagram showing an example of the information presentation processing in this embodiment. The processing performed herein is equivalent to the information presentation processing in the second embodiment.

As shown in FIG. 43, when the information presentation system 1700 is started up (ignition ON) in step S3100, the processing advances to step S3101. In step S3101, the controller unit 110 of the robot 3100 controls the driver unit 120 so that the robot 3100 will turn to the normal direction.

In step S3102, upon acquisition of presentation information or information indicating the generation of the presentation information from on-vehicle devices (300, 400, 500, 700), a information acquirer unit 3210 of the robot 3100 issues output indicating the acquisition to an action controller unit 3220 of the robot 3100.

In step S3103, the action controller unit 3220 acquires the position of the face (head) of the driver, the position of the driver seat, or the position of the headrest from a driver position sensor device 600 on the vehicle side in order to cause the robot 3100 to take the action of giving notice that information will be presented.

In subsequent step S3104, the rotation angles of the robot 3100 in the advance notice action are determined. The action controller unit 3220 determines the rotation angel about the first axis G as the rotational axis and the rotational angle about the second axis H as the rotational axis, if necessary. When the rotation angles are determined in advance, the action controller unit 3220 reads the values thereof.

The action controller unit 3220 transmits a command to rotate about the first axis G and the second axis H as the rotational axes at the determined angles, to the controller unit 110 of the robot 3100.

In step S3105, the controller unit 110 of the robot 3100 causes the driver unit 120 to rotate the robot 3100 by the predetermined rotation angles. The robot 3100 takes an action of turning to a driver (passenger), that is, the advance notice action for informing the passenger that information will be presented.

In step S3106, an information presenter unit 3230 analyzes the content of the acquired presentation information.

In step S3107, the information presenter unit 3230 refers to the correspondences between the contents of the presentation information and the action commands.

In step S3108, the action command is determined and thus generated.

In step S3109, whether or not this action command includes direction indication is judged. Then, in step S3110, the information presenter unit 3230 generates an action command including a command to turn the front side f of the robot 3100 to the indicated direction when the action command includes the direction indication.

In step S3101, the information presenter unit 3230 transmits the generated action command to the robot 3100. Upon completion of the presentation action, the processing turns back to S3101, and the front side f of the robot 3100 is turned to the normal direction. The turning of the robot 3100 to the normal direction as described above can increase a movement amount of the next advance notice action that will be taken.

According to the information presentation system 1700 in this embodiment, as similar to the first embodiment and the sixth embodiment, the robot 3100 as the display member takes the action of rotating so that the front side f thereof can face toward the front side of a passenger, i.e., the advance notice action for informing the passenger that information will be presented (also referred to as a contact action), before the information presentation. Thus, the robot 3100 can enhance the recognition rate of the presentation information presented after this action. Through such advance notice action, the passenger and the robot 3100 make contact with each other to build a partner relationship before the information presentation. Thereby, the presentation information can draw attention of the passenger.

The information presentation system 1700 in this embodiment can produce the same effects as the information presentation systems of the first to sixth embodiments.

In addition, with this configuration, a version-up of the functions can be accomplished only by applying processing to the robot 3100. Specifically, in the version-up to add new information presentation processing, the information presentation system can be advantageously updated only by adding the processing to robot 3100 without needing any update of the system on the vehicle side.

Although the part of the description in this embodiment in common with the first to sixth embodiments is omitted to avoid overlaps of the descriptions, the descriptions and drawings related to the first to sixth embodiments can be incorporated for the explanation of the information presentation system 1700 according to this embodiment.

In this embodiment, an example of the information presentation system has been described as the robot 3100 including the robot main body 3101 that is presented as an embodiment of the display member and is a three-dimensional object, and the robot control device 3200 as the control device. However, the present invention is not limited to this configuration. In addition, in this description, the explanation has been given to, as a configuration of the control device, the robot control device 3200 including the information acquirer unit 3210 as an example of the information acquirer, the action controller unit 3220 as an example of the action controller, and the information presenter unit 3230 as an example of the information presenter. However, the present invention is not limited to this configuration.

Eighth Embodiment

An information presentation system 1800 in an eighth embodiment is characterized in that an action object configured to take actions like the robots 100 in the first to seventh embodiments is displayed as an image by using a three-dimensional shaped display device 4100.

Figure 44:
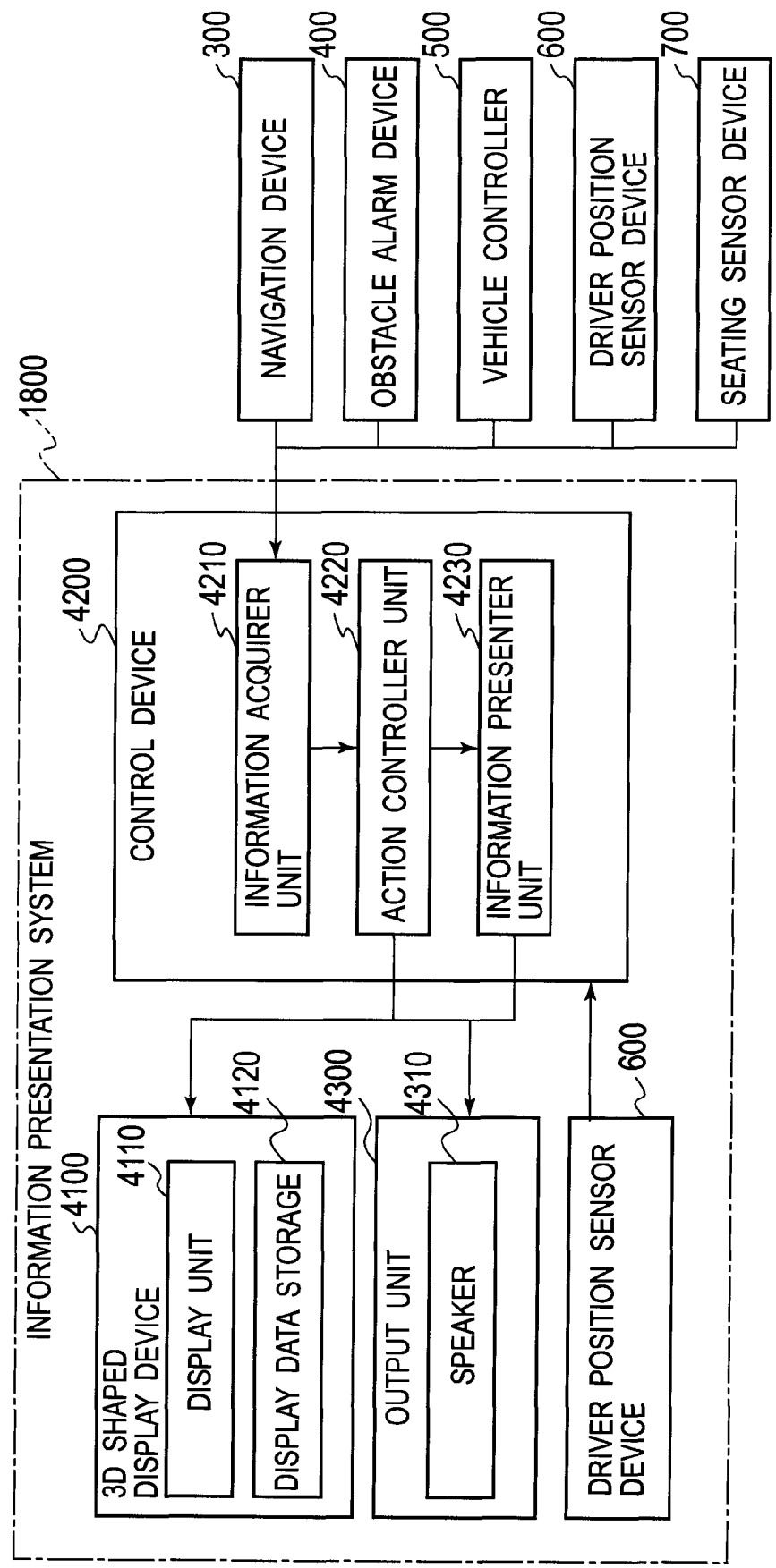
FIG. 44 is a block configuration diagram of an information presentation system in an eighth embodiment.

FIG. 44 is a block configuration diagram of the information presentation system 1800 in this embodiment. As shown in FIG. 44, the information presentation system 1800 in this embodiment includes the three-dimensional shaped display device 4100, a control device 4200 and an output unit 4300.

The three-dimensional shaped display device 4100 includes a display unit 4110 configured to display an action object image as a communication medium of providing information on the basis of control commands from the control device 4200, and a display data storage 4120 configured to store video data of the action object to be displayed. In this embodiment, any of the robots 100 described in the first embodiment to the seventh embodiment may be used as the action object to be displayed, and the figure of the robot 100 taking an action may be displayed through the three-dimensional shaped display device 4100.

FIG. 45(A) shows a configuration overview of the three-dimensional shaped display device 4100, and FIG. 45(B) shows a plan view of the three-dimensional shaped display device 4100. As shown in FIG. 45(A), the three-dimensional shaped display device 4100 includes a hemisphere-shaped projection surface 4102, a reproducer 4103 configured to reproduce the action object image, and a light source 4104 for projection, and a rotation driver 4105 configured to rotate the reproducer 4103. In addition, a base portion 4106 is configured to support these components, and to house the display unit 4110 and the display data storage 4120 therein.

The projection surface 4102 is light-transmissive, and the action object image projected from the reproducer 4103 can be viewed from the outside of the projection surface 4102.

The reproducer 4103 is driven by the rotation driver 4105 to rotate about a first axis G that extends in a direction approximately perpendicular to a surface where the three-dimensional shaped display device 4100 is installed. When the reproducer 4103 rotates, the action object image projected on the projection surface 4102 also rotates. With the rotation of the reproducer 4103, the action object facing in any desired direction can be displayed on the projection surface 4102. The reproducer 4103 has an image switching function of switching images to be projected. The reproducer 4103 is capable of reproducing any of different forms of the action object image in accordance with the control commands from the control device 4200.

The form of the action object image is not particularly limited, but can include eyes e1, e2 that are made to look like human eyes as shown in FIG. 45(B). In this case, the eyes e1, e2 are displayed on a front side f. The providing of the eyes e1, e2 in this way allows the action object image to show expression of looking at or looking up at a passenger in the advance notice action. In addition, the action object image and the passenger can look at each other and make eye contact with each other. This allows the action object image and the passenger to build a relationship. In addition, the action object image may include eyeballs e10, e20 and eyelids (not illustrated) together with the eyes e1, e2. The action object image can be made more expressive by taking an action of moving the eyeballs and an action of opening and closing the eyes.

The output unit 4300 in this embodiment has a speaker 4310. A function of the speaker 4310 is in common with the speakers in the first to third embodiments. Moreover, as similar to the first embodiment, a light emitter (not illustrated) can be provided to a flange portion 4107 on the front side f of the three-dimensional shaped display device 4100.

Figure 46:
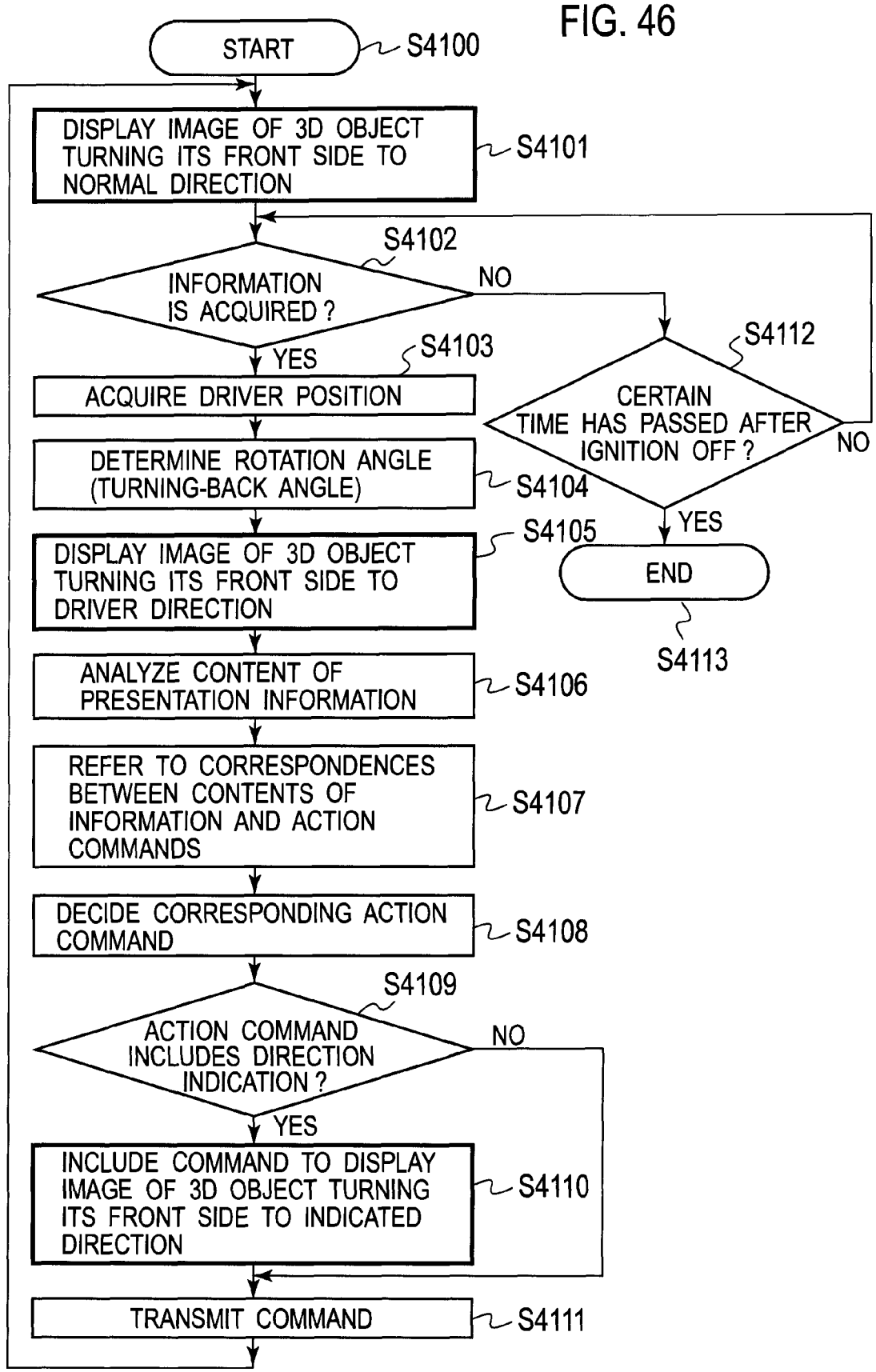
FIG. 46 is a flow chart diagram showing processing of the information presentation system in the eighth embodiment.

FIG. 46 is a flowchart diagram showing processing in this embodiment. An information processing flow is basically in common with the processing in the second embodiment shown in FIG. 20.

As shown in FIG. 46, when a system is started up (ignition ON) in step S4100, the processing advances to step S4101.

In step S4101, the display unit 4110 of the three-dimensional shaped display device 4100 displays the action object image with the front side f facing in a normal direction (a direction not toward the front side of a passenger, for example, a vehicle traveling direction).

In step S4102, upon acquisition of presentation information or information indicating the generation of the presentation information from on-vehicle devices (300, 400, 500, 700), an information acquirer unit 4210 issues output indicating the acquisition to an action controller unit 4220.

In step S4103, the action controller unit 4220 acquires the position of the face (head) of the driver, the position of the driver seat, or the position of the headrest from a driver position sensor device 600 on the vehicle side.

In step S4104, the action controller unit 4220 determines a rotation angle of the action object image in the advance notice action. The action controller unit 4220 determines the rotation angle of the image to be displayed by using the first axis G (see FIG. 45) as the rotational axis. When the rotation angle is determined in advance, the action controller unit 4220 reads the value thereof. The action controller unit 4220 transmits a command to rotate the action object image at the determined angle, to the display unit 4110.

In step S4105, the display unit 4110 causes the rotation driver 4105 to rotate the reproducer 4103 by the predetermined rotation angle, thereby causing the three-dimensional shaped display device 4100 to display the action object image with the front side f facing toward the passenger. The three-dimensional shaped display device 4100 displays the action object image taking an action of turning back to the passenger (the advance notice action).

In step S4106, an information presenter unit 4230 analyzes the content of the acquired presentation information.

The information presenter unit 4230 refers to the correspondences between the contents of the presentation information and the action commands in step S4107, and determines and generates an action command in subsequent step S4108.

In step S4109, whether or not this action command includes direction indication is judged. When the action command includes the direction indication, the information presenter unit 4230 generates a control command to display the action object image with the front side f facing in the indicated direction.

In step S4111, the information presenter unit 4230 transmits the generated control command to the three-dimensional shaped display device 4100. Upon completion of the presentation action, the processing turns back to S4101, and the action object image turning the front side f to the normal direction is displayed. This display can increase a movement amount of the action object in the next advance notice action that will be displayed.

In this embodiment, the reproducer 4103 is rotated to change the direction of the action object image. By using previously prepared images in which the action object rotates, a moving image in which the action object takes the advance notice action and a moving image in which the action object takes the presentation action can be displayed. In this case, the rotation direction can be set freely, and thus the action object taking a complicated movement can be displayed.

According to the information presentation system 1800 in this embodiment, as similar to the first embodiment to the seventh embodiment and the seventh embodiment, the action object image is displayed while taking the advance notice action of rotating so that the front side f thereof can face toward the front side of a passenger, before the information presentation. The display in this way can enhance the recognition rate of the presentation information presented after the advance notice action. By displaying the action object image taking the advance notice action, the passenger and the action object make contact with each other to build a partner relationship before the information presentation. Thereby, the information to be presented can draw attention of the passenger.

Moreover, according to this embodiment, in order to function as a driving partner, an action object displayed as an image can be made to show more complicated movement than in the case of using a tangible robot. In addition, by adding and editing the data in the display data storage 4120, the image of an action object (driving partner) can be set for each passenger.

Note that, although the part of the description in this embodiment in common with the first to seventh embodiments is omitted to avoid overlaps of the descriptions, the descriptions and drawings related to the first to seventh embodiments can be incorporated for the explanation of the information presentation system 1800 according to this embodiment.

In this embodiment, the description has been provided for an example of the information presentation system including the three-dimensional shaped display device 4100 as an example of a three-dimensional display, the output unit 4300 as an example of an output unit and the control device 4200 as an example of a control device. However, the present invention is not limited to this configuration. In addition, in this description, the control device 4200 including the information acquirer unit 4210 as an example of the information acquirer, the action controller unit 4220 as an example of the action controller, and the information presenter unit 4230 as an example of the information presenter has been explained as a configuration of the control device, but the present invention is not limited to this configuration.

Ninth Embodiment

An information presentation system 1900 in a ninth embodiment is characterized in that an action object configured to take predetermined actions like the robots 100 in the first to eighth embodiments is displayed as an three-dimensional virtual image by use of a virtual image display device.

Figure 47:
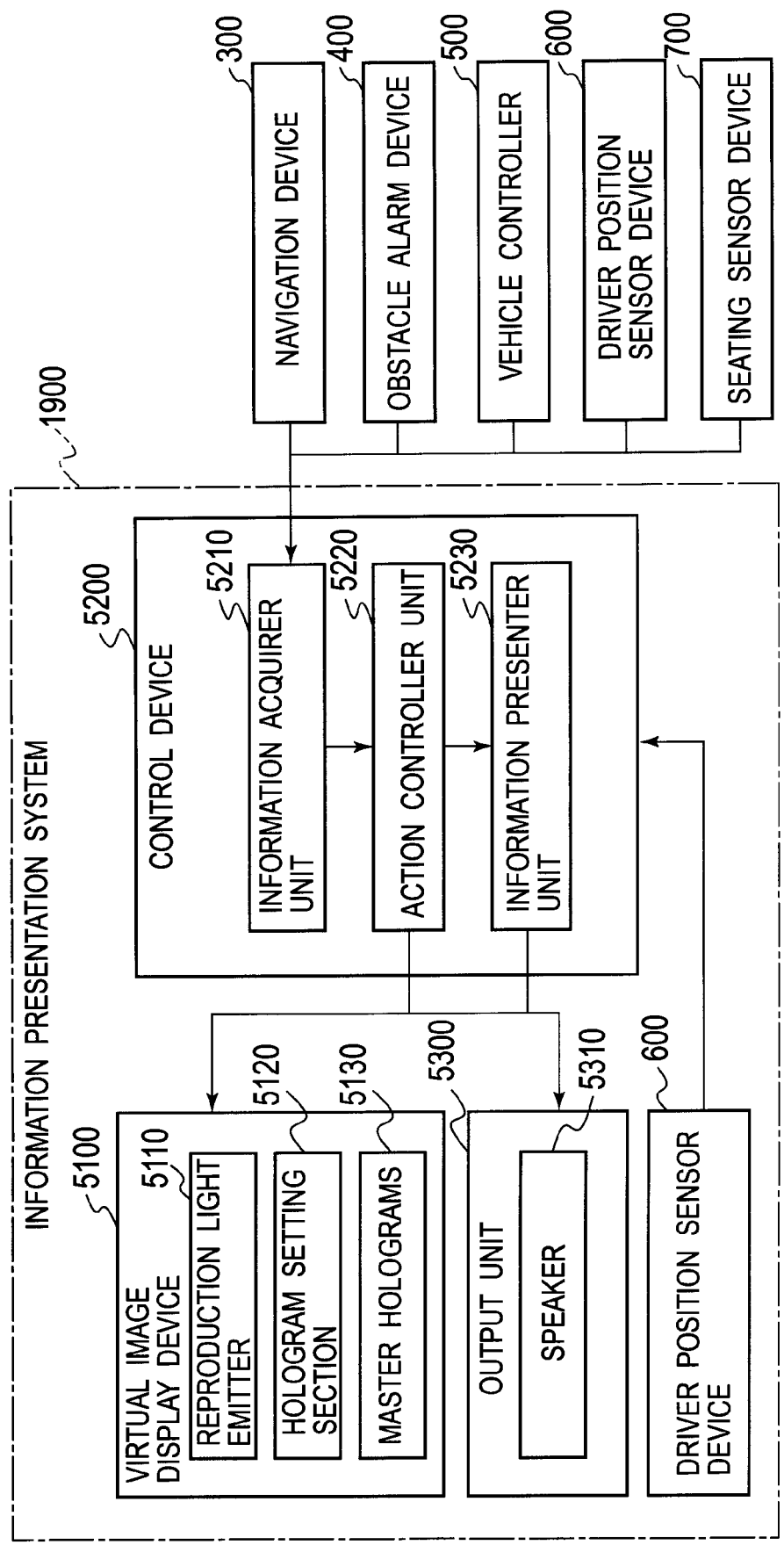
FIG. 47 is a block configuration diagram of an information presentation system in a ninth embodiment.

FIG. 47 is a block configuration diagram of the information presentation system 1900 in this embodiment. As shown in FIG. 47, the information presentation system 1900 in this embodiment includes a virtual image display device 5100, a control device 5200 and an output unit 5300.

The virtual image display device 5100 includes a reproduction light emitter 5110, a hologram setting section S120, and master holograms 5130.

The reproduction light emitter 5110 emits reproduction light to the master holograms 5130 on the basis of a control command from the control device 5200. Here, the reproduction light is used for reproducing the master holograms 5130 prepared in advance. A lamp such as a halogen lamp and a xenon lamp, a light emitting diode, a semiconductor laser light can be used as a light source for the reproduction light The master holograms 5130 are one or more holograms obtained by recording at certain intervals a process in which an action object, as a communication medium of providing information, takes an action. Here, using as an action object the robot 100 described in any one of the first embodiment to the seventh embodiment, the figure of the robot 100 taking actions may be displayed through the virtual image display device 5100. The master holograms include one or more holograms obtained by recording at certain intervals the process in which the robot 100 takes the advance notice action of turning the front side f to the a passenger aboard the vehicle. The master holograms 5130 include one or more holograms obtained by recording at certain intervals the process of the advance notice action in which the front side f of the action object (for example, the robot 100) turns to the seating surface of the driver seat in the vehicle, or the process of the advance notice action in which the front side f of the action object turns to the head holding surface of the headrest in the vehicle. In addition, the master holograms 5130 include one or more holograms obtained by recording at certain intervals the advance notice action in which the action object firstly faces in a certain normal direction (a direction different form a direction of the passenger), and then turns the front side f to the passenger aboard the vehicle.

The master holograms 5130 include holograms obtained by recording the process of any action of the action object at certain intervals, such as not only the action in which the action object turns to the passenger, but also an action in which the action object looks up at the passenger, a process in which the action object turns to a certain direction (normal direction) other than the direction of the passenger, and an action in which the action object turns to a certain indicated direction.

A method of creating holograms is not particularly limited, and any widely known method can be used. For example, a laser beam is split into two by a beam splitter, one of the laser beams is emitted to the action object taking an action, and an object beam reflected from the action object taking the action is obtained. The other laser beam is directly guided as a reference beam to a recoding material. An interference pattern between the object beam and the reference beam is recorded onto the recording material.

For the master holograms 5130 in this embodiment, the process of a series of actions of the action object is segmented by a predetermined time period, and then the still figure of the action object at each timing is recorded as a master hologram 5130. When the master holograms 5130 are reproduced sequentially in a chronological order, the action of the action object can be expressed like an animation. As the number of the master holograms 5130 in which the process of action is recorded becomes large, that is, a time interval between the master holograms becomes shorter, a more continuous and smoother action can be expressed.

In addition, the form of the action object whose action is recorded in the master hologram 5130 is not particularly limited, and an action object image may include images representing the eyes e1, e2 of the robot 100 as in the action object image in the eighth embodiment. In this case, the eyes e1, e2 are displayed on the front side f. With the eyes e1, e2 provided, the virtual image of the action object can show expression such as looking at or looking up at a passenger in the advance notice action, and thereby a relationship between the virtual image of the action object and the passenger can be built. Moreover, when eyeballs e10, e20 and eyelids (not illustrated) are provided together with the eyes e1, e2, the action object can be made more expressive.

A photosensitive material such as polyvinyl carbazole, acrylic photopolymer based on acryl or the like, dichromated gelatin, or a photoresist material can be used as a recording material for the recording master holograms 5130.

The hologram setting section 5120 sets the prepared one or more master holograms 5130, sequentially in a chronological order in an action taken during the recording, in a reproduction position irradiated with the reproduction light. When the master holograms 5130 set sequentially by the hologram setting section 5120 are sequentially irradiated with the reproduction light, the action of the action object is reproduced. In this way, the three-dimensional virtual image of the action object taking a predetermined action can be displayed. The three-dimensional virtual image can be displayed at a windshield portion. In addition, a special holographic display device can be installed near a dashboard.

The output unit 5300 includes a speaker 5310, and reads aloud presentation information. The function is in common with the first to fourth embodiments.

Figure 48:
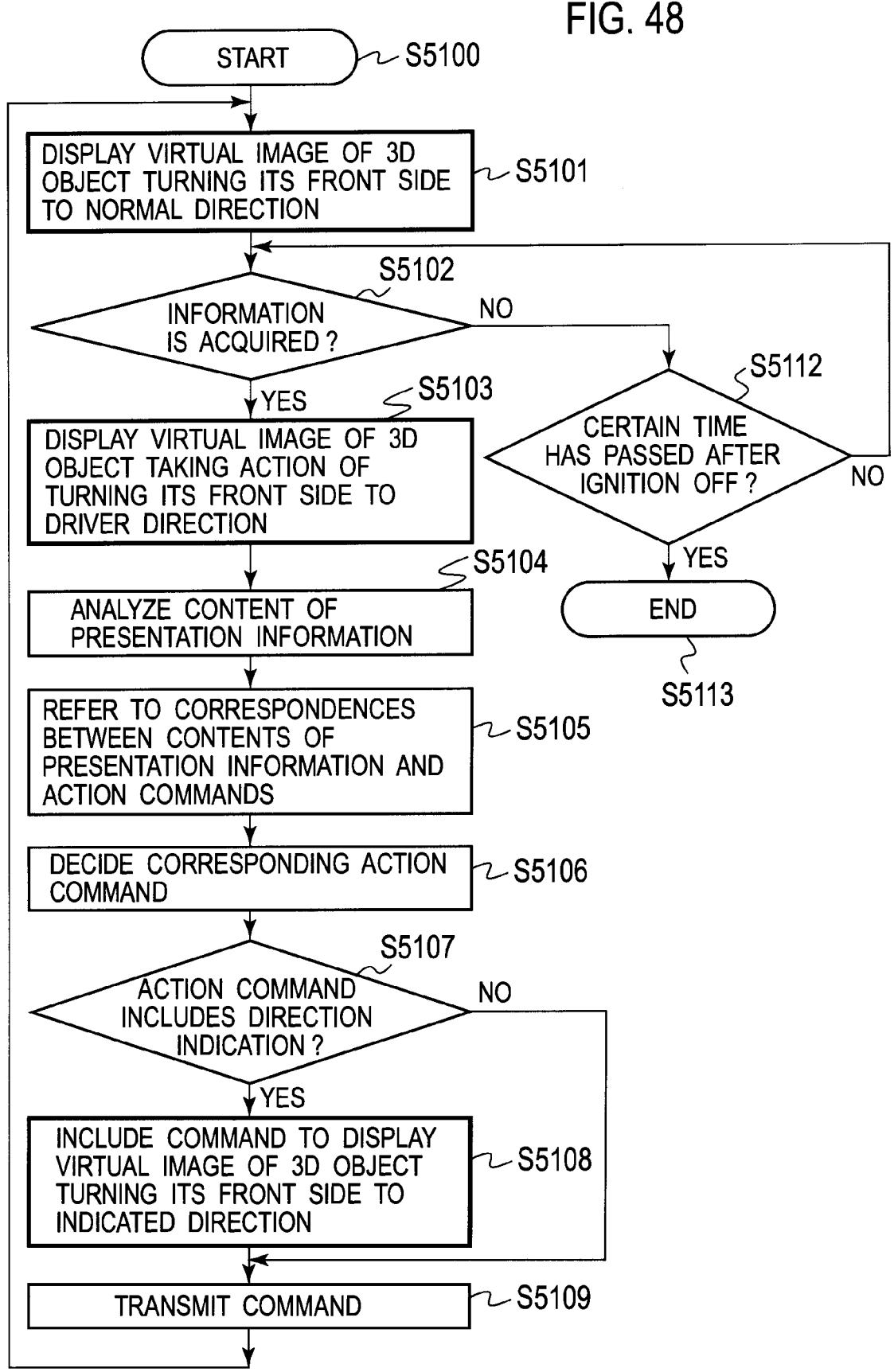
FIG. 48 is a flow chart diagram showing processing of the information presentation system in the ninth embodiment.

FIG. 48 is a flow chart diagram showing processing of this embodiment. An information processing flow is in common with the processing of the second embodiment shown in FIG. 20, but is different in that an object that is to take the advance notice action and the presentation action is a three-dimensional virtual image (holographic image) of an action object instead of the tangible robot 100.

As shown in FIG. 48, when the information presentation system 1900 is started up (ignition ON) in step S5100, the hologram setting section 5120 displays the virtual image of the action object (for example, the robot 100) with the front side f facing in a normal direction (a direction not toward the front side of a passenger, for example, a vehicle traveling direction) in subsequent step S5101. The display direction of the virtual image of the action object is set appropriately depending on the setting direction of the master holograms 5130 during reproduction, the position of a reproduction light source, and the like. In this embodiment, the master holograms 5130 are prepared in which the virtual image of the action object turns to a predetermined direction with respect to the setting direction of the master holograms 5130 during reproduction and the position of the reproduction light source, which are set in advance.

In step S5102, upon acquisition of presentation information or information indicating the generation of the presentation information from on-vehicle devices (300, 400, 500, 700), an information acquirer unit 5210 issues output indicating the acquisition to an action controller unit 5220.

In step S5103, the action controller unit 5220 causes the virtual image display device 5100 to sequentially reproduce multiple master holograms obtained by recording at predetermined intervals an action process in which the action object takes the advance notice action of turning the front side f to a passenger on the vehicle. In this step S5103, the three-dimensional virtual image of the action object taking the advance notice action of turning the front side f to the passenger is displayed.

In step S5104, an information presenter unit 5230 analyzes the content of the acquired presentation information.

The information presenter unit 5230 refers to the correspondences between the contents of the presentation information and the action commands in step S5105, and decides and generates the action command in subsequent step S5106.

When it is determined in step S5107 that the action command includes a direction indication, the information presenter unit 5230 generates a control command in step S5108, the control command including a command to display the three-dimensional virtual image of the action object taking the presentation action of turning the front side f to the indicated direction.

In step S5109, the information presenter unit 5230 transmits the generated control command to the virtual image display device 5100. Thereafter, the processing turns back to step S5101, and then the three-dimensional virtual image of the action object taking the presentation action of turning the front side f to the normal direction is displayed. This action is for increasing a movement amount of the advance notice action of the action object that will be displayed next.

Here, a method of displaying a three-dimensional virtual image is not particularly limited, and any widely known method can be used. For example, a three-dimensional image display device described in Japanese Patent Application Publication No. Hei 9-113845 can be used to display the three-dimensional virtual image of the action object taking the advance notice action, the presentation action and the like in this embodiment.

As similar to the second embodiment, the information presentation system 1900 in this embodiment displays the three-dimensional virtual image of the action object taking the advance notice action of turning the front side f to the passenger before the information presentation, and therefore can enhance the recognition rate of the presentation information presented after the advance notice action. Through such advance notice action, the passenger and the action object image make contact with each other to build a partner relationship before the information presentation. Thereby, the presentation information can draw attention of the passenger.

Although the part of the description in this embodiment in common with the first to eighth embodiments is omitted to avoid overlaps of the descriptions, the descriptions and drawings related to the first to eighth embodiments can be incorporated for the explanation of the information presentation system 1900 according to this embodiment.

This embodiment has been described by taking an example of the information presentation system including the virtual image display device 5100 as an example of a virtual image display device, the output unit 5300 as the output unit, and the control device 5200 as an example of the control device. However, the present invention is not limited to this configuration. In addition, in this description, the explanation has been given to, as a configuration of the control device, the control device 5200 including the information acquirer unit 5210 as an example of the information acquirer, the action controller unit 5220 as an example of the action controller, and the information presenter unit 5230 as an example of the information presenter. However, the present invention is not limited to this configuration.

It should be noted that the foregoing embodiment is described to make the present invention to be understood easily, and is not intended to limit the present invention. Therefore, the units disclosed in the foregoing embodiment are intended to include any types of design modifications and equivalents pertaining to the technical scope of the present invention.

Tenth Embodiment

An information presentation system 2000 in a tenth embodiment is characterized in that the two-dimensional image of an action object taking a predetermined action like the robot 100 in any one of the first to seventh embodiments is displayed on a display 350 (display device) of a navigation device 300.

FIG. 49 is a block configuration diagram of the information presentation system 2000 in this embodiment. As shown in FIG. 49, the information presentation system 2000 in this embodiment includes a control device 6200 configured to control display on the display of the navigation device 300, and an output unit 6300.

The navigation device 300 in this embodiment includes the display 350 configured to display an action object image as a communication medium of providing information in accordance with a control command from the control device 6200. A general display used in the navigation device 300 can be used as the display 350.

In addition, an information presenter unit 6230 of the control device 6200 includes a display data storage 6231 configured to store video data of the action object to be displayed. Using, as an action object to be displayed, the robot 100 described in any one of the first embodiment to the seventh embodiment, the figure of the robot 100 taking actions may be displayed through the display 350 in this embodiment. Here, an example is described in which the display 350 of the navigation device 300 is used as the display device, but a display for this system may be separately provided.

FIG. 50 is a flow chart diagram showing processing in this embodiment. An information processing flow is basically in common with the processing of the first embodiment shown in FIG. 20.

In this embodiment, the two-dimensional image of the action object such as the robot 100 is displayed on the display 350 of the navigation device 300. To this end, the two-dimensional image of the action object is displayed after information is acquired. For example, after the information is acquired, the display is switched from a map screen to another screen, and thus the action object is displayed thereon.

As shown in FIG. 50, in step S6100, upon startup of the information presentation system 2000 (ignition ON), the navigation device 300 is also started up.

In step S6101, upon acquisition of presentation information or information indicating the generation of the presentation information from on-vehicle devices (300, 400, 500, 700), an information acquirer unit 6210 issues output indicating the acquisition to an action controller unit 6220.

In step S6102, the action controller unit 6220 causes the display 350 to display an image showing the action process in which the action object takes the advance notice action of turning the front side f from the normal direction to the passenger on the vehicle, by switching to the image from a map screen, for example, displayed so far. Thereby, the two-dimensional image of the action object taking the advance notice action of turning the front side f to the passenger is displayed in step S6103.

In step S6104, the information presenter unit 6230 analyzes the content of the acquired presentation information.

In step S6105, the information presenter unit 6230 refers to the correspondences between the contents of the presentation information and the action commands. In step S6106, the information presenter unit 6230 decides and generates the action command.

When the action command includes a direction indication in step S6107 (YES: S6107), the information presenter unit 6230 generates a command to display the two-dimensional image of the action object taking the presentation action of turning the front side f to the indicated direction (S6108).

In step S6109, the information presenter unit 6230 transmits the generated control command to a guide 340. Thereafter, the processing turns back to S6101, and then the two-dimensional image of the action object taking the presentation action of turning the front side f to the normal direction is displayed. This action is for increasing a movement amount of the advance notice action of the action object that will be displayed next.

As similar to the first embodiment, the information presentation system 2000 in this embodiment displays the two-dimensional image of the action object taking the advance notice action of turning the front side f to the passenger before the information presentation, and therefore can enhance the recognition rate of the presentation information presented after the advance notice action. Through such advance notice action, the passenger and the two-dimensional image of the action object displayed by the guide 340 make contact with each other to build a partner relationship before the information presentation. Thereby, the presentation information can draw attention of the passenger.

Moreover, since the two-dimensional image of the action object is displayed by use of the display 350 of the navigation device, the same effects can be obtained even when there is no space for installing a robot.

Although the part of the description in this embodiment in common with the first to ninth embodiments is omitted to avoid overlaps of the descriptions, the descriptions and drawings related to the first to ninth embodiments can be incorporated for the explanation of the information presentation system 2000 according to this embodiment.

In this embodiment, an example in which the two-dimensional image of the action object is displayed on the display 350 of the navigation device 300 is described, but the present invention is not limited to this. For example, the two-dimensional image of the action object may be projected onto a head-up display device provided at a windshield.

This embodiment has been described by taking an example of the information presentation system including the display 350 of the navigation device 300 as an example of the display device, the output unit 6300 as an example of the output unit, and the control device 6200 as an example of the control device. However, the present invention is not limited to this. Moreover, in this description, the explanation has been given to, as a configuration of the control device, the control device 6200 including the information acquirer unit 6210 as an example of the information acquirer, the action controller unit 6220 as an example of the action controller, and the information presenter unit 6230 as an example of the information presenter. However, the present invention is not limited to this configuration.

The foregoing embodiments are only examples illustrated to make the present invention to be understood easily, and the present invention should not be limited to these embodiments. The scope of the present invention includes all of any single unit described in the foregoing embodiments, any combination of the foregoing embodiments, any modification and variation within the technical scope of the present invention.

This application claims the benefit of priority from Japanese Patent Application No. 2007-261309 filed on Oct. 4, 2007, Japanese Patent Application No. 2007-273901 filed on Oct. 22, 2007, and Japanese Patent Application No. 2008-228401 filed on Sep. 5, 2008, the contents of which are incorporated by reference in the description of the present invention.

INDUSTRIAL APPLICABILITY

According to an information presentation system of the present invention, an advance notice action taken by a display member allows a passenger to know that information will be presented later. Thereby, the passenger can be well prepared to recognize the presented information from the beginning, and therefore can recognize information presented even in the beginning out of the whole presented information. Accordingly, an information presentation system of the present invention is industrially applicable.

The invention claimed is:

1. An information presentation system comprising:
a display member being mounted on a vehicle and representing an action object configured to take an action, the action object having a front face with an eye, the front face being turnable between a first position where the front face faces other than a passenger aboard the vehicle and a second position where the front face faces the passenger; and
a control device configured to control the display member, wherein
the control device includes:
an information acquirer configured to acquire information generated according to a vehicle condition;
an action controller configured to cause the display member to show the action object turning, as an advance notice action, the front face of the action object from the first position to the second position to inform the passenger that information will be presented in response to information acquired by the information acquirer; and
an information presenter configured to cause the display member to present information after showing the action object taking the advance notice action.

2. The information presentation system according to claim 1, wherein
the control device further includes an information classifier configured to classify information acquired by the information acquirer into first information judged to have large influence on the vehicle, and second information other than first information, based on a content of information acquired by the information acquirer,
the action controller causes the display member to show the action object taking the advance notice action, when information is classified as first information by the information classifier, and
the information presenter causes the display member to take the advance notice action first and thereafter to present information when classified as first information by the information classifier, and causes the display member to present information when information is classified as second information by the information classifier.

3. The information presentation system according to claim 2, wherein,
the information acquirer at least acquires vehicle information on the vehicle, and alarm information on an alarm target object sensed at the vehicle, and the information classifier judges that the vehicle is in a given driving scene on the basis of vehicle information acquired by the information acquirer, and classifies acquired alarm information as first information judged to have large influence on the vehicle, or as second information other than first information based on a content of alarm information sensed in the given driving scene and based on a certainty of sensed alarm information.

4. The information presentation system according to claim 3, wherein
the information classifier classifies alarm information into first information when the content of acquired alarm information is a certain content defined in advance, and also when the certainty of alarm information is equal to or larger than a predetermined threshold.

5. The information presentation system according to claim 3, wherein
the information classifier classifies alarm information into first information when the content of acquired alarm information is a certain content defined in advance, when the certainty of alarm information is equal to or larger than a predetermined threshold, and also when a combination of alarm information and vehicle information is defined in advance as having large influence on the vehicle.

6. The information presentation system according to claim 3, wherein
the display member includes an output unit configured to output information generated according to the vehicle condition,
the action controller includes a certainty analyzer configured to analyze why the certainty of alarm information is lower than a predetermined threshold, based on vehicle information and/or alarm information acquired by the information acquirer, when the certainty of alarm information acquired by the information acquirer is lower than the predetermined threshold, and
the information presenter causes the output unit to output alarm information including the reason found through the analysis by the certainty analyzer.

7. The information presentation system according to claim 1, wherein
the display member is a three-dimensional object configured to show a predetermined action by a motion to a passenger,
the control device controls the motion of the three-dimensional object,
the action controller causes the three-dimensional object to take the advance notice action in response to information acquired by the information acquirer, and
the information presenter causes the three-dimensional object to take the advance notice action first and thereafter to take an information presentation action.

8. The information presentation system according to claim 7, wherein
the three-dimensional object includes a driver unit configured to rotate the three-dimensional object about a first axis as a rotational axis,
the action controller causes the driver unit to rotate the three-dimensional object in response to information acquired by the information acquirer, and thereby causes the three-dimensional object to take the advance notice action by turning a front side of the three-dimensional object to the passenger aboard the vehicle, and the information presenter causes the three-dimensional object to take the advance notice action first and thereafter to take the information presentation action.

9. The information presentation system according to claim 7, wherein
when information acquired by the information acquirer is predetermined warning information, the action controller causes the three-dimensional object to take the advance notice action, thereafter waits for a response from the passenger for a predetermined time period, and notifies the information presenter if the response is received, and
the information presenter causes the three-dimensional object to take an action to present warning information, if the action controller notifies the information presenter that a response is received.

10. The information presentation system according to claim 7, wherein
when information acquired by the information acquirer is predetermined warning information, the action controller causes the three-dimensional object to take the advance notice action and thereafter waits for a response from a driver for a predetermined time period, and notifies the information presenter if the response is received from the driver and causes the three-dimensional object to take an advance notice action of rotating by using a driver unit, and
the information presenter causes the three-dimensional object to take an action to present warning information after taking the advance notice action.

11. The information presentation system according to claim 1, wherein
the display member is a three-dimensional shaped display configured to display the action object taking a predetermined action, and further includes an output unit configured to output information generated according to the vehicle condition,
the control device controls a presentation operation of the three-dimensional shaped display and an output operation of the output unit,
the control device further includes a display controller configured to cause the three-dimensional shaped display to display an action object image taking the advance notice action in response to information acquired by the information acquirer, and
the information presenter causes the three-dimensional shaped display and/or the output unit to output information acquired by the information acquirer after the action object image taking the advance notice action is displayed on the three-dimensional shaped display.

12. The information presentation system according to claim 11, wherein
the display controller causes the three-dimensional shaped display to display the action object image taking the advance notice action of turning the front side to the passenger aboard the vehicle in response to information acquired by the information acquirer.

13. The information presentation system according to claim 1, wherein
the display member is a display device configured to display a two-dimensional image of the action object, and further includes an output unit configured to output information generated according to the vehicle condition,
the control device controls a display operation of the display device and an output operation of the output unit,
the control device further includes image data obtained by recording at predetermined intervals the action object taking the advance notice action, and a display controller configured to reproduce image data on the display device in response to information acquired by the information acquirer, thereby displaying the two-dimensional image of the action object taking the advance notice action,
the information presenter causes the output unit to present information acquired by the information acquirer, after the two-dimensional image of the action object taking the advance notice action is displayed.

14. The information presentation system according to claim 13, wherein
the image data is a two-dimensional image obtained by recording at predetermined intervals the advance notice action in which the front side of the action object turns to the passenger aboard the vehicle, and
the display controller is configured to reproduce image data on the display device in response to information acquired by the information acquirer, thereby displaying the two-dimensional image of the action object taking the advance notice action of turning the front side of the action object to a front side of the passenger aboard the vehicle.

15. The information presentation system according to claim 14, wherein
the display controller causes the display device to display the two-dimensional image of the action object taking the advance notice action of turning the front side to a seating surface of a seat of the vehicle.

16. The information presentation system according to claim 14, wherein
the display controller causes the display device to display the two-dimensional image of the action object taking the advance notice action of turning the front side to a head holding surface of a headrest of the vehicle.

17. The information presentation system according to claim 14, wherein
the display controller causes the virtual image display device to display the three-dimensional virtual image of the action object taking an action of monitoring the surroundings of the vehicle, before causing the virtual image display device to display the three-dimensional virtual image of the action object taking the advance notice action, and
the action of the action object monitoring the surroundings of the vehicle is an action in which the front side of the action object turns to an area where information acquired by the information acquirer is sensed.

18. The information presentation system according to claim 1, wherein
the display member is a display device configured to display a two-dimensional image of the action object, and further includes an output unit configured to output information generated according to the vehicle condition,
the control device controls a display operation of the display device and an output operation of the output unit, the control device further includes image data obtained by recording at predetermined intervals an action proce in which the action object taking the advance notice action, and a display controller configured to reproduce image data on the display device in response to information acquired by the information acquirer, thereby displaying the two-dimensional image of the action object taking the advance notice action, the information presenter causes the output unit to present information acquired by the information acquirer, after the two-dimensional image of the action object taking the advance notice action is displayed.

19. The information presentation system according to claim 18, wherein the image data is a two-dimensional image obtained by recording at predetermined intervals the advance notice action in which the front side of the action object turns to the passenger aboard the vehicle, and the display controller is configured to reproduce image data on the display device in response to information acquired by the information acquirer, thereby displaying the two-dimensional image of the action object taking the advance notice action of turning the front side of the action object to a front side of the passenger aboard the vehicle.

20. The information presentation system according to claim 19, wherein the display controller causes the display device to display the two-dimensional image of the action object taking the advance notice action of turning the front side to a seating surface of a seat of the vehicle.

21. The information presentation system according to claim 19, wherein the display controller causes the display device to display the two-dimensional image of the action object taking the advance notice action of turning the front side to a head holding surface of a headrest of the vehicle.

* * * * *